United States Patent
Jiang et al.

(10) Patent No.: US 6,831,720 B2
(45) Date of Patent: Dec. 14, 2004

(54) HIGH-BRIGHTNESS COLOR LIQUID CRYSTAL DISPLAY PANEL EMPLOYING LIGHT RECYCLING THEREWITHIN

(75) Inventors: Yingqiu Jiang, Santa Clara, CA (US); Le Li, Yorktown Heights, NY (US); Aharon Hochbaum, Berkeley, CA (US); Sameer Vartak, White Plains, NY (US); Hristina Galabova, Mamaroneck, NY (US); Richard Wiley, Los Altos, CA (US); Sadeg M. Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 10/452,814

(22) Filed: May 30, 2003

(65) Prior Publication Data

US 2004/0095531 A1 May 20, 2004

Related U.S. Application Data

(62) Division of application No. 09/313,124, filed on May 17, 1999, now Pat. No. 6,573,961, which is a continuation-in-part of application No. 09/312,164, filed on May 14, 1999, now Pat. No. 6,630,974, which is a continuation-in-part of application No. 09/287,579, filed on Apr. 6, 1999, which is a continuation-in-part of application No. 09/032,302, filed on Feb. 27, 1998, now Pat. No. 6,559,903, which is a continuation-in-part of application No. 08/805,603, filed on Feb. 26, 1997, now Pat. No. 5,940,150, which is a continuation-in-part of application No. 08/787,282, filed on Jan. 24, 1997, which is a division of application No. 08/743,293, filed on Nov. 4, 1996, which is a continuation of application No. 08/739,467, filed on Oct. 29, 1996, now Pat. No. 6,034,753, which is a division of application No. 08/715,314, filed on Sep. 16, 1996, now abandoned, which is a continuation-in-part of application No. 08/550,022, filed on Oct. 30, 1995, now Pat. No. 5,691,789, which is a continuation of application No. 08/265,949, filed on Jun. 27, 1994, now Pat. No. 5,549,412.

(51) Int. Cl.[7] ........................................... G02F 1/1335
(52) U.S. Cl. ........................... 349/115; 349/96; 349/98
(58) Field of Search .......................... 349/96, 115, 114, 349/9, 130, 98

(56) References Cited

U.S. PATENT DOCUMENTS

| 5,221,982 A | * | 6/1993 | Faris ........................... 349/115 |
| 5,506,704 A | * | 4/1996 | Broer et al. .................. 349/98 |
| 5,822,029 A | * | 10/1998 | Davis et al. ................. 349/115 |
| 6,099,758 A | * | 8/2000 | Verrall et al. ................ 252/585 |
| 6,630,974 B2 | * | 10/2003 | Galabova et al. ........... 349/119 |

* cited by examiner

*Primary Examiner*—Tarifur R. Chowdhury
*Assistant Examiner*—Mike Qi
(74) *Attorney, Agent, or Firm*—Reveo, Inc.

(57) ABSTRACT

A color liquid crystal display using reflective color filters using layers of cholesteric liquid crystals is disclosed. The reflective color filters have two different center wavelengths and bandwidths per layer and are stacked in two layers to provide colored light for displays. With various numbers of layers in the stack, different polarization levels are provided. The pixels in the display of the invention are arranged such that multiple adjacent sub-pixels in a layer with the same color makes the color filters easier to manufacture.

30 Claims, 68 Drawing Sheets

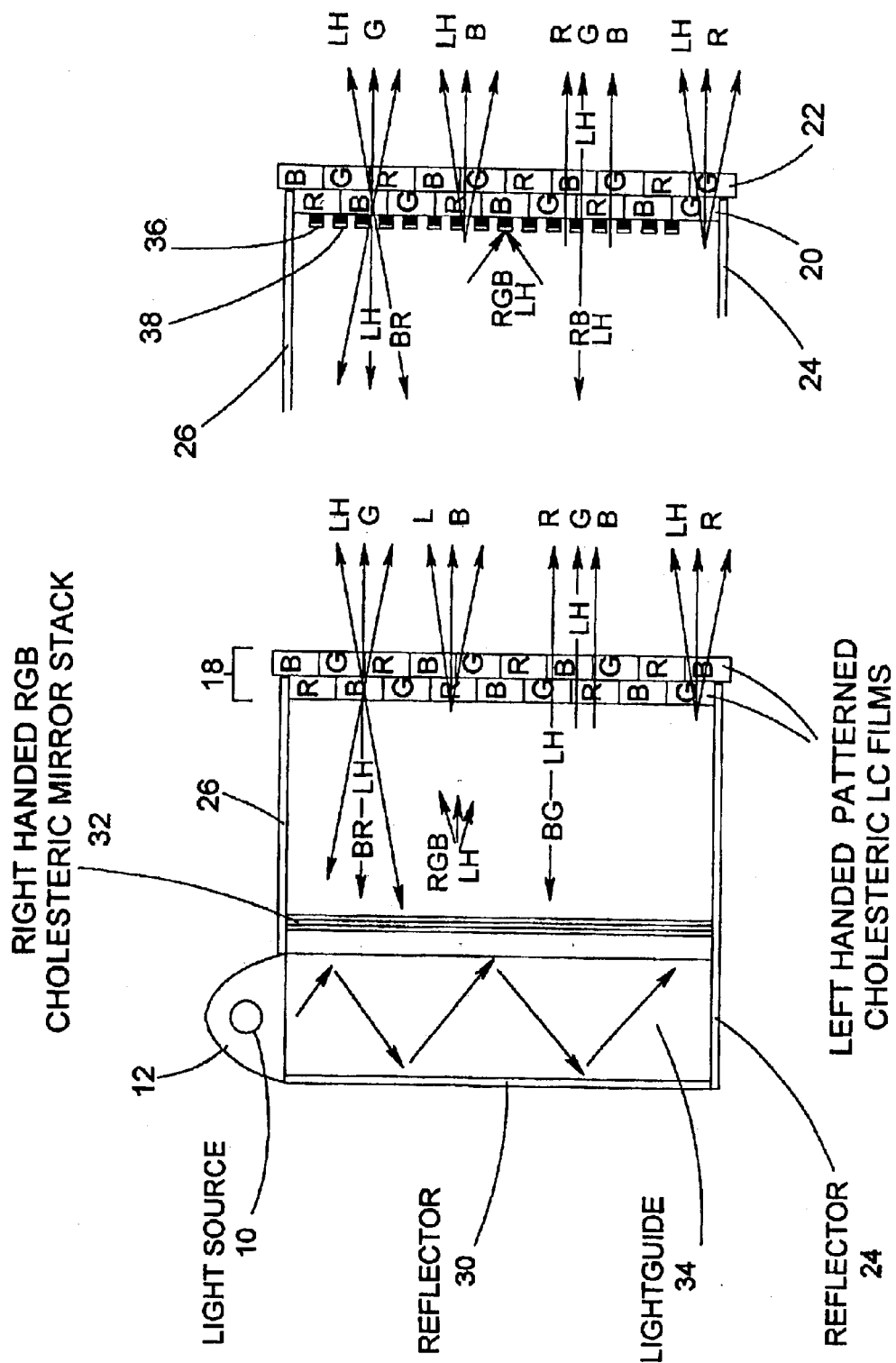

FIG. 2B1

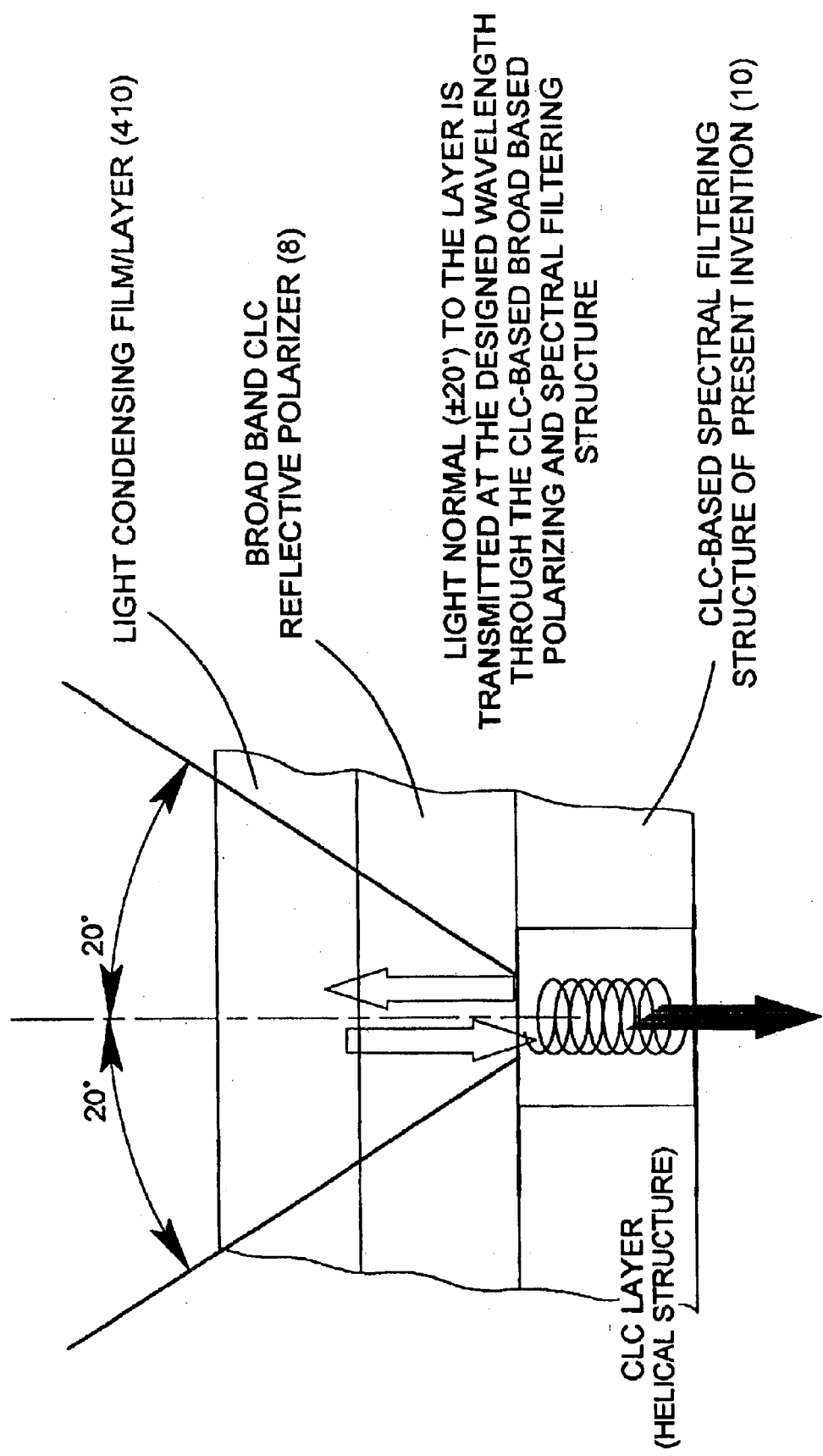
FIG. 2B2

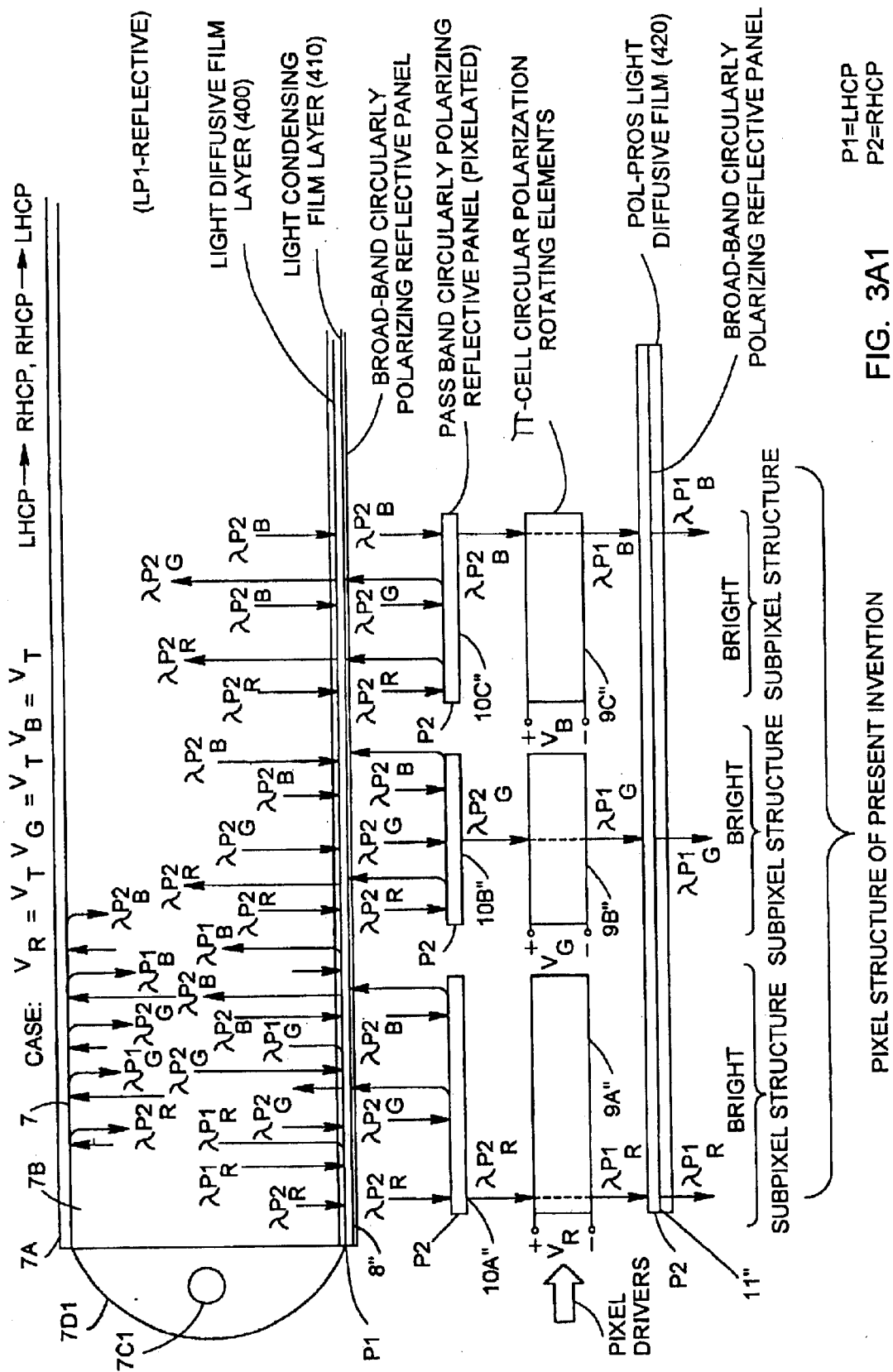
FIG. 3A1

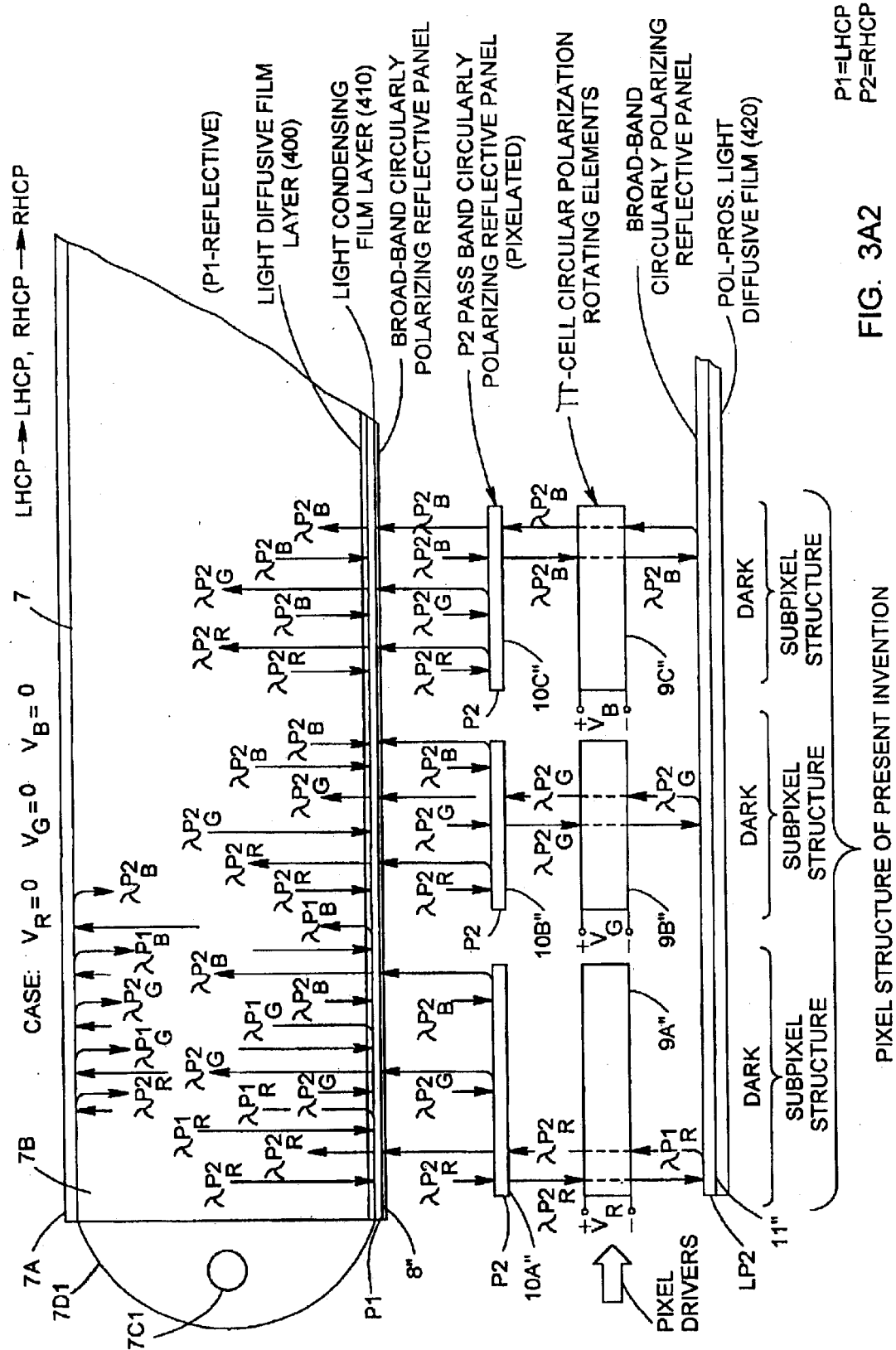
FIG. 3A2

EXTINCTION RATIO AS A FUNCTION OF FILM THICKNESS

COLOR TEMPERATURE AS A FUNCTION OF ANGLE OF INCIDENCE FOR DIFFERENT FILM DIFFERENT FILM THICKNESS AND $\Delta n=0.15$.

$\Delta n=0.2$, MUCH IMPROVED COLOR TEMPERATURE DEPENDENCE.

○,□ EXPERIMENTAL DATA, SOLID LINE-SIMULATION. SIDE B (FACING UP) HAS MUCH LESS COLOR TEMPERATURE CHANGE WITH ANGLE

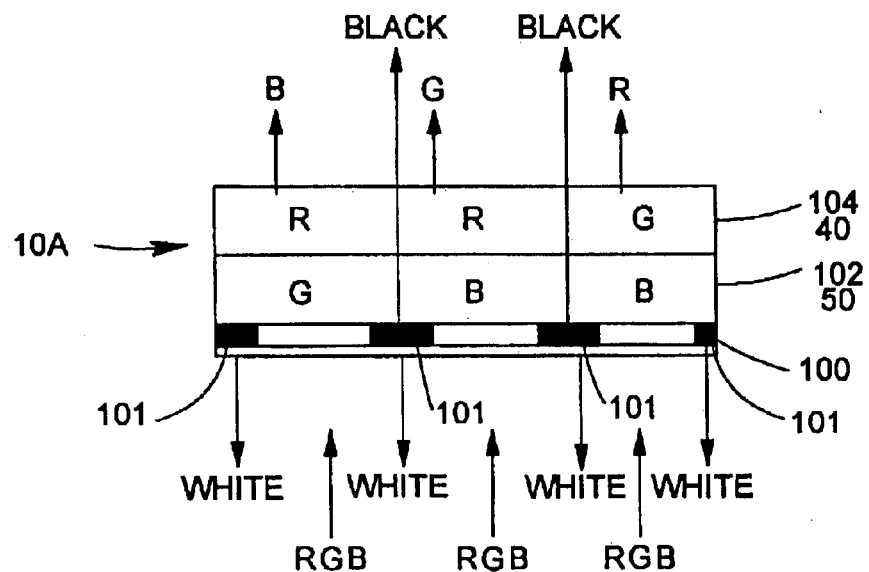
FIG. 5B1
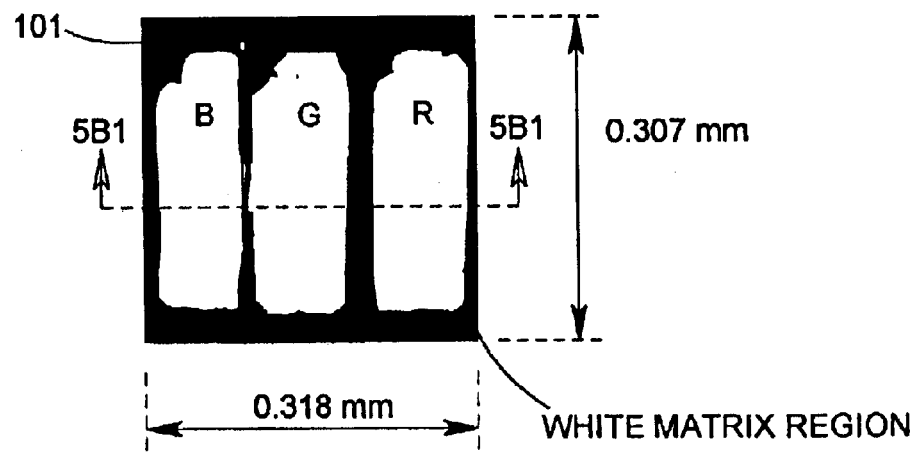
FIG. 5B2
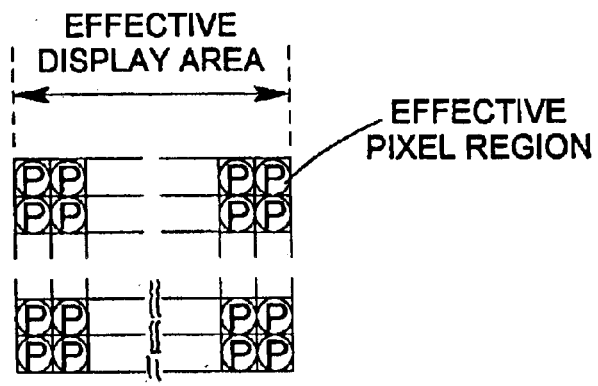
FIG. 5C

"COLOR PURITY" IS DEFINED ON THE CHROMATICITY DIAGRAM BELOW. WE'LL USE THE FOLLOWING EXAMPLE TO EXPLAIN THE DEFINTION.

WE NEED TO MEASURE THE COLOR COORDINATES (CC) OF THE LIGHT SOURCE, C IN OUR CASE. WE MEASURE THE SAMPLE'S CC, B IN OUR CASE. WE DRAW A STRAIGHT LINE FROM C TO B AND EXTEND IT BEYOND THE CC OR THE SAMPLE UNTIL IT INTERSECTS WITH THE CHROMATICITY DIAGRAM BOUNDARY, AT I IN OUR CASE. COLOR PURITY IN % IS DEFINED AS $$\text{COLOR PURITY} = 100 \frac{CB}{CI}$$

WHERE CB & CI ARE THE RESPECTIVE LENGTHS OF THE CORRESPONDING SEGMENTS, WHEN THE SAMPLE'S CC LIE ON THE CHROMATICITY DIAGRAM BOUNDRY ITS COLOR PURITY IS 100%.

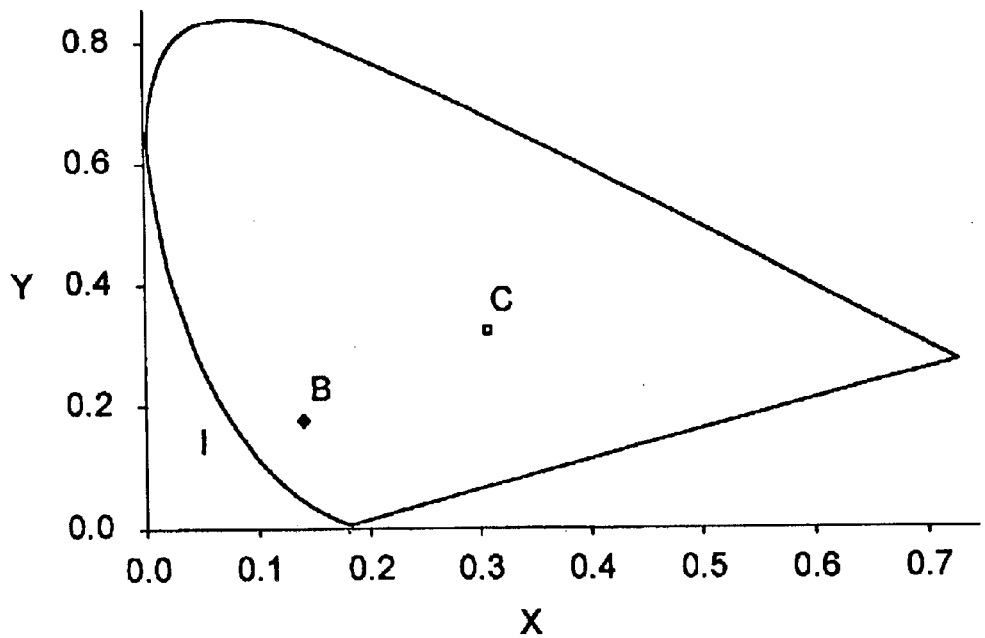

FIG. 7A

"COLOR COORDINATES (CC)"

THE BLACK SQUARE (C) INDICATE THE CC OF A STANDARD LIGHT SOURCE (C SOURCE) FOR WHICH THE CC WERE CALCULATED. THE SOLID DIAMONDS INDICATE THE CC OF EACH OF THE RGB PIXELS. IN THIS CALCULATION WE USED THE TRANSMISSION DATA (OF PERPENDICULAR INCIDENT LIGHT) FOR EACH COLOR PIXEL IN ORDER TO CALCULATE ITS CC. THE SOLID LINE TRIANGLE INDICATED THE EXTENT OF COLOR GAMUT OF OUT RGB PIXELS.

SOLID CIRCLES ARE THE CC FOR A TYPICAL CONVENTIONAL ABSORPTIVE COLOR FILTERS. THEIR COLOR GAMUT (BROKEN LINE TRIANGLE) IS SMALLER THAN OUR COLOR GAMUT.

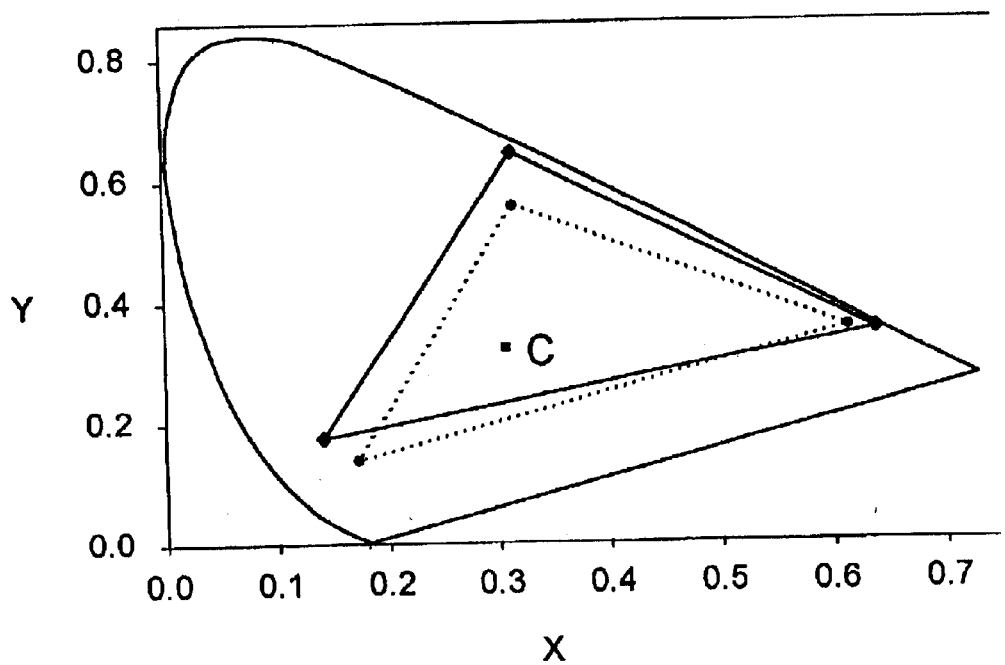

FIG. 7B

"EXTINCTION"

EXTINCTION CURVES ARE THE RATIO OF THE TRANSMISSION OF A PIXEL IN ITS BRIGHT-STATE TO THE TRANSMISSION IN THE DARK-STATE.

$$E(\lambda) = \frac{T_{BRIGHT\_STATE}(\lambda)}{T_{DARK\_STATE}(\lambda)}$$

IT'S A MEASURE OF HOW MUCH CONTRAST WE MAY EXPECT FROM A TWISTED NEMATIC DISPLAY USING SPECTRAL FILTERS OF PRESENT INVENTION

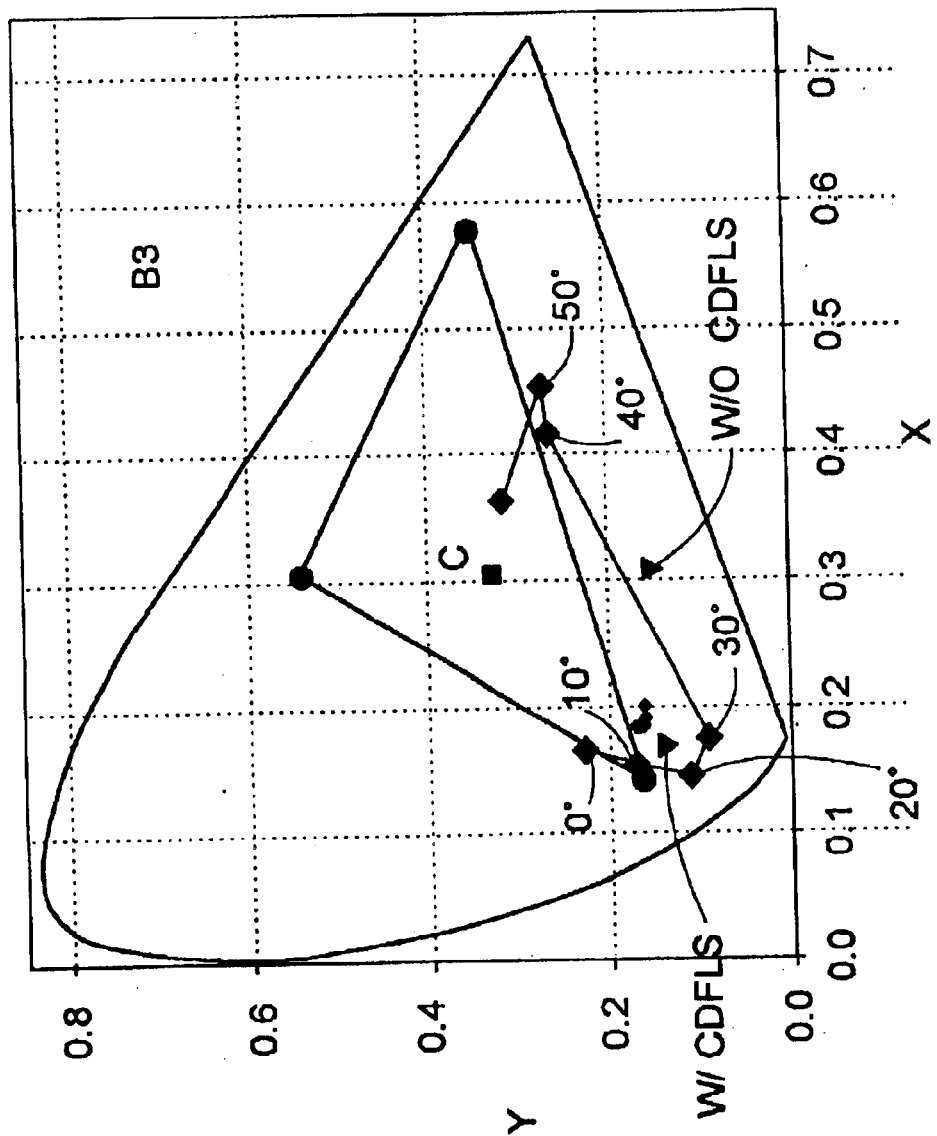
FIG. 7D1

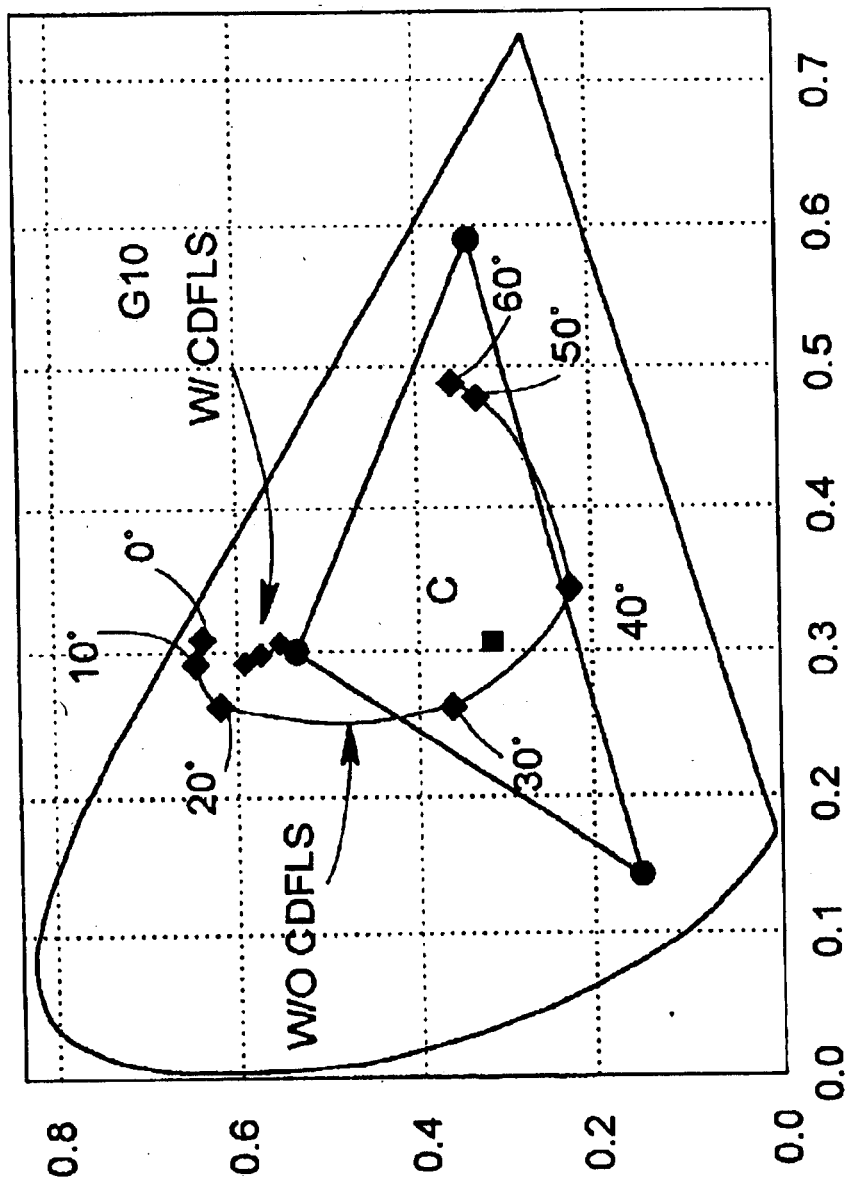
FIG. 7D2

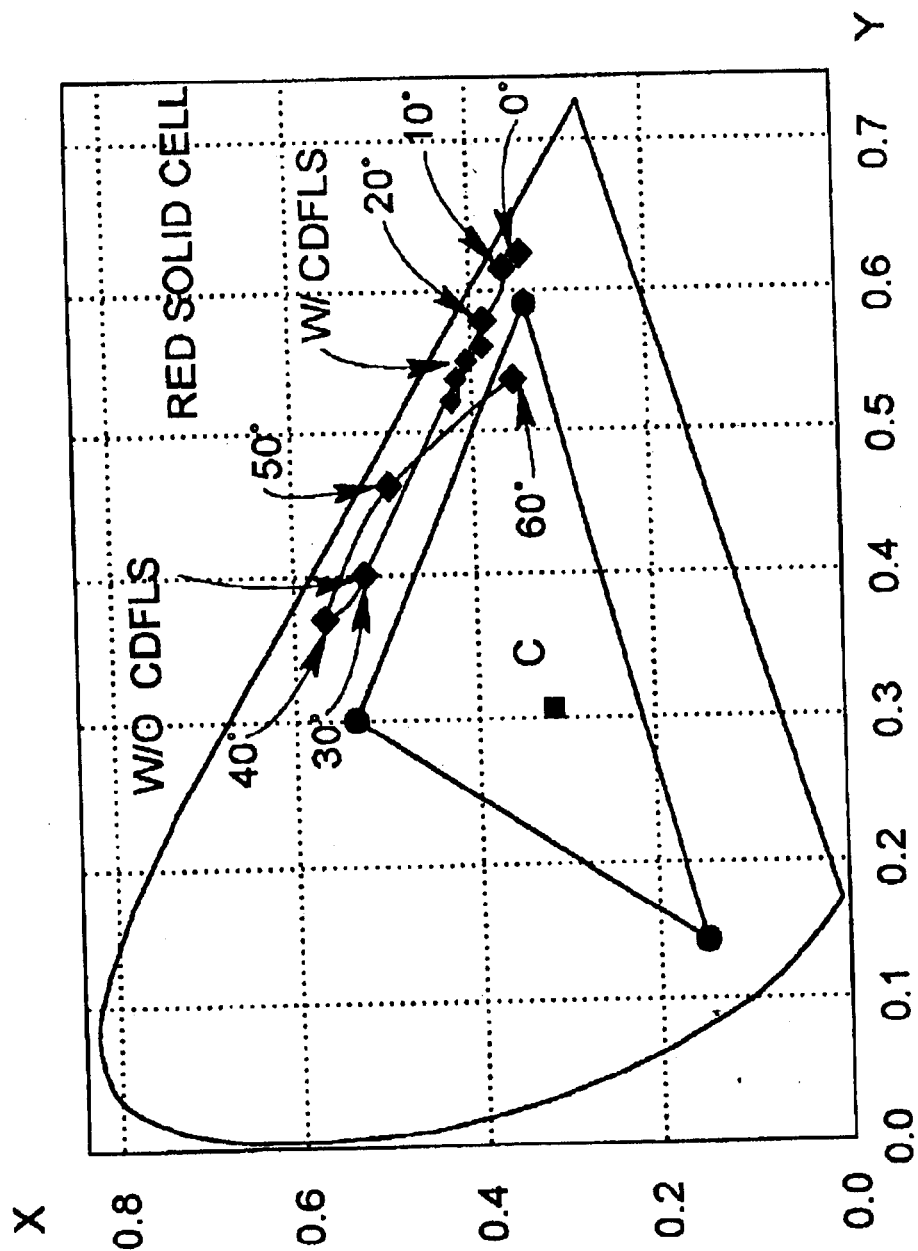
FIG. 7D3

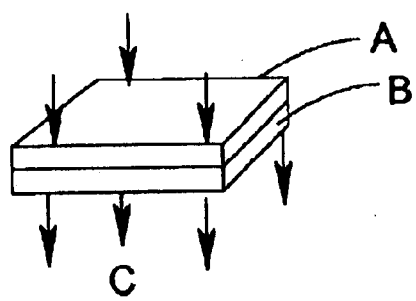
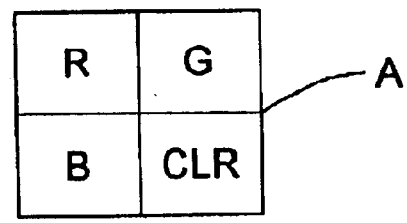
FIG. 8D1   FIG. 8D2
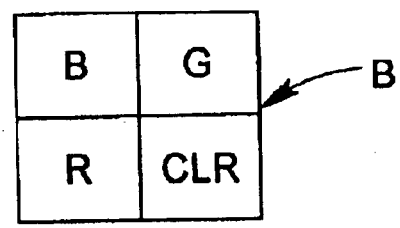
FIG. 8D3
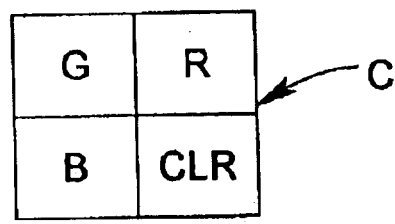
FIG. 8D4

| STEP | PROCESS | TARGET THICKNESS (μm) | METHOD | COMMENTS |
|---|---|---|---|---|
| 1 | CUT GLASS WITH BLACK MATRIX | | GLASS CUTTER | BLACK MATRIX IS A THIN PATTERNED SILVER LAYER |
| 2 | GLASS CLEARING | | ULTRASONIC BATH @ 40C | |
| 3 | COAT GLASS & BAKE WITH AN ALIGNMENT LAYER (PVA OR POLYIMIDE) | 0.1 | SPIN COATER & OVEN CURE | |
| 4 | ALIGN SURFACE LAYER | | MANUAL BUFFING | |
| 5 | PET SUBSTRATE CUTTING, CLEAN & BUFF | | CUTTER, ACETONE & BUFF CLOTH | |
| 6 | COAT CLC MIXTURE (LAYER #1) ON GLASS | 10 | KNIFE COATER @ 80C | REDUCE VISCOSITY BY HEATING |
| 7 | LAMINATE THE COATED GLASS SUBSTRATE TO PET | | LAMINATOR @ 60C | VARIATION IN GLASS THICKNESS CAN AFFECT CLC THICKNESS |
| 8 | HEAT SAMPLE TO GENERATE 1ST COLOR | | DIGITAL HOT PLATE | |
| 9 | MASK ALIGNMENT | | MASK ALIGNER AND REFLECTIVE MICROSCOPE | |
| 10 | EXPOSE CLC TO UV THROUGH MASK | | UV EXPOSURE SYSTEM | CROSSLINK CLC POLYMER AND POLYMERIZE 1ST COLOR |
| 11 | HEAT SAMPLE TO GENERATE 2ND COLOR | | DIGITAL HOT PLATE | |
| 12 | EXPOSE CLC TO UV | | UV EXPOSURE SYSTEM | CROSSLINK CLC POLYMER & POLYMERIZE 2ND COLOR (NO MASK NEEDED) |

FIG. 9A

| STEP | PROCESS | TARGET THICKNESS (μm) | METHOD | COMMENTS |
|---|---|---|---|---|
| 13 | INTERLAYER BARRIER | 1 | DIP AND SPIN COAT | PREVENT DIFFUSION OF 1ST CLC LAYER INTO 2ND LAYER |
| 14 | CURE INTERLAYER BARRIER | | UV EXPOSURE AND OVEN BAKE | |
| 15 | REPEAT STEPS 3 THRU 14 FOR 2ND CLC LAYER | 11.1 | | IN THE FUTURE IT MAY BE POSSIBLE TO HAVE ONLY A SINGLE CLC LAYER |
| 16 | DEPOSIT GLUE LAYER | 1 | SPIN COAT | |
| 17 | TRANSFER 1/4 WAVE TO CLC STACK | 5 | PEEL 1/4 WAVE FILM OFF OF GLASS SUBSTRATE | 1/4 WAVE IS FABRICATED ON A SEPARATE GLASS SUBSTRATE |
| 18 | CURE GLUE LAYER | | UV & OVEN BAKE | |
| 19 | INTERLAYER BARRIER | 1 | DIP & SPIN COAT | PREVENT DAMAGE TO 1/4 WAVE FROM SOLVENTS IN PASSIVATION LAYER |
| 20 | COAT TOP PASSIVATION | 2 | SPIN COAT | TOP PASSIVATION SHOULD ALSO PROVIDE PLANARIZATION |
| 21 | CURE PASSIVATION | | OVEN BAKE | |
| 22 | COAT ITO ON PASSIVATION | | PVD SPUTTERING | |
| 23 | COAT POLYMIDE LC ALIGMENT LAYER | | SPIN COAT & CURE (@ 230° FOR 1 HOUR) | |
| | TOTAL THICKNESS (μm) | 31.2 | | WITH A SINGLE CLC LAYER THE THICKNESS CAN BE REDUCED TO < 18 μm (SEE ATTACHED DRAWING) |

FIG. 9B

TOP LAYER

BOTTOM LAYER

TRANSMITTED PIXELS

TOP LAYER

BOTTOM LAYER

TRANSMISSIVE COLOR PIXELS

TOP LAYER

BOTTOM LAYER

TRANSMISSIVE COLOR PIXELS

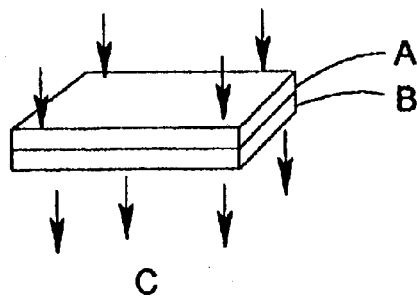
FIG. 21A
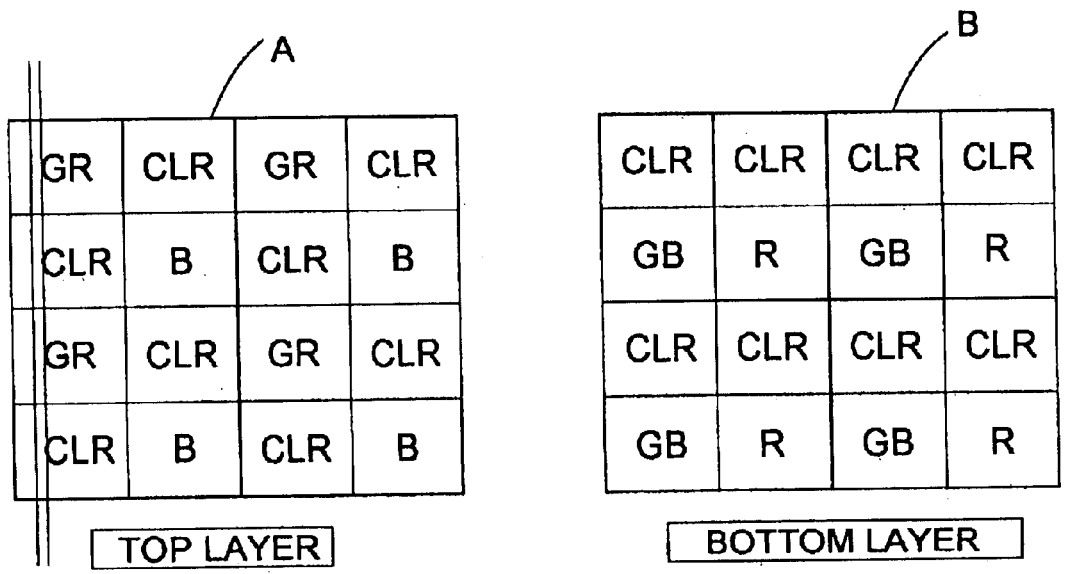
FIG. 21B
FIG. 21C
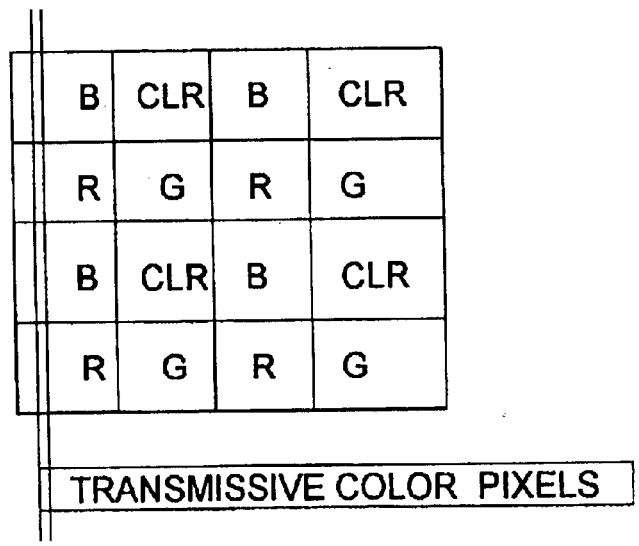
FIG. 21D

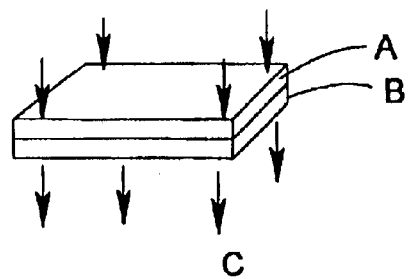
FIG. 23A
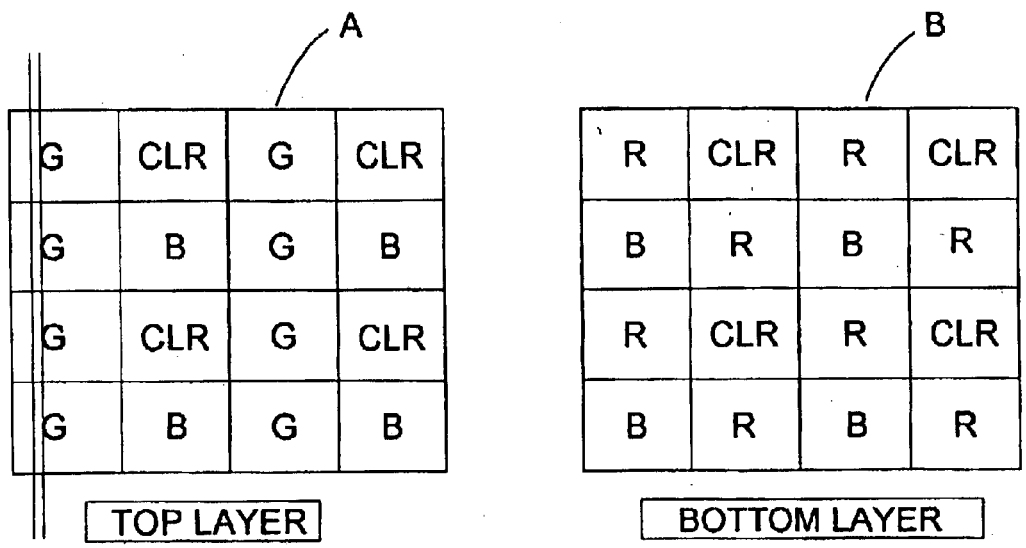
FIG. 23B
FIG. 23C
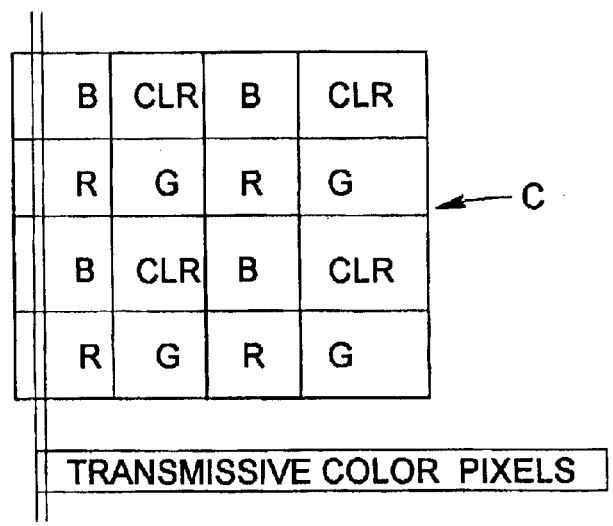
FIG. 23D

TOP LAYER

BOTTOM LAYER

TRANSMISSIVE COLOR PIXELS

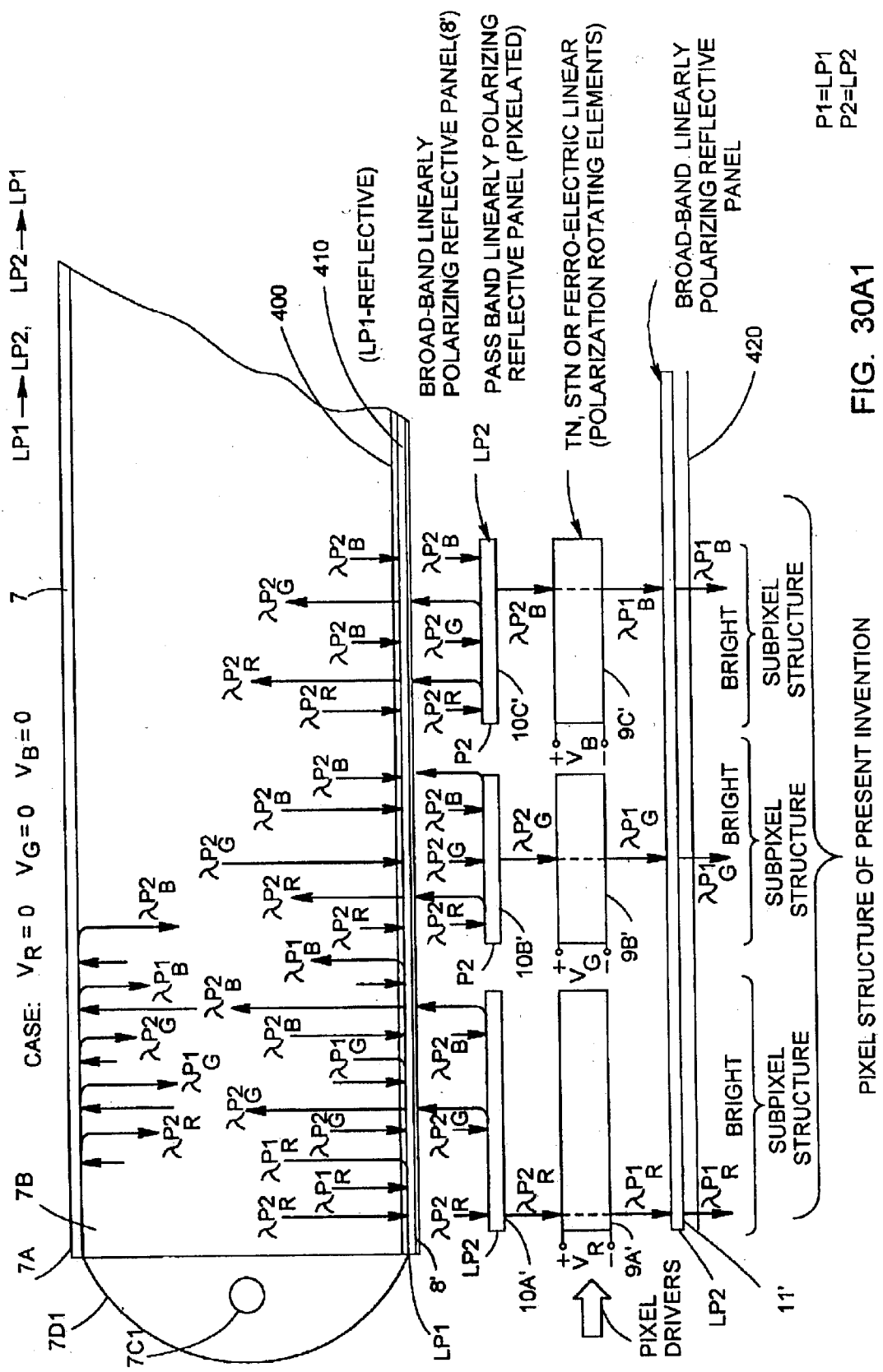
FIG. 30A1

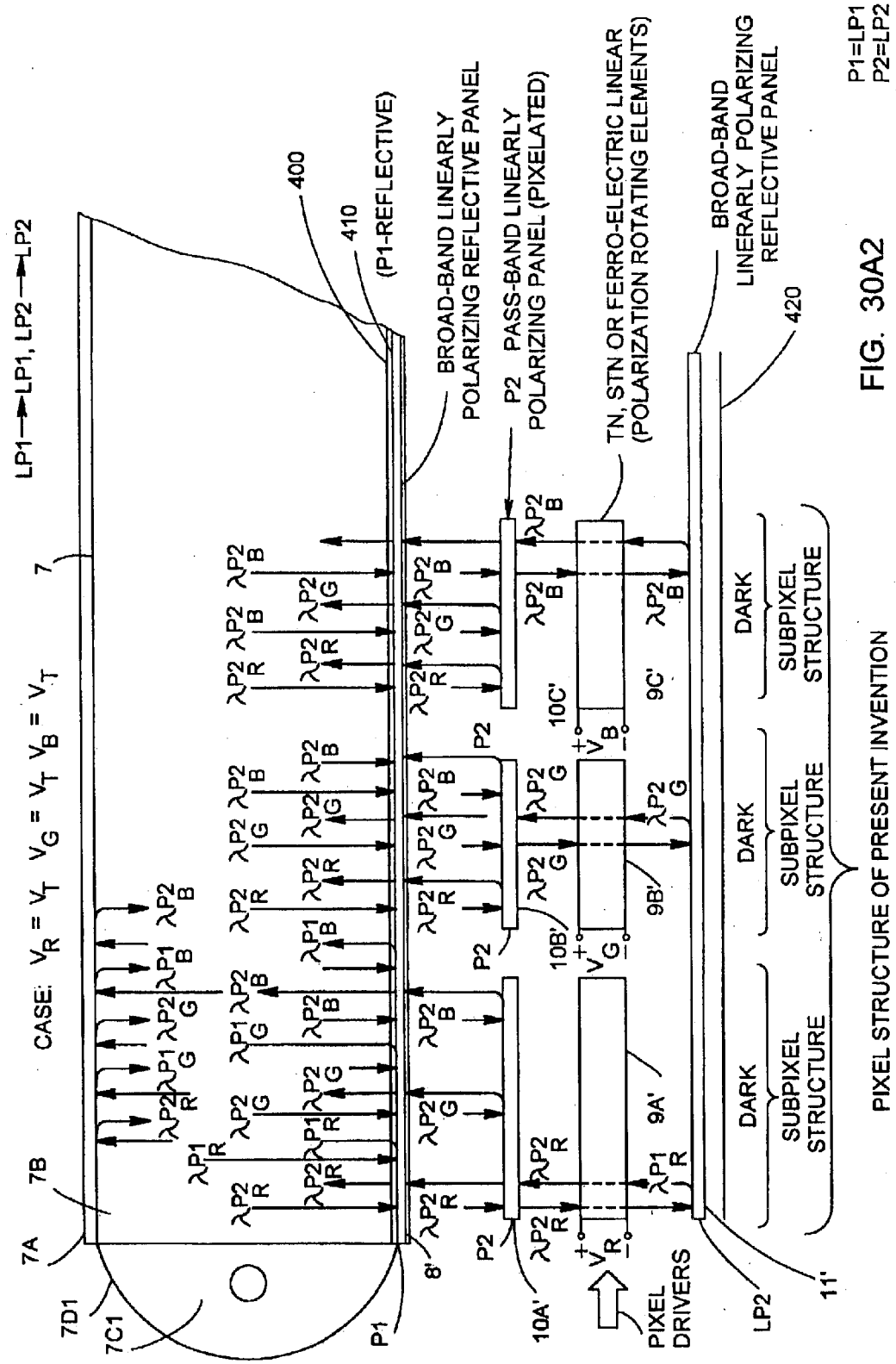
FIG. 30A2

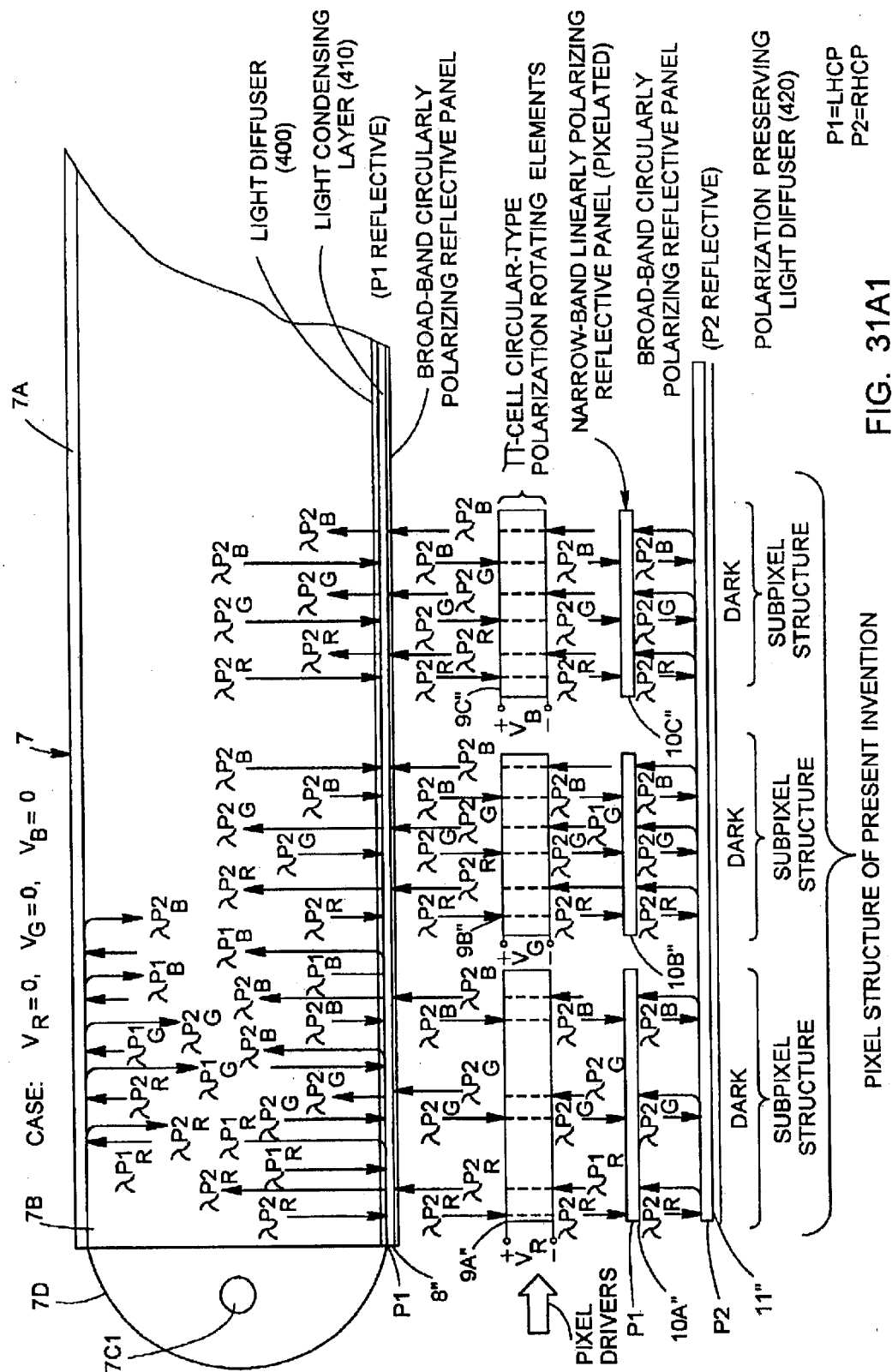
FIG. 31A1

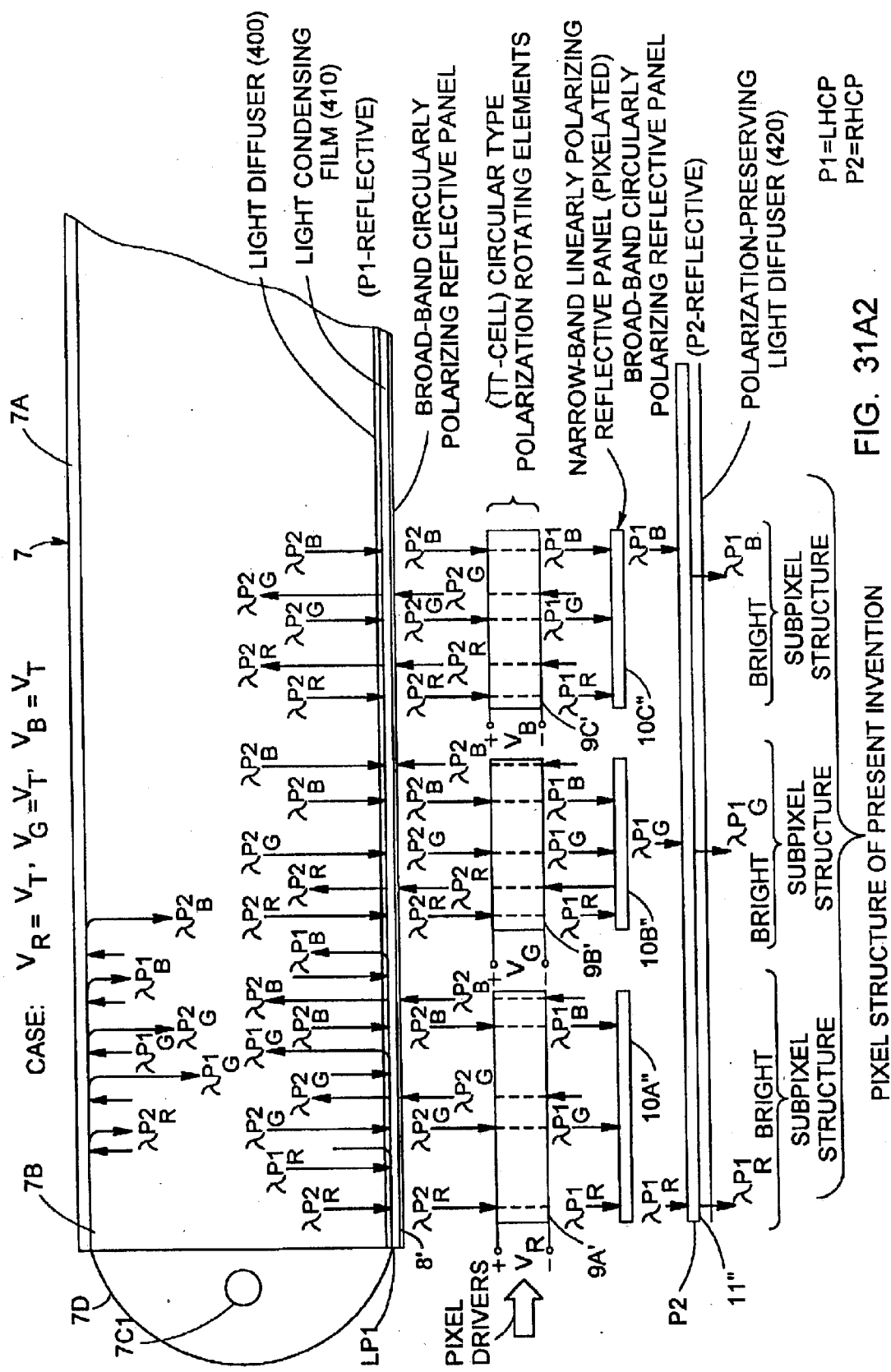
FIG. 31A2

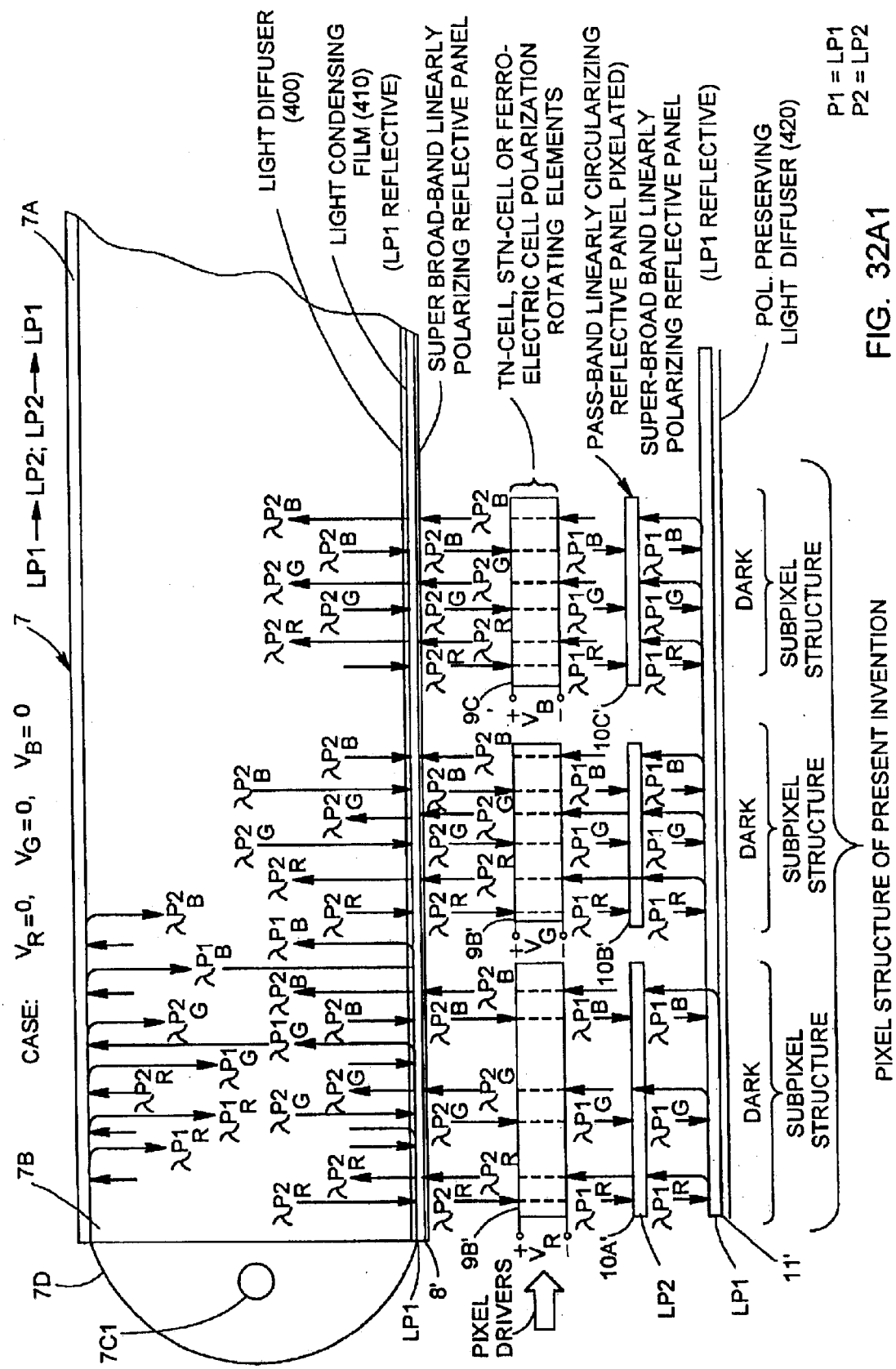
FIG. 32A1

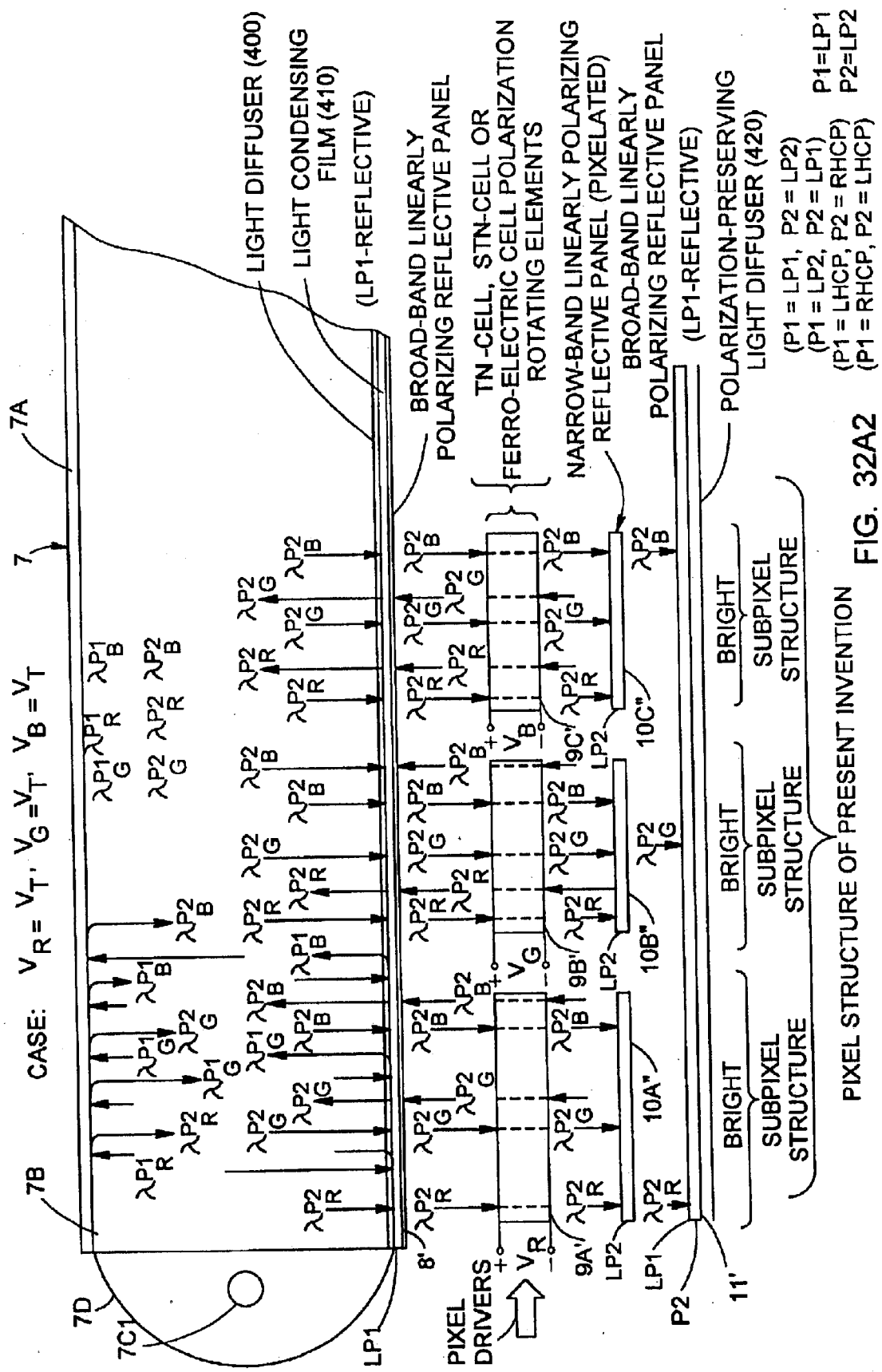
FIG. 32A2

HIGH-BRIGHTNESS COLOR LIQUID CRYSTAL DISPLAY PANEL EMPLOYING LIGHT RECYCLING THEREWITHIN

This application is a Divisional Application under 37 CFR 1.53(b) of U.S. Ser. No. 09/313,124 filed on May 17, 1999, now U.S. Pat. No. 6,573,961 which is a Continuation-in-Part of: U.S. Ser. No. 09/312,164 filed May 14, 1999; now U.S. Pat. No. 6,630,974 which is a Continuation-in-Part of U.S. Ser. No. 09/287,579 filed Apr. 6, 1999; which is a Continuation-in-Part of U.S. Ser. No. 09/032,302 filed Feb. 27, 1998; now U.S. Pat. No. 6,559,903 which is a Continuation-in-Part of U.S. Ser. No. 08/805,603 filed Feb. 26, 1997; now U.S. Pat. No. 5,940,150 which is a Continuation-of U.S. Ser. No. 08/739,467 filed Oct. 29, 1996; now U.S. Pat. No. 6,034,753 which is a Continuation-in-Part of U.S. Ser. No. 08/550,022 filed Oct. 30, 1995, now U.S. Pat. No. 5,691,789; which is a Continuation-in-Part of U.S. Ser. No. 08/787,282 filed Jan. 24, 1997; which is a Continuation-of U.S. Ser. No. 08/265,949 filed Jun. 27, 1994, now U.S. Pat. No. 5,599,412; which is a Divisional of Ser. No. 08/715,314 filed Sep. 16, 1996, now abandoned; which is a Divisional of Ser. No. 08/743,293 filed Nov. 4, 1996.

RELATED CASES

This Application is related to the following U.S. Applications: Copending application Ser. No. 09/312,164 entitled "Super-Wide-Angle Cholesteric Liquid Crystal Based Reflective Broadband Polarizing Films" by Hristina G. Galabova and Le Li, filed May 14, 1999; application Ser. No. 09/287,579 "Electro-Optical Glazing Structures Having Scattering And Transparent Modes Of Operation And Methods And Apparatus For Making The Same", by Le Li, Jian-Feng Li, and Sadeg M. Faris, filed Apr. 6, 1999; application Ser. No. 09/032,302 entitled "Electro-Optical Glazing Structures Having Reflection And Transparent Modes Of Operation", by Sadeg M. Faris, Le Li and Jian-Feng Li, filed Feb. 27, 1998; application Ser. No. 08/890,320 entitled "Coloring Media Having Improved Brightness And Color Characteristics" by Sadeg M. Faris and Le Li, filed Jul. 9, 1997; application Ser. No. 08/891,877 entitled "Reflective Film Material Having Symmetrical Reflection Characteristics And Method And Apparatus For Making The Same" by Sadeg M. Faris and Le Li, filed Jul. 9, 1997; application Ser. No. 08/805,603 entitled "Electro-Optical Glazing Structures Having Total-Scattering And Transparent Modes Of Operation For Use In Dynamical Control Of Electromagnetic Radiation" filed Feb. 26, 1997; application Ser. No. 08/787,282 entitled "Cholesteric Liquid Crystal Inks" by Sadeg M. Faris filed Jan. 24, 1997; application Ser. No. 08/739,467 entitled "Super Broadband Reflective Circularly Polarizing Material And Method Of Fabricating And Using Same In Diverse Applications", by Sadeg M. Faris and Le Li, filed Oct. 29, 1996; application Ser. No. 08/715,314 entitled "High-Brightness Color Liquid Crystal Display Panel Employing Systemic Light Recycling" by Sadeg M. Faris, filed Sep. 16, 1996; application Ser. No. 08/550,022 entitled "Single Layer Reflective Super Broadband Circular Polarizer and Method of Fabrication Therefor" by Sadeg M. Faris and Le Li filed Oct. 30, 1995, now U.S. Pat. No. 5,691,789; application Ser. No. 08/265,949 entitled "Method And Apparatus For Producing Aligned Cholesteric Liquid Crystal Inks" by Sadeg M. Faris filed Jun. 27, 1994, now U.S. Pat. No. 5,599,412; application Ser. No. 07/798,881 entitled "Cholesteric Liquid Crystal Inks" by Sadeg M. Faris filed Nov. 27, 1991, now U.S. Pat. No. 5,364,557; application Ser. No. 08/322,219 entitled "Backlighting Construction For Use In Computer-Based Display Systems Having Direct And Projection Viewing Modes Of Operation" by Sadeg M. Faris and Carl Tung, filed Oct. 13, 1994, now U.S. Pat. No. 5,801,793; which is a Continuation-in-Part of application Ser. No. 08/230,779 entitled "Electro-Optical Backlighting Panel For Use In Computer-Based Display Systems And Portable Light Projection Device For Use Therewith" by Sadeg M. Faris, filed Apr. 21, 1994, now U.S. Pat. No. 5,828,427; which is a Continuation-in-Part of application Ser. No. 08/126,077 entitled "Electro-Optical Display System For Visually Displaying Polarized Spatially Multiplexed Images Of 3-D Objects For Use In Stereoscopically Viewing The Same With High-Image Quality And Resolution" by Sadeg M. Faris filed Sep. 23, 1993, now U.S. Pat. No. 5,537,144; which is a Continuation of application Ser. No. 07/536,190 entitled "A System For Producing 3-D Stereo Images" by Sadeg M. Faris, filed Jun. 11, 1990, now abandoned; each said Application being commonly owned by Reveo, Inc., and incorporated herein by reference in its entirety.

BACKGROUND OF INVENTION

1. Technical Field

The present invention relates to a high-brightness color liquid crystal display (LCD) panel with improved image contrast employing non-absorptive spectral filtering, light recycling among neighboring subpixels and ambient glare reduction, and also to methods and apparatus for manufacturing the same.

2. Brief Description of The Prior Art

Without question, there is a great need for flat display panels capable of displaying video imagery in both direct and projection modes of viewing. Examples of equipment requiring such display structures for direct viewing include notebook computers, laptop computers, and palmtop computers, and equipment requiring such display structures for projection viewing include LCD projection panels and LCD image projectors.

In general, prior art color LCD display panels have essentially the same basic construction in that each comprises the following basic components, namely: a backlighting structure for producing a plane of uniform intensity backlighting; an electrically-addressable array of spatial-intensity modulating elements for modulating the spatial intensity of the plane of backlight transmitted therethrough; and an array of color filtering elements in registration with the array of spatial intensity modulating elements, for spectral filtering the intensity modulated light rays transmitted therethrough, to form a color image for either direct or projection viewing. Examples of such prior art LCD panel systems are described in "A Systems Approach to Color Filters for Flat-Panel Displays" by J. Hunninghake, et al, published in SID 94 DIGEST (pages 407–410), incorporated herein by reference.

In color LCD panel design, the goal is to maximize the percentage of light transmitted from the backlighting structure through the color filtering array. However, using prior art design techniques, it has been impossible to achieve this design goal due to significant losses in light transmission caused by the following factors, namely: absorption of light energy due to absorption-type polarizers used in the LCD panels; absorption of light reflected off thin-film transistors (TFTs) and wiring of the pixelated spatial intensity modulation arrays used in the LCD panels; absorption of light by pigments used in the spectral filters of the LCD panels;

absorption of light energy by the black-matrix used to spatially separate the subpixel filters in the LCD panel in order to enhance image contrast; and Fresnel losses due to the mismatching of refractive indices between layers within the LCD panels. As a result of such design factors, the light transmission efficiency of prior art color LCD panels is typically no more than 5%. Consequently, up to 95% of the light produced by the backlighting structure is converted into heat across the LCD panel. Thus, it is impossible to produce high brightness images from prior art color LCD panels used in either direct or projection display systems without using ultra-high intensity backlighting sources which require high power supplies, and produce great amounts of heat necessitating cooling measures and the like.

The light transmission efficiency of prior art LCD panels has been severely degraded as a result of the following factors: absorption of light energy due to absorption-type polarizers used in the LCD panels; absorption of light reflected off thin-film transistors (TFTs) and wiring of the pixelated spatial intensity modulation arrays used in the LCD panels; absorption of light by pigments used in the spectral filters of the LCD panels; absorption of light energy by the black-matrix used to spatially separate the subpixel filters in the LCD panel in order to enhance image contrast; and Fresnel losses due to the mismatching of refractive indices between layers within the LCD panels. As a result of such light energy losses, it has been virtually impossible to improve the light transmission efficiency of prior art LCD panels beyond about 5%.

In response to the shortcomings and drawbacks of prior art color LCD panel designs, several alternative approaches have been proposed in order to improve the light transmission efficiency of the panel and thus the brightness of images produced therefrom.

For example, U.S. Pat. No. 5,822,029 entitled "Illumination System and Display Device" discloses a LCD panel construction comprising a broad-band CLC reflective polarizer (32) disposed between the backlighting structure (10, 12, 30 and 34) and a reflective color filtering structure (18) made from a pair of cholesteric liquid crystal (CLC) film layers, as shown in FIGS. 1A and 1B of the accompanying Drawings which are identical to FIGS. 5 and 6 in U.S. Pat. No. 5,822,029. As shown in FIG. 1A, the reflective color filter structure (18) has a first layer with portions which reflect red, green and blue light while transmitting other colors, and a second layer identical to the first layer but out of alignment therewith so that each region of the spectral filter transmits only one color of light from the light source of backlighting structure, illustrated in FIG. 1C, while all other colors are reflected back towards the backlighting structure. During operation, the spectral components which are not transmitted through its respective subpixel structure, are reflected back through the broad-band CLC reflective polarizer (32) and recycled within the backlighting structure, after polarization state conversion in order to improve the light transmission efficiency of the LCD panel and thus the output brightness thereof.

In order to recycle light striking the TFT areas and wiring regions associated with each subpixel region on the LCD panel, U.S. Pat. No. 5,822,029 discloses the use of a reflective-type black matrix about the transmission apertures of the subpixels, realized by placing a reflective material (K) and a quarter-wave film (36 and 38) on a substrate attached to the layers of CLC reflective material, as shown in FIG. 1B.

In order to improve the viewing angle of the LCD panel, U.S. Pat. No. 5,822,029 also discloses in Col. 4, at lines 29–50 thereof, that a collimated light source may be used so that light emitted by the light source will fall within the angular acceptance bandwidth of the broad-band CLC polarizer (32), While U.S. Pat. No. 5,822,029 discloses an LCD panel construction having the above-described improvements, this prior art LCD panel system nevertheless suffers from a number of significant shortcomings and drawbacks.

For example, the manufacturing of CLC layers having three color regions or sections is quite difficult because of the limited dynamic range in color tuning afforded by the CLC manufacturing techniques disclosed in U.S. Pat. No. 5,822,029 and other prior art references.

Adding the reflective-type black matrix pattern to the CLC spectral filter structure increases the complexity of the display system and adds to the overall cost of the display which must be minimized for low-cost consumer product applications.

While recommending the use of light collimation techniques to ensure that the incident upon the spectral filter falls within the angular acceptance bandwidth of its CLC material, U.S. Pat. No. 5,822,029 fails to disclose, teach or suggest practical ways of achieving this requirement of CLC material, nor even recognizes in the slightest way the fact that non-collimated light falling on the broad-band CLC reflective polarizer (32) results in significant polarization distortion, as illustrated in FIGS. 1D through 1H.

While U.S. Pat. No. 5,822,029 discloses the use of CLC-based spectral filters for improved light recycling within a LCD panel, the methods taught therein necessarily result in CLC films having narrow bandwidths which limited their usefulness in creating practical color (i.e. spectral) filter structures for use in LCD panels. While U.S. Pat. No. 5,822,029 discloses a technique of increasing the bandwidth of the cholesteric liquid crystal material by providing a plurality of different pitches in each portion of the material (e.g. use a thermochromic material and vary its temperature while applying ultraviolet light to fix the material), this method is difficult to use in practice and does not produce good results because the bandwidth of the reflective materials is limited to about 80 nm. Applicants have discovered that for good results, a bandwidth of at least 100 nm is required for CLC-based spectral filters.

The CLC-based spectral filters disclosed in U.S. Pat. No. 5,822,029 do not have a sufficiently broad enough spectral bandwidth to reflect all the light needed to made a good quality color reflective filter. Also, since the reflective bandwidth is not large enough in U.S. Pat. No. 5,822,029, only one color at a time can be reflected, thereby requiring that prior art CLC-based spectral filters have at least three color reflecting sections per CLC layer, for a two layers CLC spectral filter structure.

In summary, while it is well known to use CLC-based spectral filters and CLC reflective polarizers within color LCD panel assemblies to improve the brightness of images displayed therefrom, prior art CLC-based LCD panels suffer from several shortcomings and drawbacks relating to: (1) color changes due to viewing angle; (2) controlling the bandwidth of the spectral components to be reflected within the panel for recycling; (3) difficulty in tuning the color-band of spectral components to be transmitted to the viewer for display; (4) difficulty in achieving high contrast between the spectral components in different color bands; (5) difficulty in making CLC-based spectral filter layers which result in spectral filters having high color purity and a broad color gamut; and (6) realizing a reflective-type black matrix which is inexpensive and does not increase the complexity of the system.

Thus, there is a great need in the art for an improved color LCD panel which is capable of producing high brightness color images without the shortcomings and drawbacks of the prior art LCD panel devices.

OBJECTS AND SUMMARY OF THE PRESENT INVENTION

Accordingly, a primary object of the present invention is to provide an improved color LCD panel capable of producing high brightness color images, while avoiding the shortcomings and drawbacks of prior art techniques.

Another object of the present invention is to provide such a color LCD panel, in which the spatial-intensity modulation and spectral (i.e. color) filtering functions associated with each and every subpixel structure of the LCD panel are carried out using systemic light recycling principles which virtually eliminate any and all absorption or dissipation of the spectral energy produced from the backlighting structure during color image production.

Another object of the present invention is to provide such a color LCD panel, in which image contrast enhancement is achieved through the strategic placement of broad-band absorptive-type polarization panels within the LCD panel.

Another object of the present invention is to provide such a color LCD panel, in which glare due to ambient light is reduced through the strategic placement of a broad-band absorptive-type polarization panel within the LCD panel.

Another object of the present invention is to provide such a color LCD panel, in which a single polarization state of light is transmitted from the backlighting structure to the section of the LCD panel along the projection axis thereof, to those structure or subpanels where both spatial intensity and spectral filtering of the transmitted polarized light simultaneously occurs on a subpixel basis in a functionally integrated manner. At each subpixel location, spectral bands of light which are not transmitted to the display surface during spectral filtering, are reflected without absorption back along the projection axis into the backlighting structure where the polarized light is recycled with light energy being generated therewith. The recycled spectral components are then retransmitted from the backlighting structure into section of the LCD panel where spatial intensity modulation and spectral filtering of the retransmitted polarized light simultaneously reoccurs on a subpixel basis in a functionally integrated manner.

Another object of the present invention is to provide such a color LCD panel, in which the spatial-intensity modulation and spectral filtering functions associated with each and every subpixel structure of the LCD panel are carried out using the polarization/wavelength dependent transmission and reflection properties of CLC-based filters.

Another object of the present invention is to provide such a color LCD panel having a multi-layer construction with multiple optical interfaces, at which non-absorbing broad-band and pass-band (i.e. tuned) polarizing reflective panels are used to carryout systemic light recycling within the LCD panel such that light produced from the backlighting structure is transmitted through the LCD panel with a light transmission efficiency of at least %90.

Another object of the present invention is to provide a novel LCD panel, in which both non-absorbing broad-band and pass-band (i.e. tuned) polarizer filters are used to avoid absorbing or dissipating any of the spectral energy produced from the backlighting structure during image production in order that high-brightness images can be produced using low-intensity backlighting structures.

Another object of the present invention is to provide such a color LCD panel, in which an array of pass-band CLC polarizing filter elements and an array of electrically-controlled liquid crystal elements are disposed between a pair of broad-band CLC polarizing filter panels used to realize the LCD panel.

Another object of the present invention is to provide such a color LCD panel, in which the spectral components of light produced from the backlighting structure are recycled (i) between the spectral filtering array and the backlighting structure, (ii) within the backlighting structure itself, and (iii) among adjacent subpixels within the LCD panel in order to improve the overall light transmission efficiency of the LCD panel.

Another object of the present invention is to provide such a color LCD panel, in which the array of liquid crystal elements can be realized using an array of electrically-controlled birefringent (ECB) elements which rotate the linear polarization state of the transmitted light, or invert the polarization state of circularly polarized light being transmitted through the LCD panel.

Another object of the present invention is to provide such a color LCD panel, in which the backlighting structure thereof can be realized using a light guiding panel based on the principle of total internal reflection, a holographic diffuser based on the principle of refractive index matching and first order diffraction, or other suitable edge-lit backlighting structure which follows in general accordance with the physical principles of the present invention.

Another object of the present invention is to increase the brightness of a LCD panel.

Another object of the present invention is to match the color of the cholesteric color filters in a display to the light input color distribution for effective color separation.

Another object of the present invention is to provide a reflective cholesteric liquid crystal (CLC) color filter with only two different color portions in each CLC layer.

Another object of the present invention is to provide a reflective color filter made from cholesteric liquid crystals that transmits red, green and blue light from different pixels with a two layer configuration, where each layer has only two reflection bandwidths.

Another object of the present invention is to provide a reflective-type spectral filter structure for use in display panels, in which the contrast between the colors is significantly improved.

Another object of the present invention is to provide a reflective-type color filter structure having a black matrix structure which is realized by overlapping two layers of reflective color filters.

Another object of the present invention is to provide a reflective-type color filter wherein each pixel structure contains red, green, blue and transparent sub-pixels.

Another object of the present invention is to provide cholesteric liquid crystal reflective color filter structure which transmits desired colors of light having any polarization.

Another object of the present invention is to eliminate the quarter-wave plate in a reflective color filter display.

Another object of the present invention is to provide an easier way of and means for making reflective Cholesteric Liquid Crystal color filters.

Another object of the present invention is to provide a reflective-type color filter having a patterned color section of increased size achieved by using only two colors per layer without losing the display resolution.

Another object of the present invention is to provide an improved method of making reflective-type color filters, in which the boundary effects of pixels are reduced by having larger size patterned color sections per layer.

Another object of the present invention is to provide an improved method of tuning color filters to the desired center wavelength and bandwidth for better color control.

Another object of the present invention is to provide a reflective-type color filter which eliminates the need for a separate layer to create a black matrix.

Another object of the present invention is to provide a method of making reflective color filters in a cost-reductive method.

Another object of the present invention is to provide reflective color filters having improved performance characteristics.

Another object of the present invention is to provide a reflective-type color filter structure made from layers of pitch gradient broadband reflective cholesteric liquid crystal materials with different central bandwidths.

Another object of the present invention is to provide an improved method of reliably and cost effectively producing broadband reflective cholesteric liquid crystal filter structures having different central bandwidths.

Another object of the present invention is to provide an improved reflective-type color filter structure having layers of reflective cholesteric liquid crystal materials with two separate portions having two separate bandwidths and central wavelengths.

Another object of the present invention is to provide a reflective-type color filter, wherein a layer of cholesteric liquid crystal materials employed therein reflects a different band of wavelengths around a different central wavelength.

Another object of the present invention is to provide a method of making such a reflective-type color filter wherein one half of a layer of CLC material is exposed to UV light which is absorbed by attenuation in the cholesteric liquid crystal materials by the time it is one half way through the layer, thus polymerizing one half of the layer.

Another object of the present invention is to provide an improved method of making a reflective-type cholesteric liquid crystal color filter wherein two different bandwidths of light are reflected in the top portion of the layer and one bandwidth of light is reflected in the bottom portion of the layer.

Another object of the present invention is to provide an improved method of making a reflective-type color filter, wherein there is no need to align and glue together layers of reflective-type CLC materials required by prior art methodologies.

Another object of the present invention is to provide an improved method of stacking several different polymerized states of cholesteric liquid crystal materials in one layer material.

Another object of the present invention is to provide a reflective-type color filter structure having a quarter-wave plate integrally formed with a reflective-type cholesteric liquid crystal color filter layer.

Another object of the present invention is to provide a reflective-type polarizer integrally formed with the reflective cholesteric liquid crystal color filter layer.

Another object of the present invention is provide a method of stacking multiple portions of polymerized cholesteric liquid crystal materials with different properties in each portion in one layer of cholesteric liquid crystal material.

Another object of the present invention is to provide novel material recipes for creating the reflective-type color filter structures made from the cholesteric liquid crystal that transmits red, green and blue light components from different sub-pixels within a two-layer configuration wherein each such layer has only two reflection bandwidths.

Another object of the present invention is to provide an improved method of making the reflective-type color filter structures using a two-layer configuration, wherein each layer has only two reflective bandwidths and contains cholesteric liquid crystals that transmits red, green and blue from different subpixel regions.

Another object of the present invention is to provide a color display panel capable of polarizing unpolarized incident light in reflection mode for a large bandwidth of light over a wide range of incident angles.

Another object of the present invention is to provide a color display panel capable of polarizing unpolarized incident light in transmission mode for a wide range of angles and a large bandwidth.

Another object of the present invention is to provide a color display panel capable of analyzing circularly polarized light for a wide range of angles and a large bandwidth of light in reflection mode.

Another object of the present invention is to provide a color display panel capable of analyzing circularly polarized incident light in transmission mode for a wide range of angles and a large bandwidth of light.

Another object of the present invention is to provide a color display panel capable of transmitting broadband polarized light without spectral distortions for a large range of angles.

Another object of the present invention is to provide a color display panel that compensates for color changes occasioned when using reflective-type CLC polarizers.

Another object of the present invention is provide a color display panel that compensates for the elliptical distortion of circularly polarized light caused by cholesteric liquid crystals when incident light is transmitted therethrough at large viewing angles.

Another object of the present invention is to provide a color display panel that compensates for the spectral distortion of circularly polarized light caused by cholesteric liquid crystals when incident light is transmitted therethrough at large viewing angles.

Another object of the present invention is to provide a color display panel that compensates for the elliptical distortion in circularly polarized light caused by cholesteric liquid crystals when the light is transmitted therethrough at large incident angles.

Another object of the present invention is to provide a color display panel that compensates for the color distortions associated with polarization distortion in circularly polarized light caused by cholesteric liquid crystals when the light is transmitted therethrough at large incident angles.

Another object of the present invention is to provide a color display panel that automatically compensates for the severe degradation in polarization behavior in circularly polarized light that occurs when such light is transmitted at large incident angles through CLC-based broadband polarizers employed in the color display device.

As a result of the present invention, improved LCD panels can now be made having reflective-type color filters which offer significant advantages over absorptive color filters in that they reflect light for recycling in the system rather than convert the light to unwanted heat as absorptive color filters do. Such a reflective color filter system can enhance the brightness of the display and reach near 100% utilization efficiency. The improved efficiency derives from using reflective-type color filters which reflect light within the system for recycling purposes rather than absorbing light therewithin as occurs in prior art LCD panels.

By using the reflective color filters of the present invention, the brightness of the LCD display is increased, the cooling systems required by prior art color display devices to expel waste heat are eliminated, the power consumption is reduced allowing for smaller batteries and longer life per charge while the weight and size of the display is reduced and its cost is lowered.

In order to make simpler reflective color filters to transmit red, green, and blue for pixels in a display, an novel architecture for having two color reflecting portions per layer has been devised. In one embodiment only one film layer is needed because two colors can be reflected by the same film layer when the top part of the layer reflects one color of light and the bottom part of the film is tuned to reflect another color of light.

In another embodiment of the present invention, image displays are provided having three primary colors for color images, arrays of pixels, each with three sub-pixels for transmitting blue, red and green light. With a two layer system blue and green reflective layers transmit red light, blue reflective layers transmit green light, and green and red reflective layers transmit blue light. Clear sub-pixels transmit all components of light incident thereon. The clear sub-pixels can be tuned to reflect ultraviolet and infrared components of light as applications may require.

In other embodiments of the present invention, if a portion of a broadband layer reflecting blue and green light is paired with a portion of a layer which is clear, then red light is transmitted. When a portion of a broadband layer reflecting green and red light is paired with a portion of a layer which is clear then blue light is transmitted. When a portion of a layer which is blue light reflecting is paired with a portion of a layer which is red light reflecting, green light is transmitted. When the green and red light portion reflecting in one layer overlaps part of the blue light portion reflecting and part of the blue and green light portion reflecting in the other layer, then a black matrix is formed in the overlapping portion.

The bandwidth of the reflective cholesteric liquid crystals is controllable for wide bandwidths by using a pitch gradient tuning. Using this method layers of cholesteric liquid crystals reflecting adjacent colors such as both blue and green light and both green and red light are used to precisely tune the colors of light reflected and transmitted by the display. Using the wider bandwidths allows layers with two color reflecting portions per layer to be constructed instead of three color portions per layer as in the prior art.

When left handed and right handed CLC color filters having the same structure are both used, white incident light of any type polarization on the pixels is converted to red, green, and blue light without polarization state distortion. This color filter works for all polarizations of light, e.g. linear, circular and even unpolarized light. When linearly polarized light is incident on such color filters which are used in conjunction with conventional twist nematic or super twist nematic in liquid crystal displays, the need for a quarter wave plate that converts circularly polarized light to linear light is eliminated. This simplifies the display system, makes fabrication easier, reduces the cost, removes the color chromaticity problem associated with the limited bandwidth of the wave plate, and increases the displays contrast ratio by eliminating light losses due to quarter wave plate bandwidth limitations.

If only a left handed or a right handed circularly polarized light is transmitted from the color filters, then a quarter wave plate can be used to make the light linearly polarized for use in displays in conjunction with twisted nematic cells and a linear analyzer so as to turn the transmitted light on and off from the viewer.

A black matrix of one form or another is necessary in all the liquid crystal displays (LCD). The novel black matrix structure used in the reflective system is formed by using overlapping reflective color filters to reflect all incident light. Therefore no added layers of reflective materials or light absorbing blocking masks are necessary to create the black matrix structure of the present invention.

In accordance with the present invention, the portion of the layer having the same reflective color is enlarged by arranging sub-pixels with like color portions adjacent to other sub-pixels producing the same colors, so as to provide larger easier-to-make color portions on each layer. This reduces the cost of manufacture of the LCD panel of the present invention.

Another object of the present invention is to provide an improved LCD panel, wherein a polarization preserving diffuser and a light collimator are arranged in order to increase the viewing angle of the LCD panel while keeping the color distortion produced by the color filter structure to a minimum level.

These and other objects of the present invention will become apparent hereinafter and in the claims to Invention.

BRIEF DESCRIPTION OF THE DRAWINGS

Other objects, advantages and novel features of the present invention will become apparent from the following Detailed Description Of The Invention when considered in conjunction with the accompanying Drawings, wherein:

FIG. 1A is a schematic representation of the prior art CLC-based LCD panel assembly disclosed in FIG. 4 of U.S. Pat. No. 5,822,029;

FIG. 1B is a schematic representation of the prior art CLC-based spectral filtering structure shown in FIG. 5 of U.S. Pat. No. 5,822,029, wherein a quarter-wave retardation film is applied to a broad-band reflective polarizing pattern applied to a dual-layer CLC spectral filter structure, in order to reflect and recycle light off the TFT, wiring and other non-aperture surface areas of an LCD panel used in conjunction with the prior art illumination system of FIG. 1A;

FIG. 2B1 is an enlarged view of a subsection of the CLC-based CLD panel assembly shown in FIG. 2B;

FIG. 2B2 is a cross-sectional schematic diagram showing in greater detail the quasi-collimating (i.e. condensing) film layer disposed between the light diffusive layer (for ensuring uniform spatial light intensity across the LCD panel) and the broad-band CLC-based reflective polarizer employed in the LCD panel assembly of FIG. 2;

FIG. 3A1 is a schematic representation of an exploded, cross-sectional view of an exemplary pixel structure within the LCD panel of FIG. 2, wherein the spatial-intensity modulating elements of the LCD panel are realized using circular-type polarization rotating elements, and the pixel driver signals provided thereto are selected to produce "bright" output levels at each of the RGB subpixels of the exemplary pixel structure;

FIG. 3A2 is a schematic representation of an exploded, cross-sectional view of an exemplary pixel structure within the second particular embodiment of the LCD panel of FIG. 2, wherein the spatial-intensity modulating elements of the LCD panel are realized using circular-type polarization rotating elements, and the pixel driver signals provided thereto are selected to produce "dark" output levels at each of the RGB subpixels of the exemplary pixel structure;

FIG. 5B1 is a schematic cross-sectional diagram of the two-layer CLC-based spectral filtering structure of the first illustrative embodiments of the present invention, wherein each blue subpixel structure therein is realized by a green-band reflecting region in the first CLC layer and a red band reflecting region in the second CLC layer, wherein each green subpixel structure therein is realized by a blue band reflecting region in the first CLC layer and a red band reflecting region in the second CLC layer, wherein each red subpixel structure therein is realized by a blue band reflecting region in the first CLC layer and a green-band reflecting region in the second CLC layer, and wherein a patterned broad-band CLC reflective layer is provided beneath the first CLC layer in order to realize the broad-band inter-subpixel "white" reflective matrix-like pattern between neighboring subpixel regions; in order to improve light recycling off the TFT and associated wiring regions surrounding the light transmission aperture of each and every subpixel realized the liquid crystal (LC) spatial-intensity modulation panel of the LCD panel assembly of FIG. 2;

FIG. 5B2 is a schematic representation of an exemplary broad-band inter-subpixel "white" matrix-like pattern formed about a single pixel structure (comprising a red, green and blue subpixel structure) disposed beneath the lower CLC-filter layer of the CLC-based spectral filtering structure shown in FIG. 5B1;

FIG. 5C is a schematic representation illustrating the spatial layout of an array of pixel structures, as depicted in FIGS. 5B1 and 5B2, in exemplary embodiment of the LCD panel assembly of FIG. 2;

FIG. 7A is a chromaticity diagram for an actual LCD panel assembly constructed in accordance with FIGS. 2 through 5C using the CLC-based spectral filtering structure specified by the spectral reflection and transmission characteristics shown in FIGS. 6A through 6J, indicating the color coordinates (CC) of a sample pixel structure on the panel at C, and the color coordinates of the light source employed therein at B for which the CC of the pixel structure is calculated, for purposes of computing the color purity of the pixel structures in LCD panel assembly;

FIG. 7B is a chromaticity diagram for an actual LCD panel assembly constructed in accordance with FIGS. 2 through 5C using the CLC-based spectral filtering structure specified by the spectral reflection and transmission characteristics shown in FIGS. 6A through 6J, indicating the computed color gamut of each of the pixel structures in LCD panel assembly, plotted against the color gamut achieved by the pixels of a conventional LCD panel employing an absorptive-type spectral filtering structure;

FIG. 7D1 is a chromaticity diagram for an actual LCD panel assembly constructed in accordance with FIGS. 2 through 5C using the CLC-based spectral filtering structure specified by the characteristics shown in FIGS. 6A through 6J, and an absorptive-type Jenmar film diffuser mounted on the spatial-intensity modulation panel of the assembly, in order to simulate the expected improvement in angular performance of the LCD panel assembly for spectral components in the blue-band, when the light condensing (i.e. quasi-collimating) film is installed between the light diffusing layer associated with the backlighting panel and the broad-band CLC-based reflective polarizer, and the light diffusing layer is mounted upon the broad-band analyzer of the spatial-intensity modulation panel, as indicated in FIGS. 2 through 2B;

FIG. 7D2 is a chromaticity diagram for an actual LCD panel assembly constructed in accordance with FIGS. 2 through 5C using the CLC-based spectral filtering structure specified by the characteristics shown in FIGS. 6A through 6J, and an absorptive-type Jenmar film diffuser mounted on the spatial-intensity modulation panel of the assembly, in order to simulate the expected improvement in angular performance of the LCD panel assembly for spectral components in the green-band, when the light condensing (i.e. quasi-collimating) film is installed between the light diffusing layer associated with the backlighting panel and the broad-band CLC-based reflective polarizer, and the light diffusing layer is mounted upon the broad-band analyzer of the spatial-intensity modulation panel, as indicated in FIGS. 2 through 2B;

FIG. 7D3 is a chromaticity diagram for an actual LCD panel assembly constructed in accordance with FIGS. 2 through 5C using the CLC-based spectral filtering structure specified by the characteristics shown in FIGS. 6A through 6J, and an absorptive-type Jenmar film diffuser mounted on the spatial-intensity modulation panel of the assembly, in order to simulate the expected improvement in angular performance of the LCD panel assembly for spectral components in the red-band, when the light condensing (i.e. quasi-collimating) film is installed between the light diffusing layer associated with the backlighting panel and the broad-band CLC-based reflective polarizer, and the light diffusing layer is mounted upon the broad-band analyzer of the spatial-intensity modulation panel, as indicated in FIGS. 2 through 2B;

FIG. 8D1 is a perspective schematic representation of a second illustrative embodiment of the CLC-based spectral filtering structure shown in FIG. 2, wherein the subpixel structures of each pixel structure therein are arranged in a 2×2 array;

FIG. 8D2 is a schematic representation of one pixel structure in the first (i.e. bottom) CLC layer of the CLC-based spectral filtering structure of FIG. 8D1, showing the 2-D spatial layout of the individual subpixel structures contained therein;

FIG. 8D3 is a schematic representation of one pixel structure in the second (i.e. top) CLC layer of the CLC-based spectral filtering structure of FIG. 8D1, showing the 2-D spatial layout of the individual subpixel structures contained therein;

FIG. 8D4 is a schematic representation of light output from the subpixel structures contained in one pixel structure in the CLC-based spectral filtering structure of FIG. 8D1;

FIGS. 9A through 9B, taken together, set forth a flow chart illustrating the steps involved when manufacturing the two-layer CLC-based spectral filter of FIG. 5;

FIG. 21A is a perspective schematic representation of a eleventh illustrative embodiment of the CLC-based spectral filtering structure shown in FIG. 2, wherein the subpixel structures of each pixel structure therein are arranged in a 2×2 array;

FIG. 21B is a schematic representation of one pixel structure in the first (i.e. bottom) CLC layer of the CLC-based spectral filtering structure of FIG. 21A, showing the 2-D spatial layout of the individual subpixel structures contained therein;

FIG. 21C is a schematic representation of one pixel structure in the second (i.e. top) CLC layer of the CLC-based spectral filtering structure of FIG. 21A, showing the 2-D spatial layout of the individual subpixel structures contained therein;

FIG. 21D is a schematic representation of light output from the subpixel structures contained in one pixel structure in the CLC-based spectral filtering structure of FIG. 21A;

FIG. 23A is a perspective schematic representation of a thirteenth illustrative embodiment of the CLC-based spectral filtering structure shown in FIG. 2, wherein the subpixel structures of each pixel structure therein are arranged in a 2×2 array;

FIG. 23B is a schematic representation of one pixel structure in the first (i.e. bottom) CLC layer of the CLC-based spectral filtering structure of FIG. 23A, showing the 2-D spatial layout of the individual subpixel structures contained therein;

FIG. 23C is a schematic representation of one pixel structure in the second (i.e. top) CLC layer of the CLC-based spectral filtering structure of FIG. 23A, showing the 2-D spatial layout of the individual subpixel structures contained therein;

FIG. 23D is a schematic representation of light output from the subpixel structures contained in one pixel structure in the CLC-based spectral filtering structure of FIG. 23A;

FIG. 30A1 is a schematic representation of an exploded, cross-sectional view of an exemplary pixel structure within the LCD panel of FIG. 29, wherein the spatial-intensity modulating elements of the LCD panel are realized using linear-type polarization rotating elements, and the pixel driver signals provided thereto are selected to produce "bright" output levels at each of the RGB subpixels of the exemplary pixel structure;

FIG. 30A2 is a schematic representation of an exploded, cross-sectional view of an exemplary pixel structure within the second particular embodiment of the generalized LCD panel of FIG. 2, wherein the spatial-intensity modulating elements of the LCD panel are realized using linear-type polarization rotating elements, and the pixel driver signals provided thereto are selected to produce "dark" output levels at each of the RGB subpixels of the exemplary pixel structure;

Figure 1C:
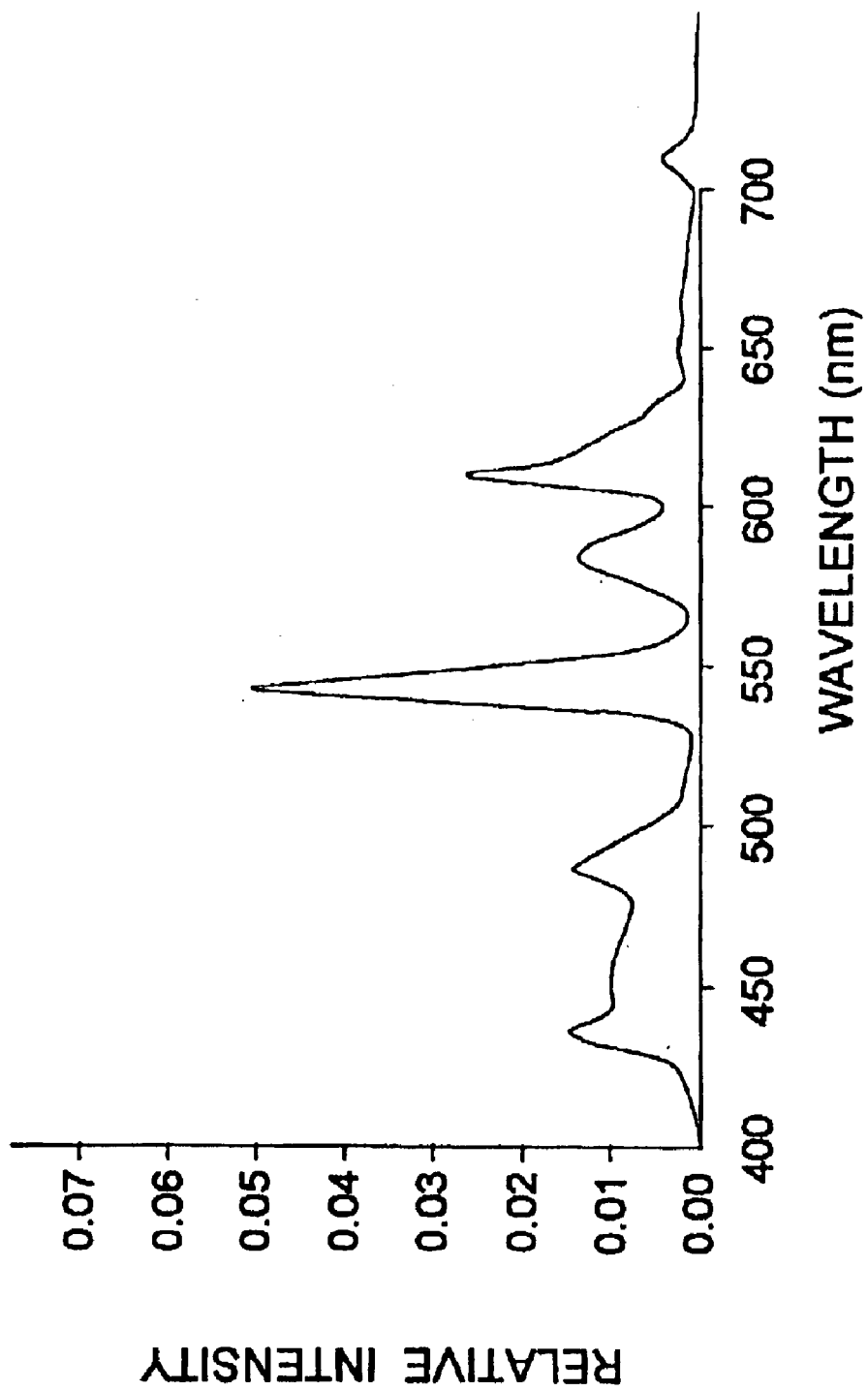
FIG. 1C is a schematic representation of the intensity distribution of a typical cold-cathode tungsten light source used in the backlighting structures of prior art LCD panels, showing the multiple spectral emission peaks associated with the primary colors blue, green and red.
Figure 1D:
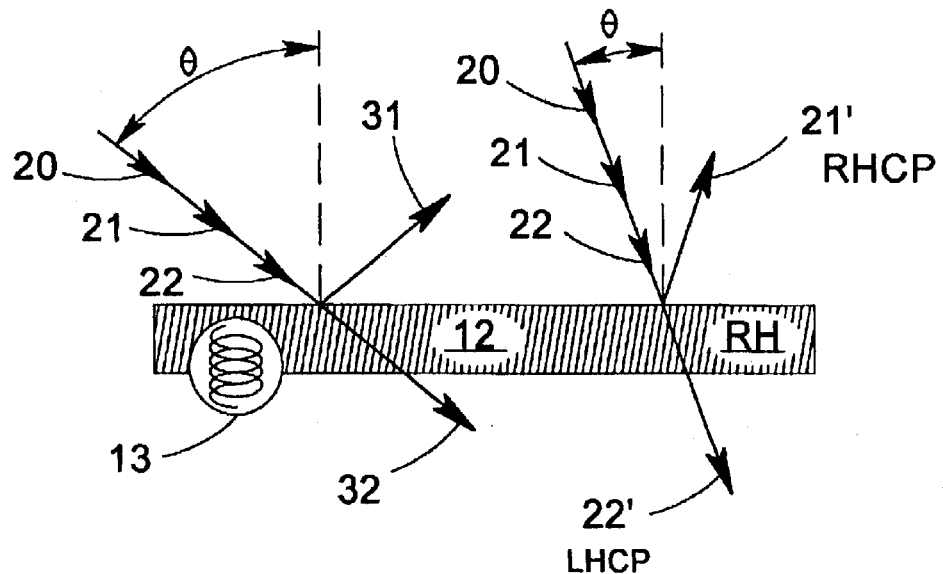
FIG. 1D is a schematic representation of prior art CLC-based broad band reflective polarizer for use in an LCD panel assembly, as depicted in FIG. 1A, to improve light recycling between the backlighting structure and the spectral filtering structure of the LCD panel assembly.
Figure 1E:
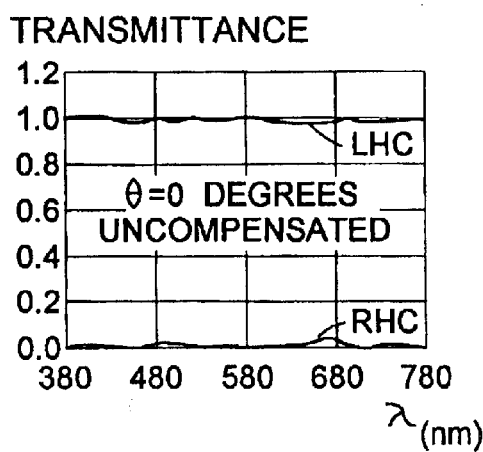
FIG. 1E is the transmittance characteristics for left handed and right handed circularly polarized (LHCP) and (RHCP) light incident upon and transmitted through the CLC-based reflective broadband polarizer employed in the prior art LCD panel assembly of FIG. 1A, at an angle of 0 degrees off the normal thereto.
Figure 1F:
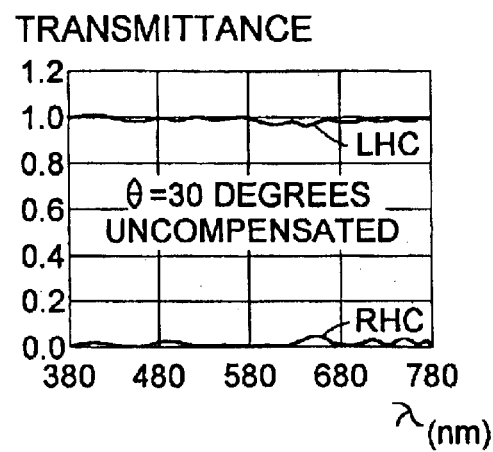
FIG. 1F is the transmittance characteristics for left handed and right handed circularly polarized (LHCP) and (RHCP) light incident upon and transmitted through the CLC-based reflective broadband polarizer employed in the prior art LCD panel assembly of FIG. 1A, at an angle of 30 degrees off the normal thereto.
Figure 1G:
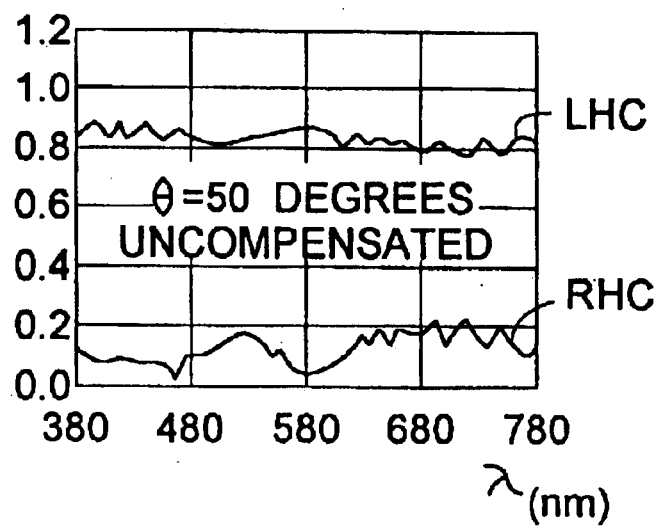
FIG. 1G is the transmittance characteristics for left handed and right handed circularly polarized (LHCP) and (RHCP) light incident upon and transmitted through the CLC-based reflective broadband polarizer employed in the prior art LCD panel assembly of FIG. 1A, at an angle of 50 degrees off the normal thereto.
Figure 1H:
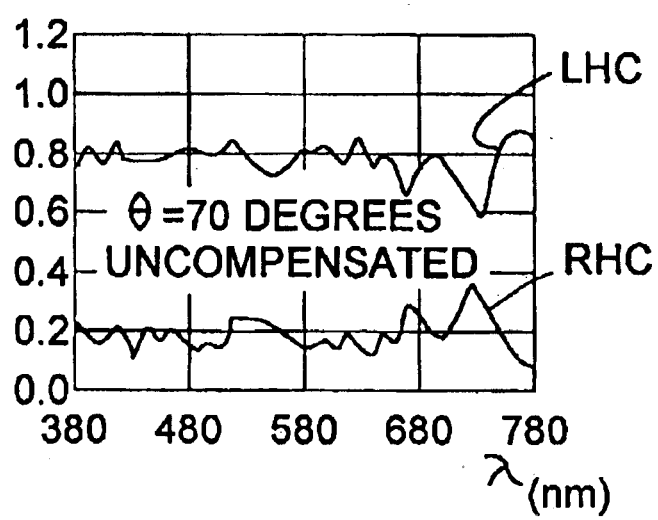
FIG. 1H is the transmittance characteristics for left handed and right handed circularly polarized (LHCP) and (RHCP) light incident upon and transmitted through the CLC-based reflective broadband polarizer employed in the prior art LCD panel assembly of FIG. 1A, at an angle of 70 degrees off the normal thereto.
Figure 2:
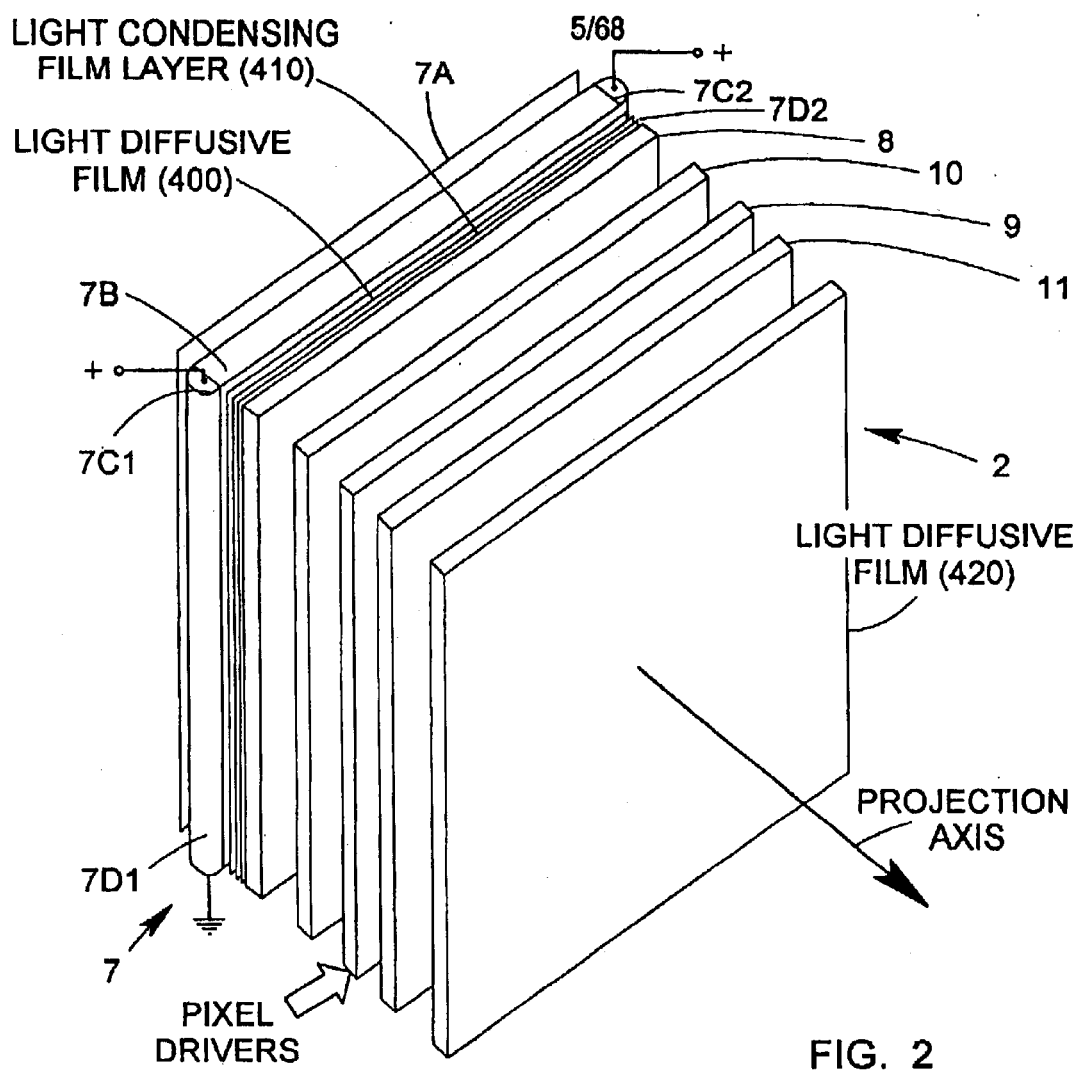
FIG. 2 is an exploded schematic diagram of the first generalized LCD panel construction of the present invention comprising (i) its backlighting structure realized by a quasi-specular reflector, a light guiding panel, a pair of edge-illuminating light sources, a light condensing film, and broad-band polarizing reflective panel, (ii) its array of spectral filtering elements realized as an array of pass-band polarizing reflective elements; and (iii) its spatial-intensity modulating array realized as an array of electronically-controlled polarization rotating elements, a broad-band polarizing reflective panel and a polarization-state preserving light diffusive film layer disposed thereon to improve the viewing angle of the system.
Figure 3B:
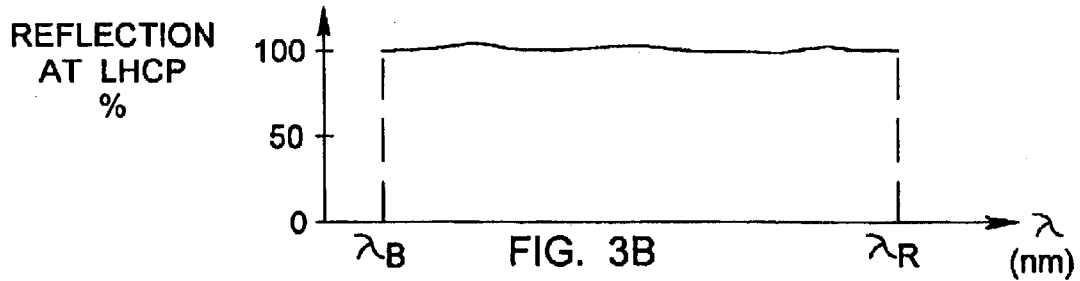
FIG. 3B is a schematic representation graphically illustrating ideal reflection characteristics for the broad-band circularly polarizing (LHCP) reflective panel of the LCD panel of FIGS. 3A1 and 3A2, indicating how such a broad-band circularly polarizing panel responds to incident illuminating having circular polarization state LHCP.
Figure 3C:
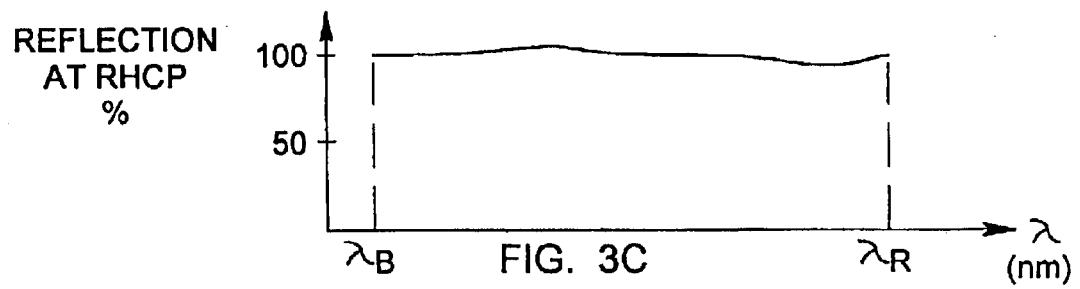
FIG. 3C is a schematic representation graphically illustrating ideal reflection characteristics for the broad-band circularly polarizing (RHCP) reflective panel of the LCD panel of FIGS. 3A1 and 3A2, indicating how such a broad-band circularly polarizing panel responds to incident illuminating having circular polarization state RHCP.
Figure 30B:
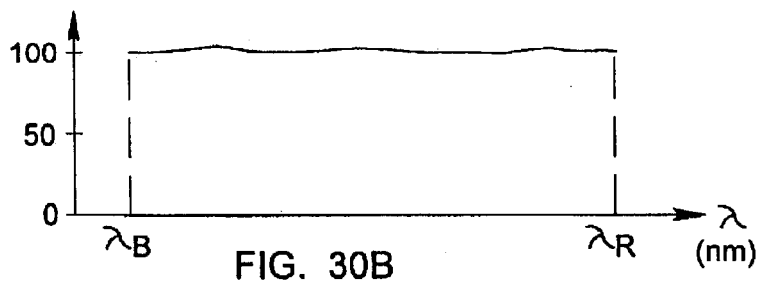
FIG. 30B is a schematic representation graphically illustrating ideal reflection characteristics for the broad-band linearly polarizing (LHP1) reflective panel of the LCD panel of FIGS. 30A1 and 30A2, indicating how such a broad-band linearly polarizing panel responds to incident illuminating having linear polarization state LP1.
Figure 30C:
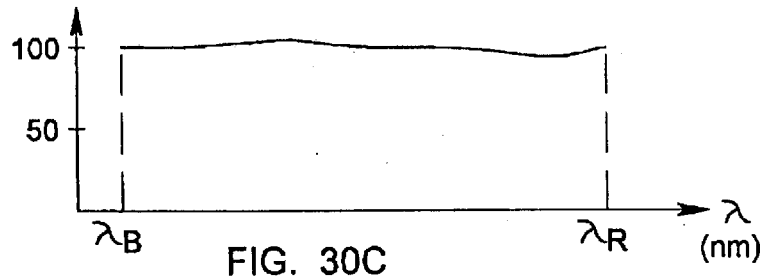
FIG. 30C is a schematic representation graphically illustrating ideal reflection characteristics for the broad-band linearly polarizing (LP2) reflective panel of the LCD panel of FIGS. 30A1 and 30A2, indicating how such a broad-band linearly polarizing panel responds to incident illuminating having linear polarization state LP2.
Figure 30D:
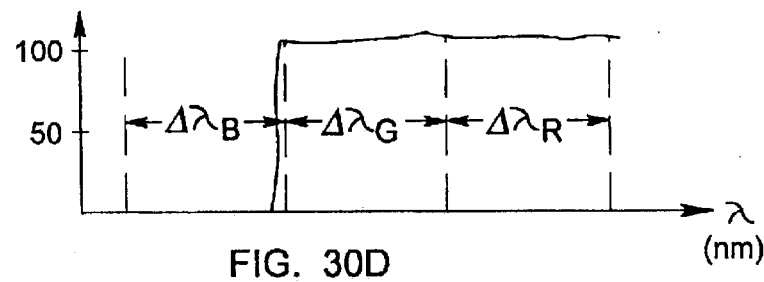
FIG. 30D is a schematic representation graphically illustrating ideal reflection characteristics for the pass-band linearly polarizing (LP2) reflective filter element associated with each "blue" subpixel of the LCD panel of FIGS. 30A1 and 30A2, indicating how such a non-absorbing spectral filter element responds to incident broad-band illumination having linear polarization state LP2.
Figure 30E:
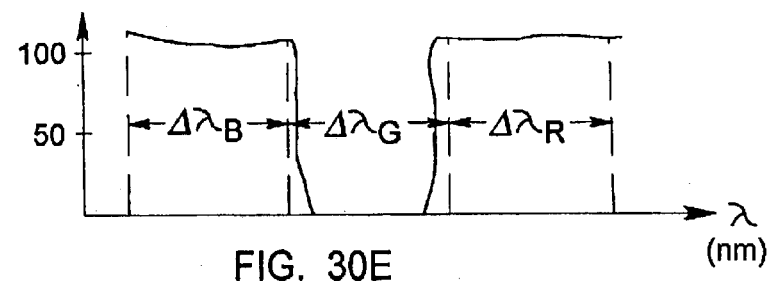
FIG. 30E is a schematic representation graphically illustrating ideal reflection characteristics for the pass-band linearly polarizing (LP2) reflective filter element associated with each "green" subpixel of the LCD panel of FIGS. 30A1 and 30A2, indicating how such a non-absorbing spectral filter element responds to incident broad-band illumination having linear polarization state LP2.
Figure 30F:
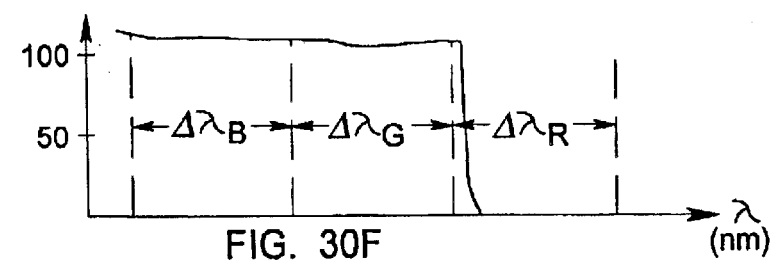
Figure 31:
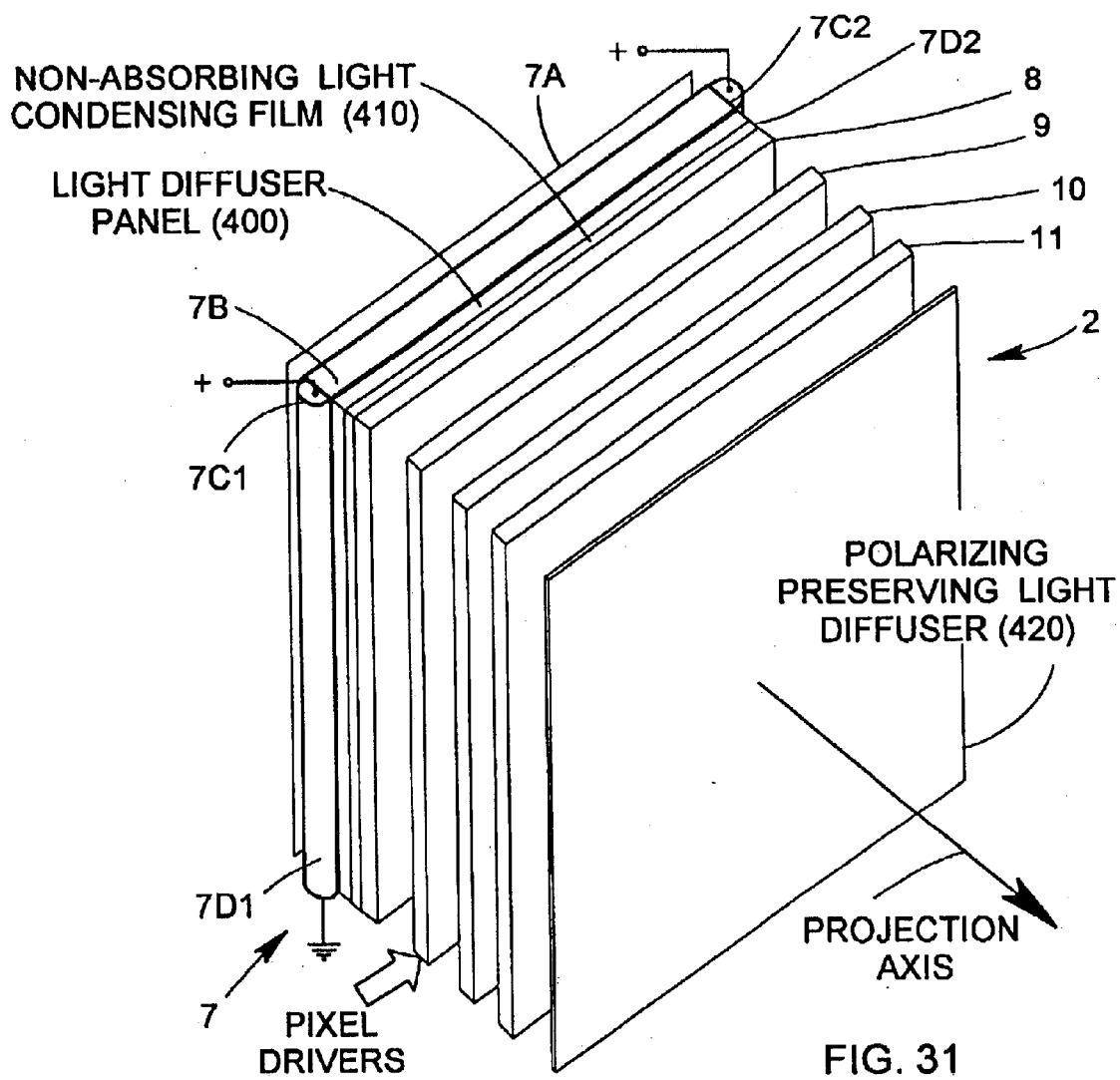
Figure 31A:
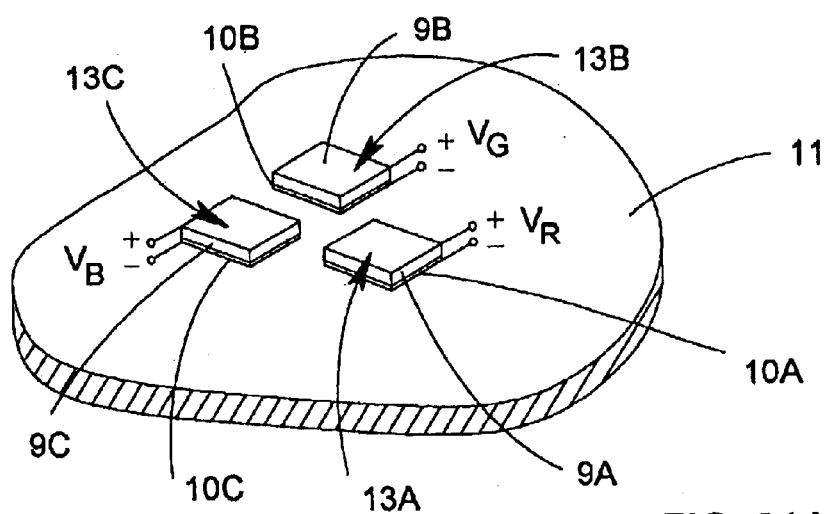
Figure 31B:
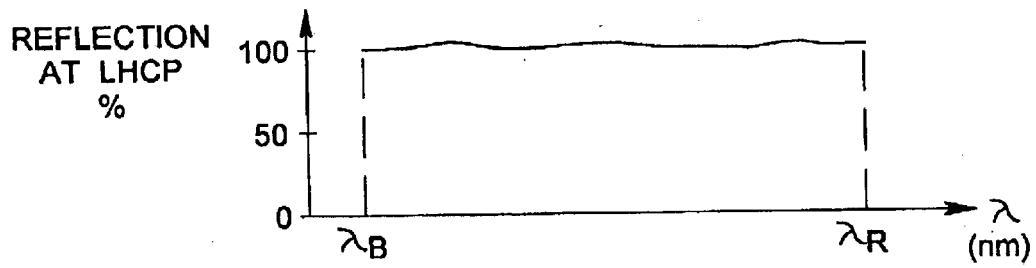
Figure 31C:
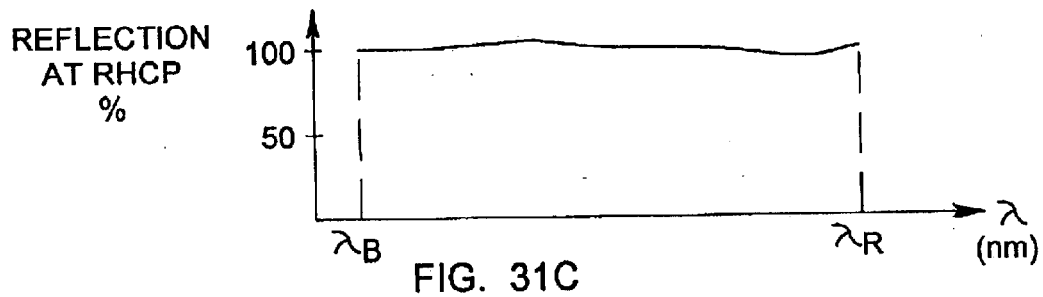
Figure 31D:
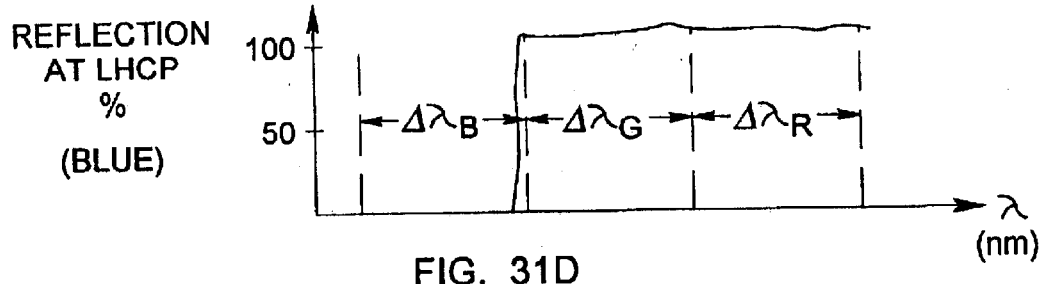
Figure 31E:
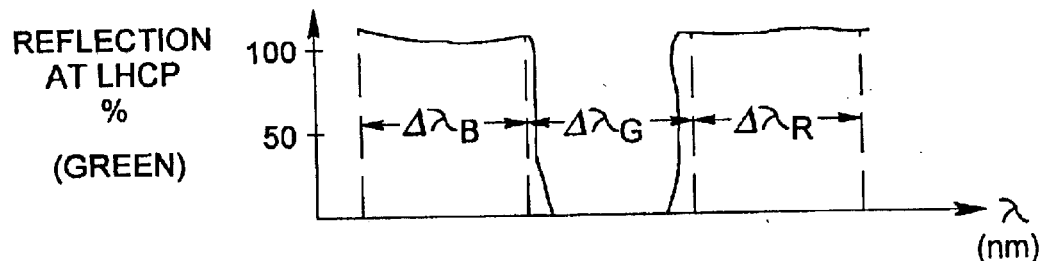
Figure 31F:
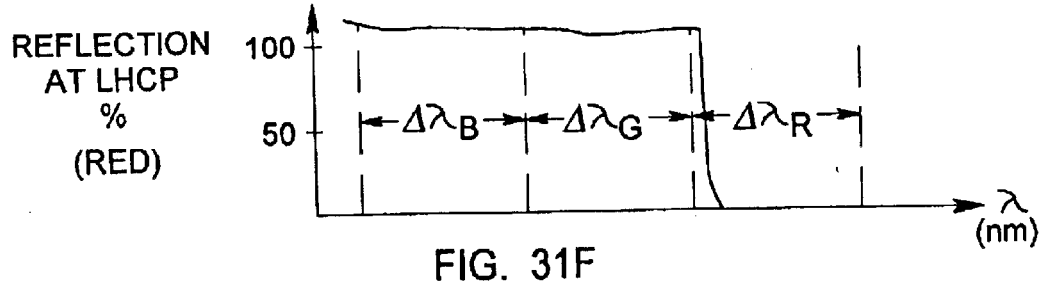
Figure 32B:
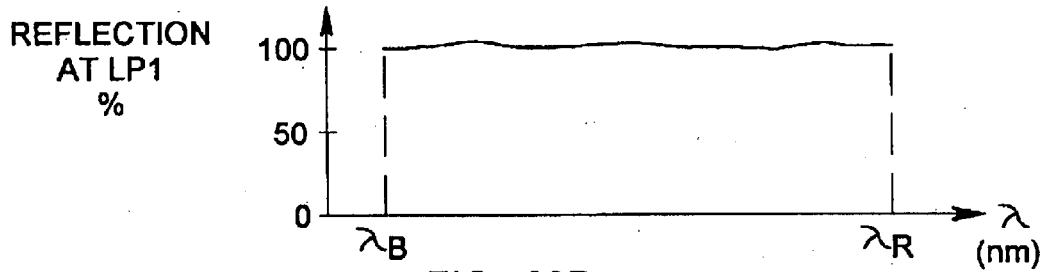
Figure 32C:
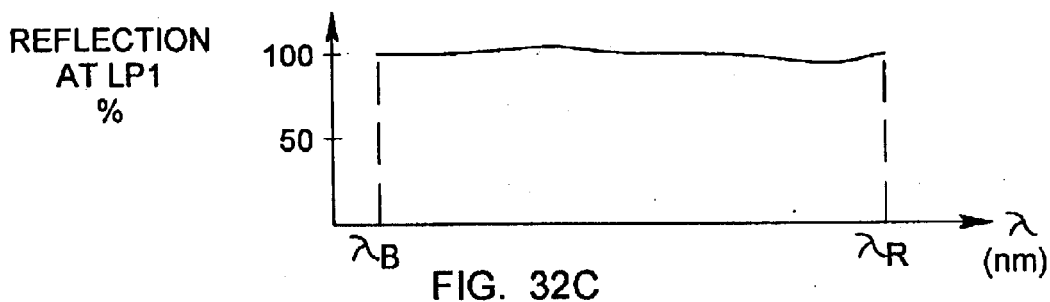
Figure 32D:
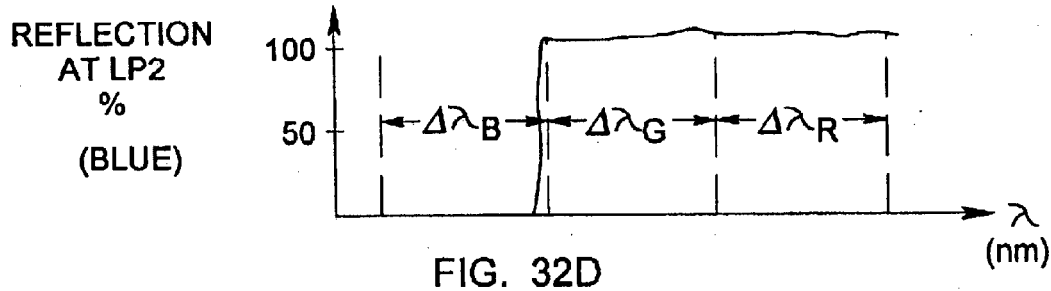
Figure 32E:
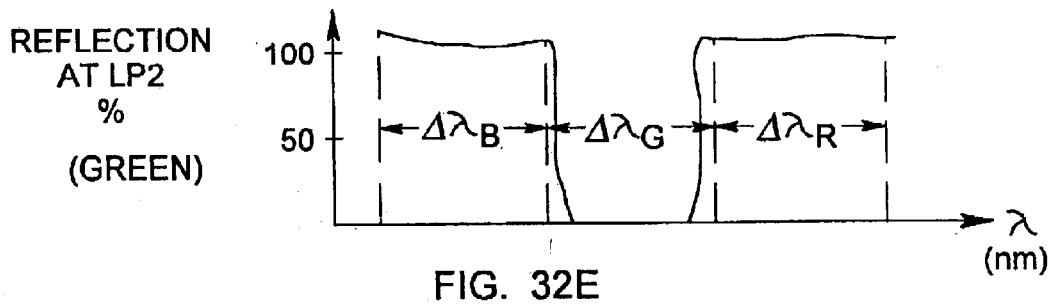
Figure 32F:
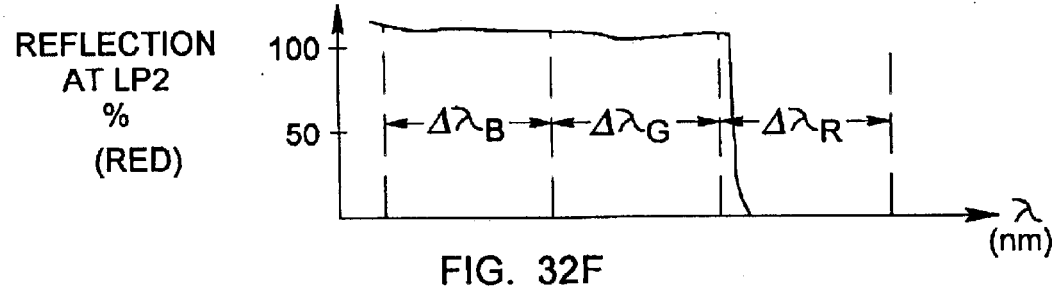
Figure 33:
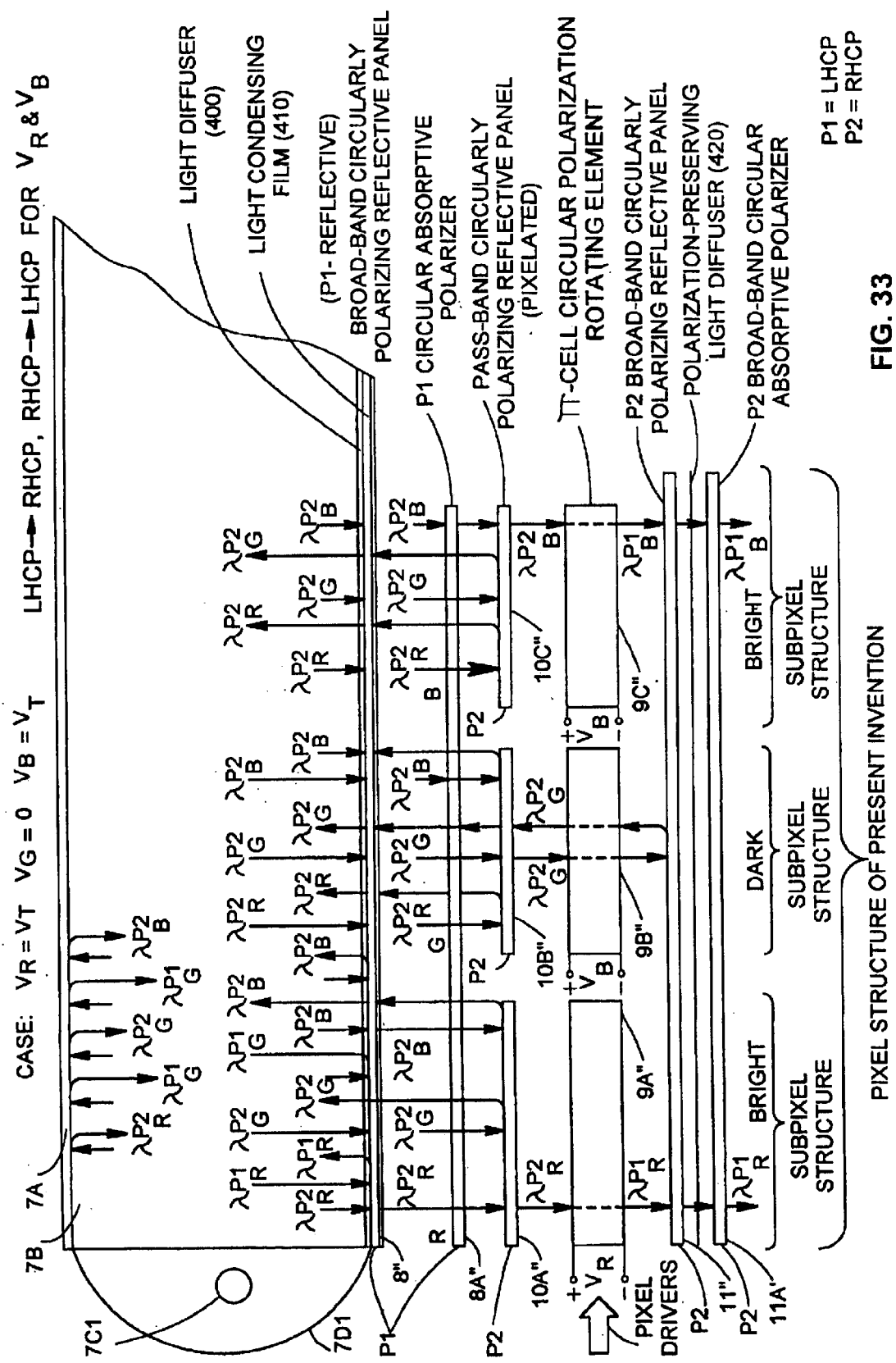
Figure 34:
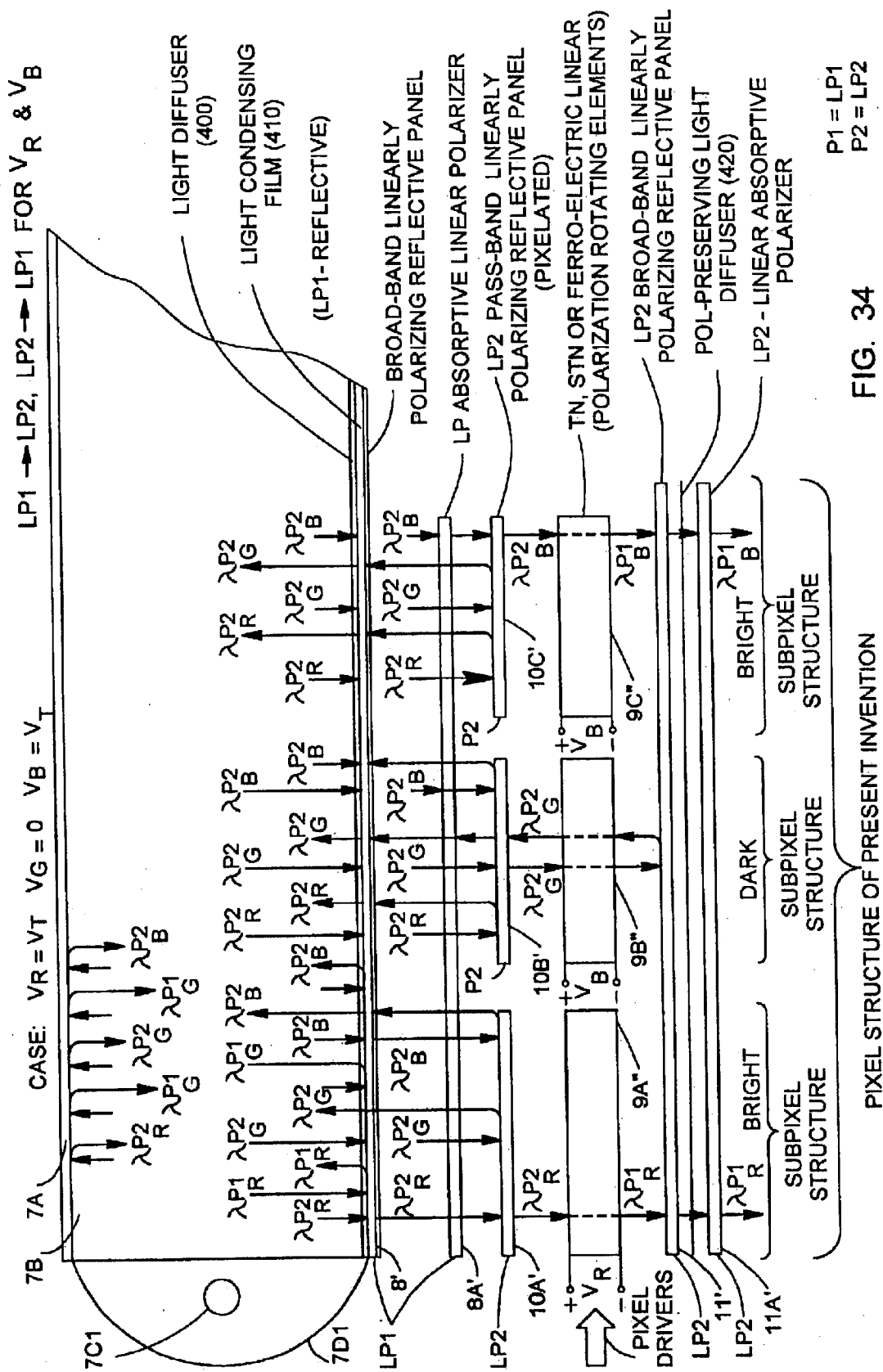
Figure 35:
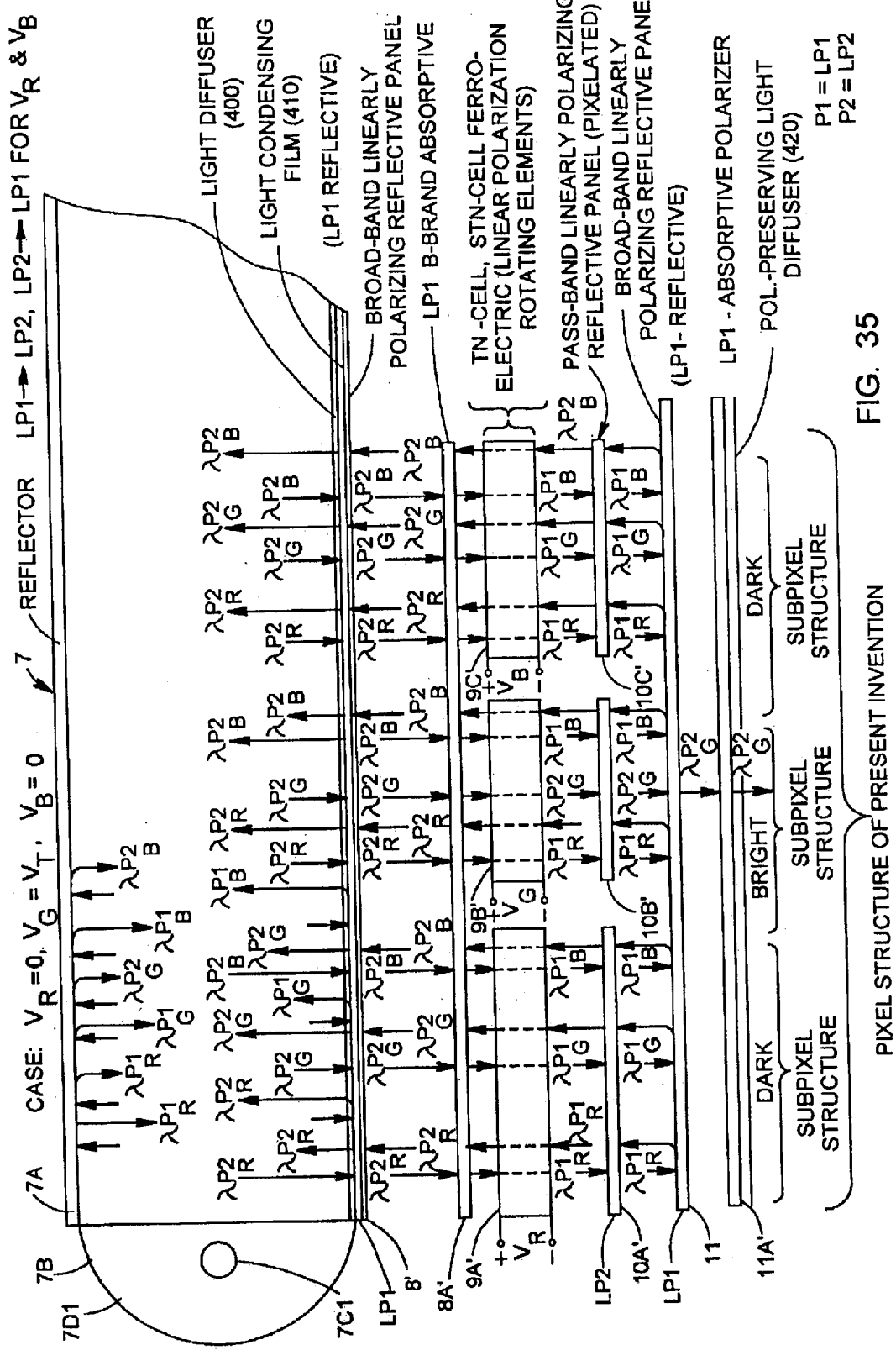
Figure 36:
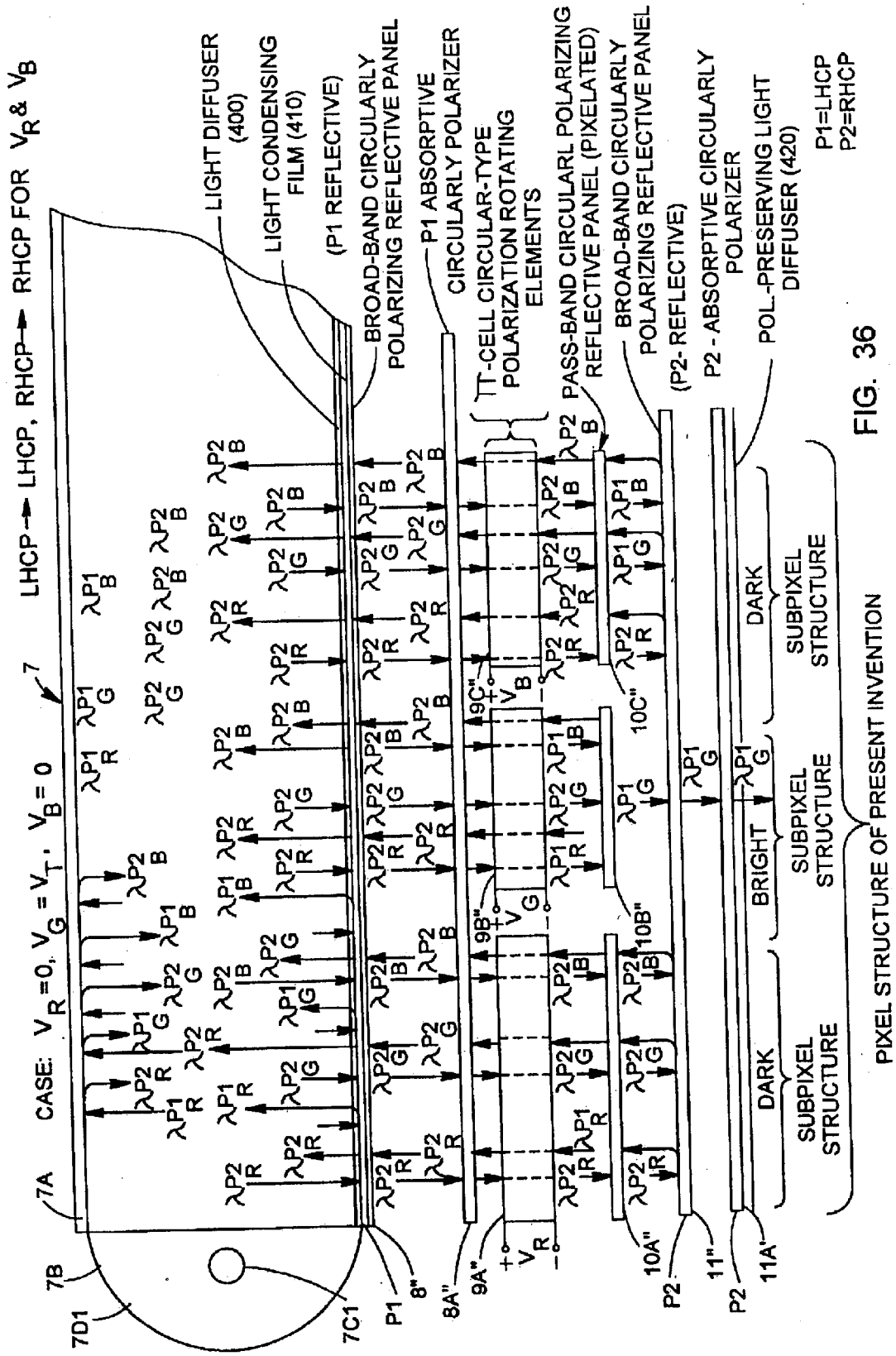
Figure 37A:
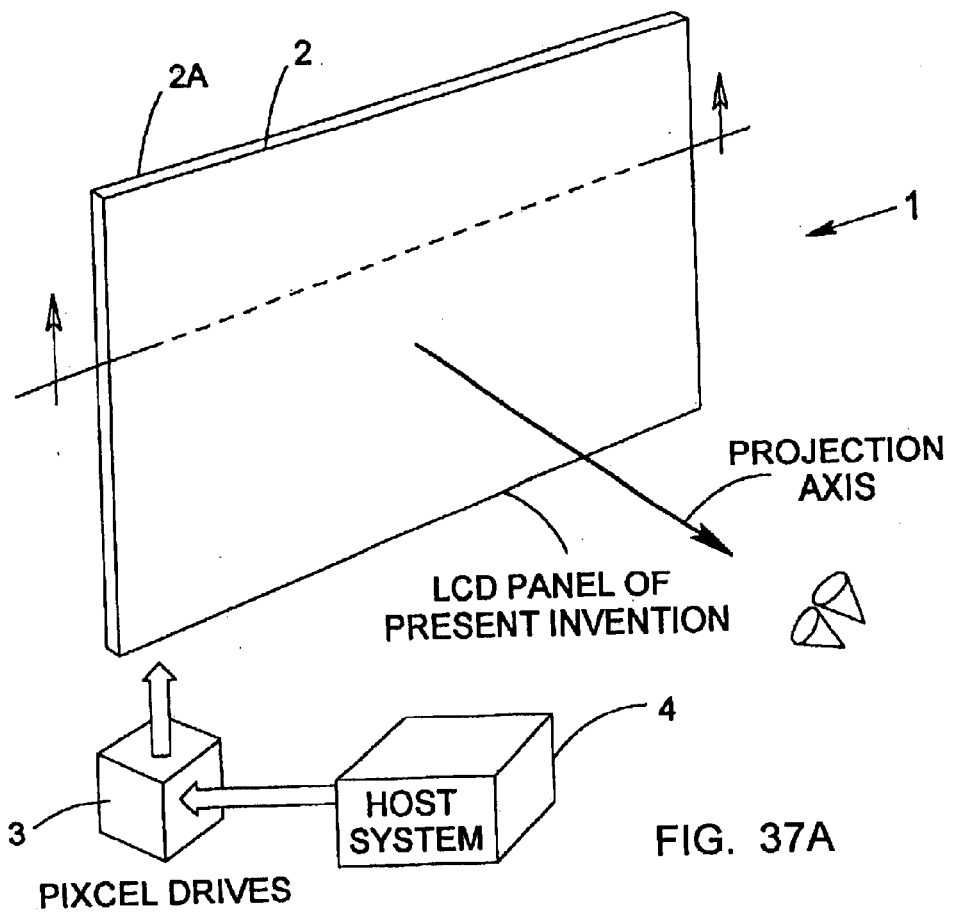
Figure 37B:
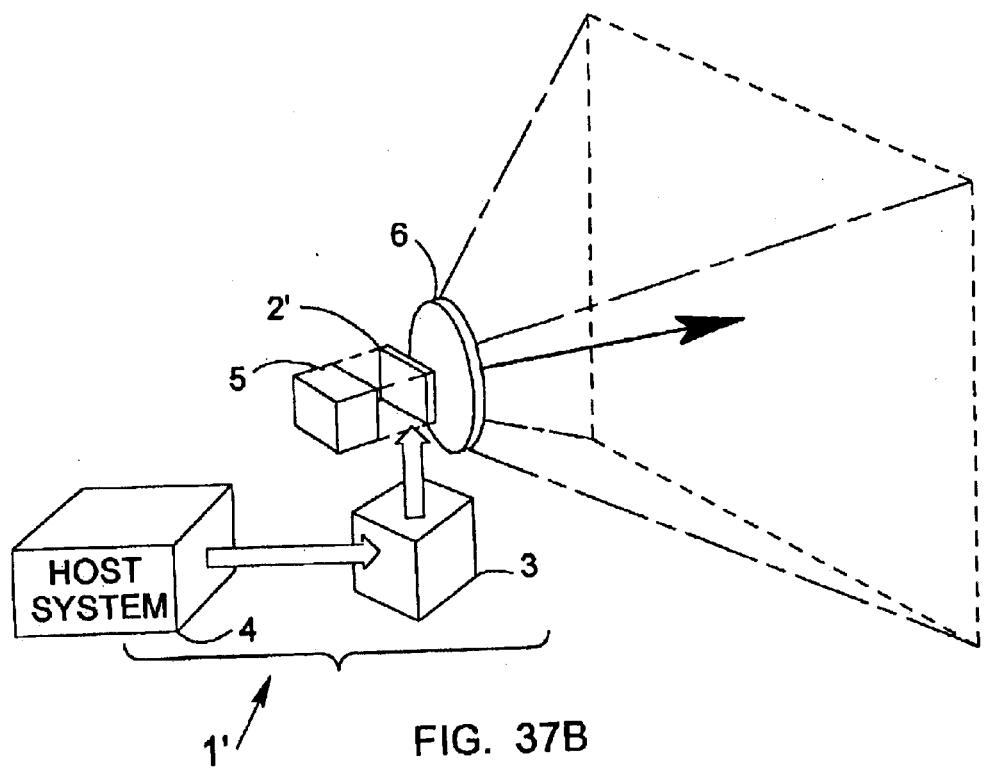
Figure 38:
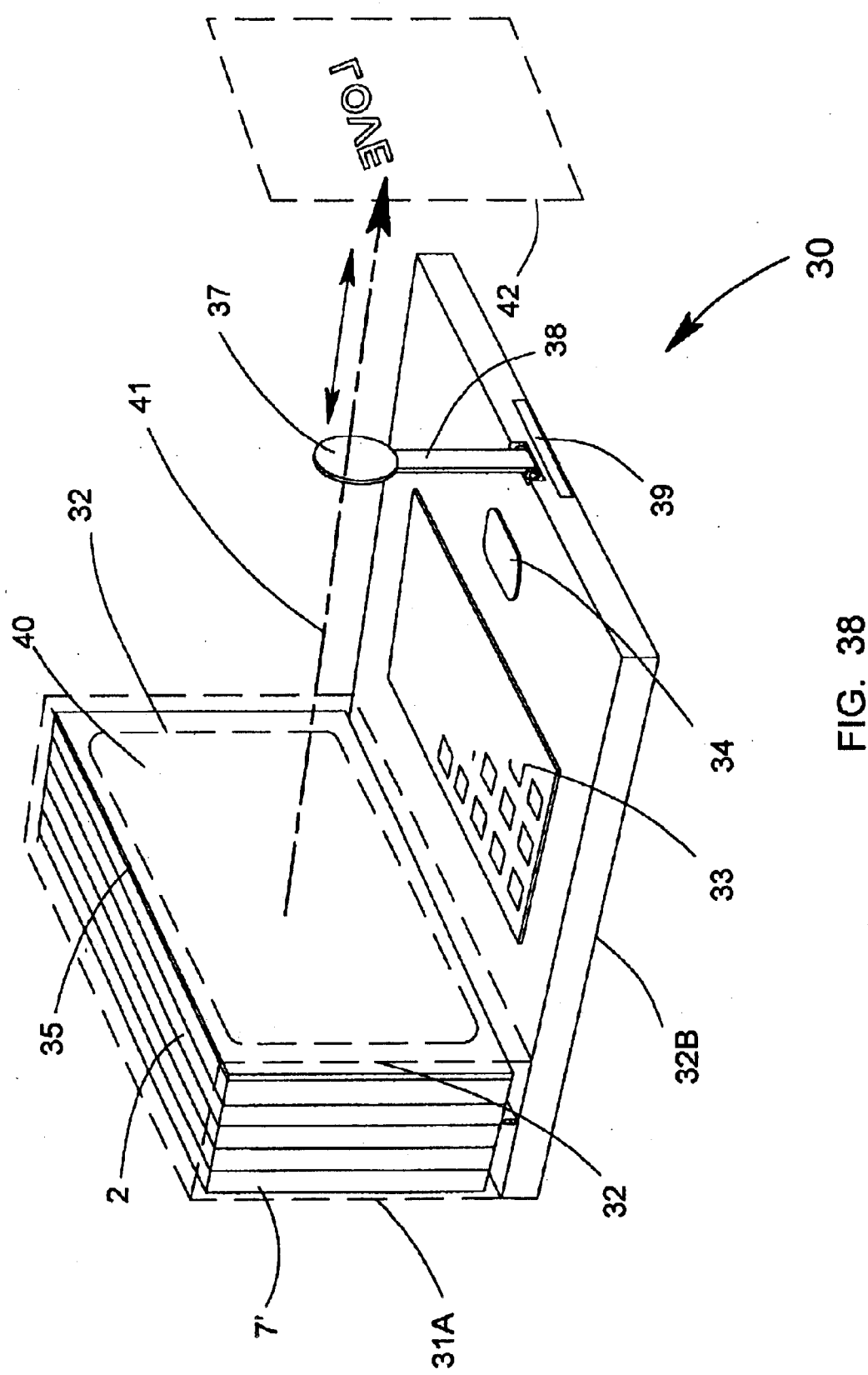
Figure 39:
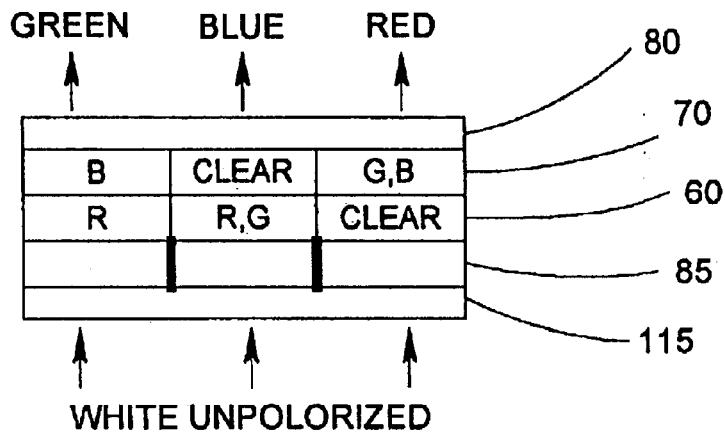
Figure 40:
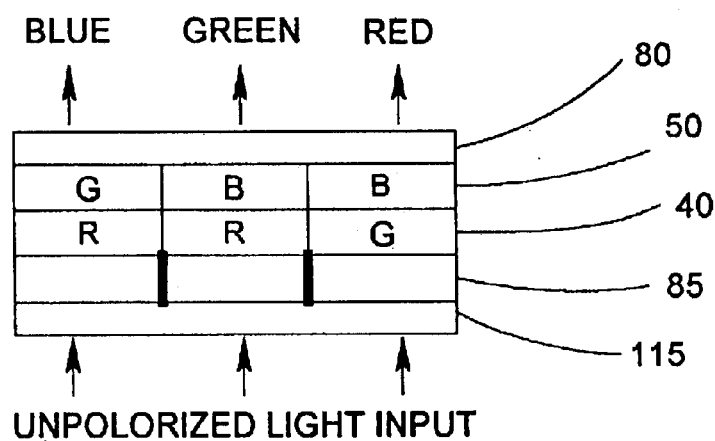
Figure 41:
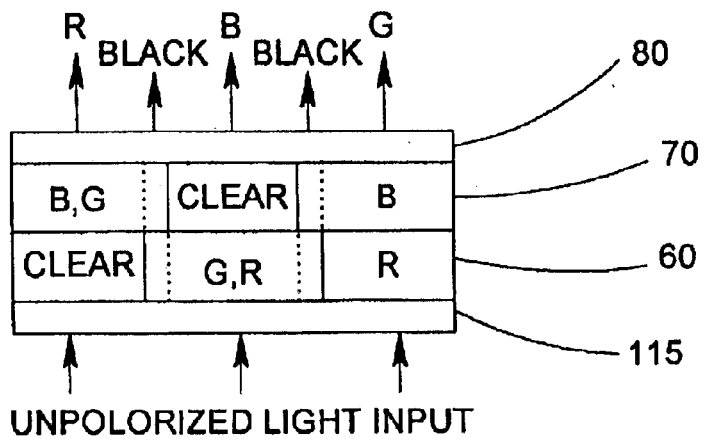

FIG. 30F is a schematic representation graphically illustrating ideal reflection characteristics for the pass-band linearly polarizing (LP2) reflective filter element associated with each "red" subpixel of the LCD panel of FIGS. 30A1 and 30A2, indicating how such a non-absorbing spectral filter element responds to incident broad-band illumination having linear polarization state LP2;

FIG. 31 is an exploded schematic diagram of the second generalized LCD panel construction of the present invention comprising (i) its backlighting structure realized by a quasi-specular reflector, a light guiding panel, a pair of edge-illuminating light sources, a light condensing film, and broad-band polarizing reflective panel, (ii) its spatial-intensity modulating array realized as an array of electronically-controlled polarization rotating elements and a broad-band polarizing reflective panel, and (iii) its array of spectral filtering elements realized as an array of pass-band polarizing reflective elements and a polarization-state preserving light diffusive film layer disposed thereon to improve the viewing angle of the system;

FIG. 31A is a schematic representation of a broad-band circularly polarizing reflective panel;

FIG. 31A1 is a schematic representation of an exploded, partially cut-away cross-sectional view of a first illustrative embodiment the second generalized CLC-based LCD panel assembly shown in FIG. 31, wherein the spatial-intensity modulating panel is disposed between the backlighting structure and the spectral filtering structure of the system and the spatial-intensity modulating elements employed therein are realized using linear-type polarization rotating elements, and the pixel driver signals provided thereto are selected to produce "bright" output levels at each of the RGB subpixels of the exemplary pixel structure;

FIG. 31A2 is a schematic representation of the LCD panel shown in FIG. 31A1, wherein the pixel driver signals provided thereto are selected to produce "dark" output levels at each of the RGB subpixels of the exemplary pixel structure;

FIG. 31B is a schematic representation graphically illustrating ideal reflection characteristics for the broad-band circularly polarizing (LHCP) reflective panel of the LCD panel of FIGS. 33A1 and 33A2, indicating how such a broad-band circularly polarizing panel responds to incident illuminating having circular polarization state LHCP;

FIG. 31C is a schematic representation graphically illustrating ideal reflection characteristics for the broad-band circularly polarizing (RHCP) reflective panel of the LCD panel of FIGS. 31A1 and 31A2, indicating how such a broad-band circularly polarizing panel responds to incident illuminating having circular polarization state RHCP;

FIG. 31D is a schematic representation graphically illustrating ideal reflection characteristics for the pass-band circularly polarizing (RHCP) reflective filter element associated with each "blue" subpixel of the LCD panel of FIGS. 31A1 and 31A2, indicating how such a non-absorbing spectral filter element responds to incident broad-band illumination having circular polarization state RHCP;

FIG. 31E is a schematic representation graphically illustrating ideal reflection characteristics for the pass-band circularly polarizing (RHCP) reflective filter element associated with each "green" subpixel of the LCD panel of FIGS. 31A1 and 31A2, indicating how such a non-absorbing spectral filter element responds to incident broad-band illumination having circular polarization state RHCP;

FIG. 31F is a schematic representation graphically illustrating ideal reflection characteristics for the pass-band circularly polarizing (RHCP) reflective filter element associated with each "red" subpixel of the LCD panel of FIGS. 31A1 and 31A2, indicating how such a non-absorbing spectral filter element responds to incident broad-band illumination having circular polarization state RHCP;

FIG. 32A1 is a schematic representation of an exploded, partially cut-away cross-sectional view of a second illustrative embodiment the generalized CLC-based LCD panel assembly shown in FIG. 31, wherein the spatial-intensity modulating panel is disposed between the backlighting structure and the spectral filtering structure of the system and the spatial-intensity modulating elements employed therein are realized using linear-type polarization rotating elements, and the pixel driver signals provided thereto are selected to produce "bright" output levels at each of the RGB subpixels of the exemplary pixel structure;

FIG. 32A2 is a schematic representation of the LCD panel shown in FIG. 32A1, wherein the spatial-intensity modulating elements of the LCD panel are realized using linear-type polarization rotating elements, and the pixel driver signals provided thereto are selected to produce "dark" output levels at each of the RGB subpixels of the exemplary pixel structure;

FIG. 32B is a schematic representation graphically illustrating the reflection characteristics of the first broad-band linearly polarizing (LP1) reflective panel of the LCD panel of FIGS. 3A1 and 3A2, indicating how such a broad-band linearly polarizing reflective panel responds to incident illuminating having linear polarization state LP1;

FIG. 32C is a schematic representation graphically illustrating the reflection characteristics of the second broad-band linearly polarizing (LP1) reflective panel of the LCD panel of FIGS. 32A1 and 32A2, indicating how such a broad-band linearly polarizing reflective panel responds to incident illuminating having linear polarization state LP1;

FIG. 32D is a schematic representation graphically illustrating the reflection characteristics of the pass-band linearly polarizing (LP2) reflective filter element associated with each "blue" subpixel of the LCD panel of FIGS. 32A1 and 32A2, indicating how such a non-absorbing spectral filter element responds to incident broad-band illumination having linear polarization state LP2;

FIG. 32E is a schematic representation graphically illustrating the reflection characteristics of the pass-band linearly polarizing (LP2) reflective filter element associated with each "green" subpixel of the LCD panel of FIGS. 32A1 and 32A2, indicating how such a non-absorbing spectral filter element responds to incident broad-band illumination having linear polarization state LP2;

FIG. 32F is a schematic representation graphically illustrating the reflection characteristics of the pass-band linearly polarizing (LP2) reflective filter element associated with each "red" subpixel of the LCD panel of FIGS. 32A1 and 32A2, indicating how such a non-absorbing spectral filter element responds to incident broad-band illumination having linear polarization state LP2;

FIG. 33 is a schematic representation of an exploded, partially cut away cross-sectional view of an alternative embodiment of the LCD panel construction shown in FIGS. 3A1 and 3A2, wherein the spatial-intensity modulating elements of the LCD panel are realized using circular-type polarization rotating elements, the pixel driver signals provided thereto are selected to produce "bright" output levels the red and blue subpixels of the exemplary pixel structure and a "dark" output level at the green subpixel level, and a broad-band absorptive linear polarizer is used in conjunction with each broad-band polarizing reflective panel in the LCD panel in order to provide improved image contrast in the images displayed therefrom FIG. 34 is a schematic representation of an exploded, partially cut away cross-sectional view of an alternative embodiment of the LCD panel construction shown in FIGS. 30A1 and 30A2, wherein the spatial-intensity modulating elements of the LCD panel are realized using linear-type polarization rotating elements, the pixel driver signals provided thereto are selected to produce "bright" output levels the red and blue subpixels of the exemplary pixel structure and a "dark" output level at the green subpixel level, and a broad-band absorptive linear polarizer is used in conjunction with each broad-band polarizing reflective panel in the LCD panel in order to provide improved image contrast in the images displayed therefrom;

FIG. 35 is a schematic representation of an exploded, partially cut away cross-sectional view of an exemplary pixel structure within an alternative embodiment of the LCD panel construction shown in FIGS. 31A1 and 31A2, wherein the spatial-intensity modulating elements of the LCD panel are realized using circular-type polarization rotating elements, the pixel driver signals provided thereto are selected to produce "dark" output levels at the red and blue subpixels of the exemplary pixel structure and a "bright" output level at the green subpixel level, and a broad-band absorptive linear polarizer is used in conjunction with each broad-band polarizing reflective panel in the LCD panel in order to provide improved image contrast in the images displayed therefrom;

FIG. 36 is a schematic representation of an exploded, partially cut away cross-sectional view of an alternative embodiment of the LCD panel construction shown in FIGS. 32A1 and 32A2, wherein the spatial-intensity modulating elements of the LCD panel are realized using linear-type polarization rotating elements, the pixel driver signals provided thereto are selected to produce "dark" output levels the red and blue subpixels of the exemplary pixel structure and a "bright" output level at the green subpixel level, and broad-band absorptive linear polarizer is used in conjunction with each broad-band polarizing reflective panel in the LCD panel in order to provide improved image contrast in images displayed therefrom;

FIG. 37A is a schematic representation of a direct-view type image display system, wherein any one of the LCD panel assemblies of the present invention may be embodied;

FIG. 37B is a schematic representation of a projection-type image display system, wherein any one of the LCD panel assemblies of the present invention may be embodied;

FIG. 38 is a schematic representation of a portable color image projection system in the form of a laptop computer, wherein a plurality of conventional backlighting structures are cascaded together and mounted to the rear portion of an LCD panel according to the present invention in order to provide an LCD panel assembly that can be mounted within the display portion of the system housing and project bright images onto a remote surface without the use of an external light source or a rear opening in the display portion of the housing, for projecting light therethrough during its projection-viewing mode of operation;

FIG. 39 is a first CLC-based spectral filtering device constructed in accordance with the present invention, for producing spectrally filtered patterns of linearly polarized light from a source of white unpolarized light, wherein each red subpixel structure therein is realized by a green-band reflecting region in the first CLC layer and a blue band reflecting region in the second CLC layer, wherein each green subpixel structure therein is realized by a green-red band reflecting region in the first CLC layer and a clear (non-reflecting) region in the second CLC layer, wherein each blue subpixel structure therein is realized by a red band reflecting region in the first CLC layer and a green-band reflecting region in the second CLC layer, and a green-blue band reflecting pattern and quarter-wave retardation surface thereover are provided beneath the first CLC layer in order to realize the broad-band inter-subpixel "white" reflective matrix-like pattern between neighboring subpixel regions;

FIG. 40 is a second CLC-based spectral filtering device constructed in accordance with the present invention, for producing spectrally filtered patterns of linearly polarized light from a source of white unpolarized light, wherein each blue subpixel structure therein is realized by a red-band reflecting region in the first (i.e. lower) CLC layer and a green band reflecting region in the second CLC layer, wherein each green subpixel structure therein is realized by a red band reflecting region in the first CLC layer and a blue band reflecting region in the second CLC layer, wherein each red subpixel structure therein is realized by a green band reflecting region in the first CLC layer and a blue-band reflecting region in the second CLC layer; and FIG. 41 is a third CLC-based spectral filtering device constructed in accordance with the present invention, for producing spectrally filtered patterns of linearly polarized light from a source of white unpolarized light, a wherein each red subpixel structure therein is realized by a clear (non-reflecting) region in the first CLC layer and a blue-green band reflecting region in the second CLC layer, wherein each blue subpixel structure therein is realized by a green-red band reflecting region in the first CLC layer and a clear (non-reflecting) region in the second CLC layer, wherein each green subpixel structure therein is realized by a red band reflecting region in the first CLC layer and a blue-band reflecting region in the second CLC layer, and a broad-band reflecting pattern and quarter-wave retardation surface thereover are provided beneath the first CLC layer in order to realize the broad-band inter-subpixel "white" reflective matrix-like pattern between neighboring subpixel regions.

DETAILED DESCRIPTION OF THE ILLUSTRATIVE EMBODIMENTS OF THE PRESENT INVENTION

Referring now to the figures in the accompanying Drawings, the illustrative embodiments of the present invention will now be described in detail, wherein like structures and elements shown within the figures are indicated with like reference numerals.

Systemic Light Recycling within the LCD Panel of the Present Invention

The light transmission efficiency of prior art LCD panels has been severely degraded as a result of the following factors: absorption of light energy due to absorption-type polarizers used in the LCD panels; absorption of light reflected off thin-film transistors (TFTs) and wiring of the pixelated spatial intensity modulation arrays used in the LCD panels; absorption of light by pigments used in the spectral filters of the LCD panels; absorption of light energy by the black-matrix used to spatially separate the subpixel filters in the LCD panel in order to enhance image contrast; and Fresnel losses due to the mismatching of refractive indices between layers within the LCD panels. As a result of such light energy losses, it has been virtually impossible to improve the light transmission efficiency of prior art LCD panels beyond about 5%.

The LCD panel of the present invention overcomes each of the above drawbacks by employing a novel scheme of "systemic light recycling" which operates at all levels of the LCD system in order to avoid the light energy losses associated with prior art LCD panel designs, and thereby fully utilize nearly 100% of the light energy produced by the backlighting structure thereof. While the details of this novel systemic light recycling scheme will be hereinafter described for each of the illustrative embodiments, it will be appropriate at this juncture to briefly set forth the principles of this systemic light recycling scheme.

In each of the embodiments of the present invention, a single polarization state of light is transmitted from the backlighting structure to those structures (or subpanels) of the LCD panel where spatial intensity modulation and spectral filtering function of the transmitted polarized light simultaneously occurs on a subpixel basis and in a functionally integrated manner. At each subpixel location, spectral bands of light which are not transmitted to the display surface during spectral filtering are reflected without absorption back along the projection axis into the backlighting structure where the polarized light is recycled with light energy being generated therewith and then retransmitted from the backlighting structure into section of the LCD panel where spatial intensity modulation and spectral filtering of the retransmitted polarized light simultaneously occurs on a subpixel basis in a functionally integrated manner. At each subcomponent level within the LCD panel, spectral components of transmitted polarized light which are not used at any particular subpixel structure location are effectively reflected either directly or indirectly back into the backlighting structure for recycling with other spectral components for retransmission through the backlighting structure at the operative polarization state, for reuse by both the same and neighboring subpixel structures. The mechanics of this novel systemic light recycling scheme are schematically illustrated in FIGS. 3A1, 3A2, 30A1, 30A2, 31A1, 31A2, and 32A1 and 32A2, and will be described in greater detail hereinafter. By virtue of this novel systemic light recycling scheme of the present invention, it is now possible to design and construct LCD panels that can utilize produced backlight with nearly 100% light transmission efficiency, in marked contrast with prior art LCD panels having efficiencies of about 5%.

In the first generalized LCD panel construction shown in FIG. 2, spectral filtering occurs before spatial intensity modulation. In the first illustrative embodiment of this generalized LCD panel construction shown in FIGS. 2B through 3F, circular polarization techniques are used to carry out the spatial intensity modulation and spectral filtering functions employed therein. In the second illustrative embodiment of this generalized LCD panel construction shown in FIGS. 29 through 30F, linear polarization techniques are used to carry out the spatial intensity modulation and spectral filtering functions employed therein. In each such illustrative embodiment, modifications will be made among the various components of the generalized LCD panel construction shown in FIG. 2. Details regarding such modifications will be described hereinafter.

In the second generalized LCD panel construction shown in FIG. 31, spectral filtering occurs after spatial intensity modulation. In the first illustrative embodiment of this generalized LCD panel construction shown in FIGS. 31A1 through 31F, circular polarization techniques are used to carry out the spatial intensity modulation and spectral filtering functions employed therein. In the second illustrative embodiment of this generalized LCD panel construction shown in FIGS. 32A1 through 32F, linear polarization techniques are used to carry out the spatial intensity modulation and spectral filtering functions employed therein.

LCD Image Display System of First Generalized Embodiment of the Present Invention In FIG. 2, the subcomponent structure of the first generalized embodiment of the LCD panel hereof is shown in great clarity. As shown, the first generalized embodiment of the LCD panel 2 comprises: a backlighting structure 7 including a quasi-diffusive reflector 7A, for producing a plane of broad-band light having a substantially uniform light intensity over the x and y coordinate axes thereof; a light diffusive panel 400 for ensuring uniform spatial intensity of light across the surface of the LCD panel assembly; a light condensing (i.e. quasi-collimating) film 400 (e.g. realized using refractive or diffractive technology) for ensuring that the light rays output therefrom are directed within a cone of about +/−20 or so degrees from the normal vector drawn thereto; a broad-band CLC polarizing reflective panel 8; a pixelated array of polarizing reflective spectral filter elements 10, for spectral filtering of light produced from the backlighting structure; a pixelated array of polarization direction rotating elements 9 for spatial intensity modulation of light produced from the backlighting structure; a broad-band polarizing reflective panel 11 for cooperative operation with the pixelated array of polarization direction rotating elements 9 and the pixelated array of polarizing reflective spectral filter elements 10; and a polarization-state preserving light diffusive film layer 402 for scattering light over a broad range of angles so improve the viewing angle performance from the display screen of the LCD panel. In an alternative embodiment, a broad-band absorptive-type panel can be substituted for broad-band polarizing reflective panel 11 in order to reduce glare due to ambient light incident upon the LCD panel during operation.

Figure 2A:
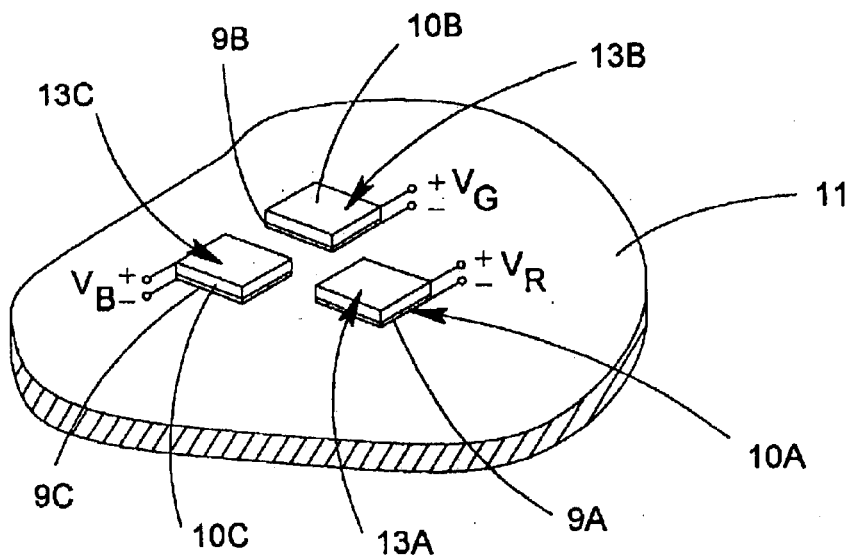
FIG. 2A is a perspective, partially broken away view of the LCD panel shown in FIG. 2, showing the electronically-controlled polarization rotating elements associated with a pixel structure thereof.

In order to produce high-resolution color images, the spatial period of the pixelated arrays 9 and 10 is selected to be relatively small in relation to the overall length and height dimensions of the LCD panel. In a conventional manner, each pixel structure in the LCD panel is comprised of a red subpixel 13A, a green subpixel 13B and blue subpixel 13C, as illustrated in FIG. 2A. As shown therein, each red subpixel structure 13A comprises a red-band polarizing reflective spectral filtering element 10A which is spatially registered with a first polarization direction rotating element 9A. Each green subpixel structure 13B comprises a green-band polarizing reflective spectral filtering element 10B spatially registered with a second polarization direction rotating element 9B. Each blue subpixel element 13C comprises a blue-band polarizing reflective spectral filtering element 10C spatially registered with a third polarization direction rotating element 9C.

The output intensity (i.e. brightness or darkness level) of each red subpixel structure is controlled by applying pulse-width modulated voltage signal $V_R$ to the electrodes of its electrically-controlled spatially intensity modulating element. The output intensity of each green subpixel structure is controlled by applying pulse-width modulated voltage signal $V_G$ to the electrodes of its electrically-controlled spatially intensity modulating element. The output intensity of each blue subpixel structure is controlled by providing pulse-width modulated voltage signal $V_B$ applied to the electrodes of its electrically-controlled spatially intensity modulating element. By simply controlling the width of the above-described voltages $V_R$, $V_G$, $V_B$, the grey-scale intensity (i.e. brightness) level of each subpixel structure can be controlled in a manner well known in the LCD panel art.

Figure 2B:
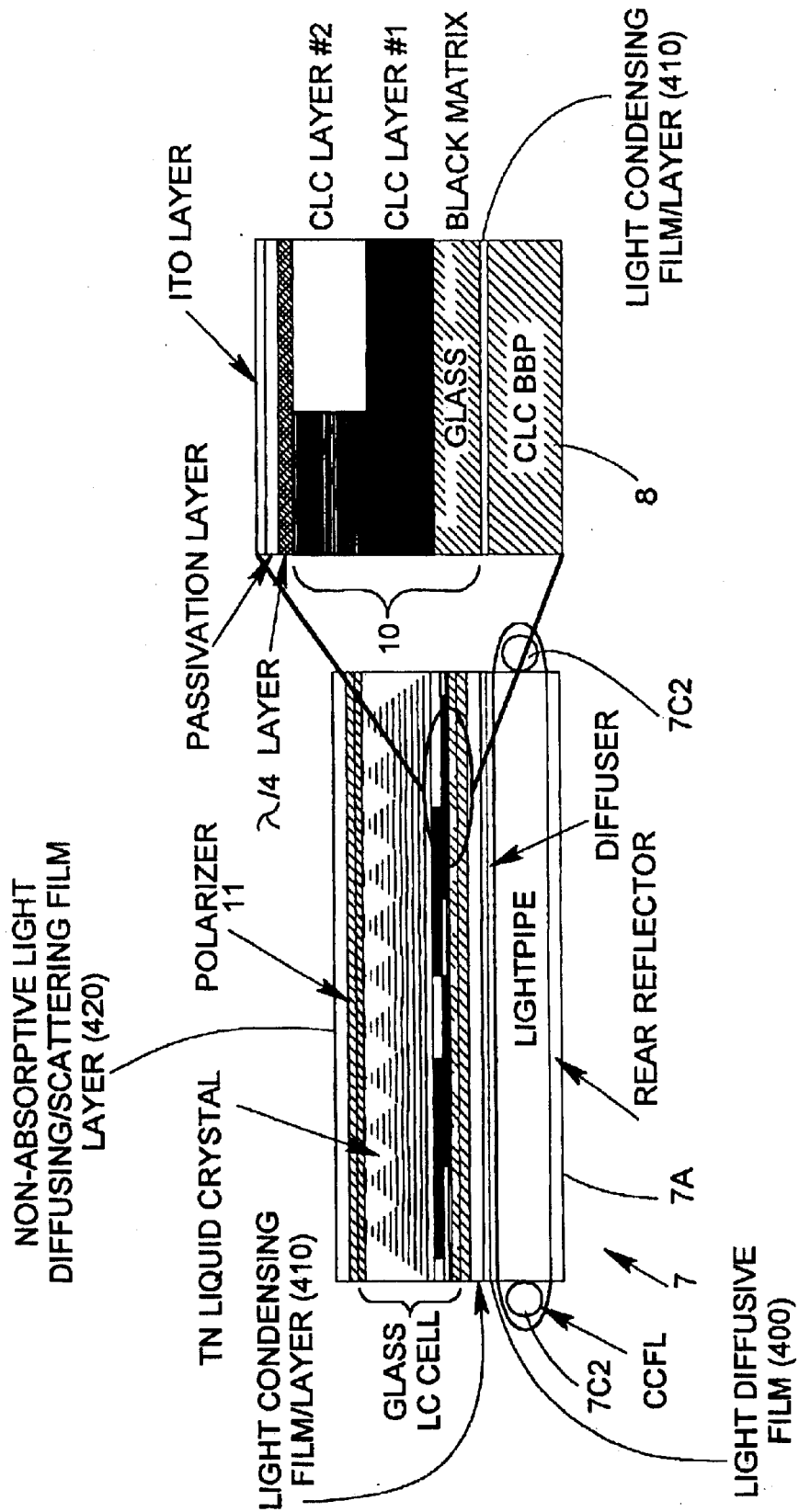
FIG. 2B is a cross-sectional view of a portion of a first illustrative embodiment of the generalized LCD panel assembly shown in FIG. 2A, taken along lines 2B—2B therein.

First Illustrative Embodiment of the First Generalized LCD Panel Construction of the Present Invention In the first illustrative embodiment shown in FIGS. 2B through 7D3, the backlighting structure 7 is realized by a pair of cold-cathode tungsten filament tubes 7C1 and 7C2 directing light through a Plexiglas panel having a light-leaking surface known in the art, and a light diffusive film 400 for rendering the spatial light intensity uniform across the surface of the panel in a manner known in the art. For illustration purposes, the spectral emission characteristics of the tungsten light sources are taken to be those set forth in FIG. 1C. Understandably, there are other techniques for producing a plane of unpolarized light for use in connection with the LCD panel of the present invention.

In the illustrative embodiment shown in FIGS. 2B and 2B1, a light condensing film 410 is applied to the surface of the light diffusive film 400 so that the light rays output from the light condensing film 410 are condensed (e.g. focused) within a cone of light rays confined to about 15–20 degrees about the normal vector drawn to the broad-band CLC reflective polarizing panel 8, without absorbing or otherwise dissipating the light during condensing operations. Notably, it is not necessary for the light condensing film to be a perfect collimator in order to ensure that (i) light rays of a particular polarization state, incident the broad-band CLC reflective polarizer 8, are transmitted therethrough with reduced polarization distortion, and that (ii) light rays incident the CLC-based spectral filtering structure are transmitted therethrough with minimal wavelength shifting as a function of viewing angle, associated with prior art CLC-based LCD panel designs. While it is preferred that the cone of light rays from each point on the light condensing film 410 be confined to about 15–20 degrees from the normal vector, it is understood that the degree of actual light condensation in any particular LCD panel design will take into consideration factors including the total thickness of the individual components as well as the total thickness of the LCD panel so that directly transmitted and recycled light rays fall incident upon the CLC-based spectral filtering structure so that viewing-angle dependent wavelength shifting effects will be minimized. Complex ray tracing models of the light rays propagating within the CLC-based LCD panel construction under design can be constructed and used to arrive at optimal levels of light condensing in any particular embodiment of the present invention.

In general, micro-lens arrays or other light refractive film structures having light condensing powers without significant energy absorption, can be used to realize the light condensing film 410 disposed between the light diffusive layer 400 and the broad-band CLC reflective polarizer 8. In such embodiments, the spatially period of the micro-lens array should have a substantially greater spatial period than the spatial period of the subpixel structures of the CLC-based spectral filtering structure 10. Alternatively, the non-absorbing light condensing film or optical element 410 can also be realized using transmission-type volume holograms as well as other light diffractive optical elements (DOEs) which can condense a spatial distribution of light on a super-subpixel basis, without absorbing energy contained therein.

Figure 4:
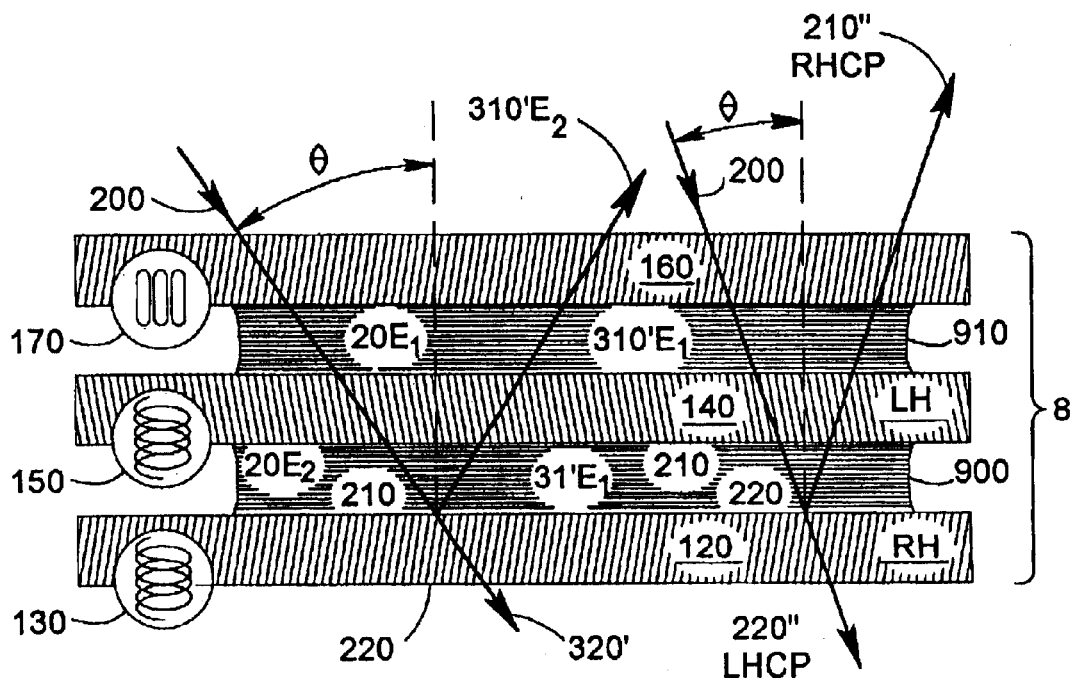
FIG. 4 is a cross-sectional schematic diagram of a super-wide-angle CLC-based reflective broadband polarizer employed in the LCD panel assembly of FIG. 2, shown comprising a CLC-based broadband polarizer with multiple compensation layers for the reflected light.
Figure 4A:
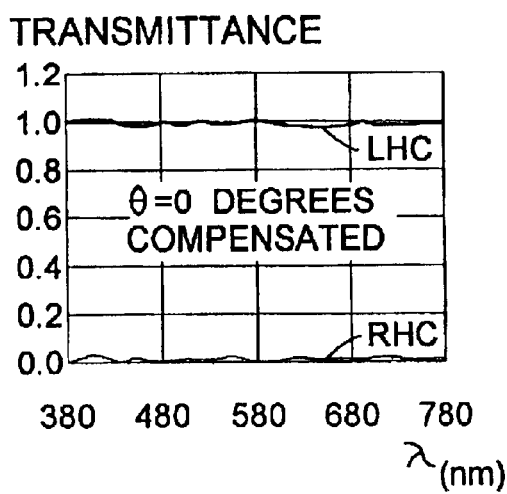
FIG. 4A is the transmittance characteristics for left handed and right handed circularly polarized (LHCP) and (RHCP) light incident upon and transmitted through super-wide-angle CLC-based reflective broadband polarizer employed in the LCD panel assembly of FIG. 2, at an angle of 0 degrees off the normal thereto.
Figure 4B:
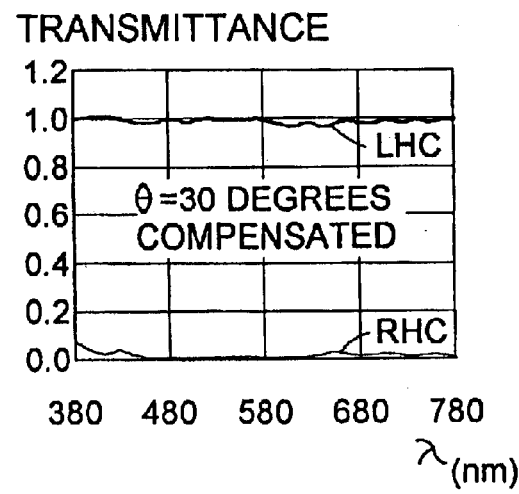
FIG. 4B is the transmittance characteristics for left handed and right handed circularly polarized (LHCP) and (RHCP) light incident upon and transmitted through super-wide-angle CLC-based reflective broadband polarizer employed in the LCD panel assembly of FIG. 2, at an angle of 30 degrees off the normal thereto.
Figure 4C:
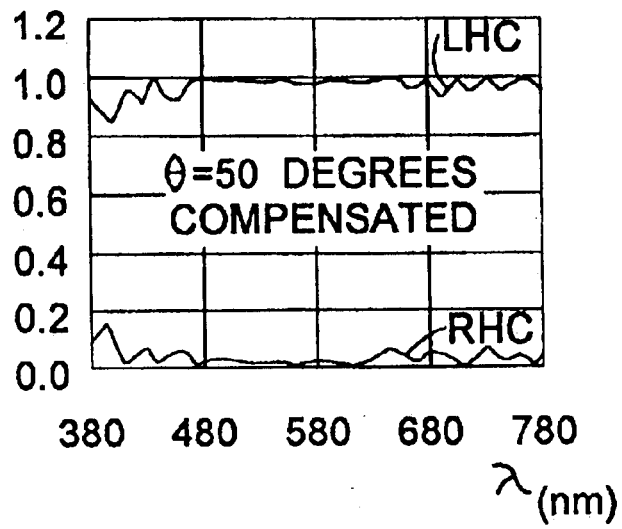
FIG. 4C is the transmittance characteristics for left handed and right handed circularly polarized (LHCP) and (RHCP) light incident upon and transmitted through super-wide-angle CLC-based reflective broadband polarizer employed in the LCD panel assembly of FIG. 2, at an angle of 50 degrees off the normal thereto.
Figure 4D:
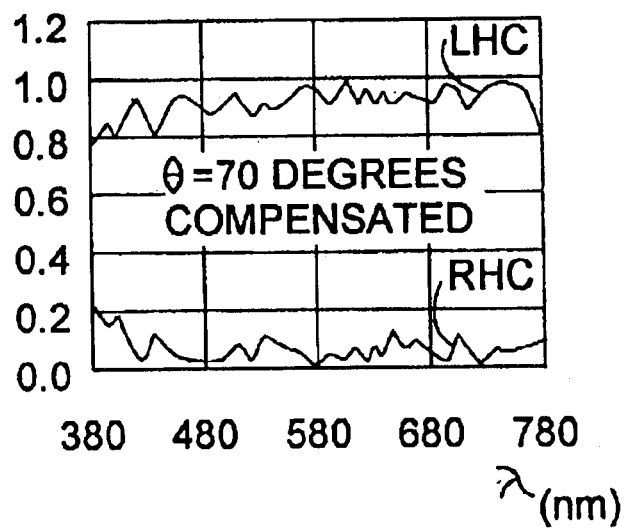
FIG. 4D is the transmittance characteristics for left handed and right handed circularly polarized (LHCP) and (RHCP) light incident upon and transmitted through super-wide-angle CLC-based reflective broadband polarizer employed in the LCD panel assembly of FIG. 2, at an angle of 70 degrees off the normal thereto.

As shown in FIG. 4, the super-wide-angle CLC-based reflective broadband polarizing panel (i.e. un-patterned film) 8 is provided with several phase compensation layers 140 and 160 attached to the top of the right handed CLC broadband polarizer 120 facing its long pitch side. As will be described in detail below, the function of these compensation layers is to ensure that polarized light transmitted by the broad-band CLC polarizing panel 8 does not orthogonal light components which result in significant distortion with the LCD panel assembly due to the fact that light rays, incident the broad-band CLC reflective polarizing panel are not substantially normal or perpendicular to the surface thereof. This compensated configuration acts as a super-wide-angle circular analyzer in both transmission and reflection modes. An adhesive 900 with an index of refraction for matching the index of refraction for layers 120 and 140 is used to increase the optical efficiency of the super-wide-angle CLC based reflective broadband circular polarizing film 8. A similar adhesive 910 is used between the layers 140 and 160.

As shown in FIG. 4, compensating layer 160 is a homeotropic film having its molecules lined up with the long axes perpendicular to the surface of the layer as shown in microscopic view 170. Homeotropic layers can be uniaxial films with vertical optical axis, low molecular weight liquid crystal films, or polymerizable liquid crystal films. Homeotropic layer 160 changes the incident circularly polarized light to elliptical with ±45-degree major axis orientation. Layer 140 is an infrared (IR) CLC layer with a helical structure having an axis perpendicular to the surface of layer 140. The pitch of the IR CLC film is outside the reflection band of the broadband polarizer. The CLC film can be any low molecular CLC material, polymerizable CLC material, or material with chiral structure, having constant or variable pitch in the IR region. The CLC material will reflect IR and transmit all other frequencies. The IR CLC layer 140 rotates the major axis and changes the shape of the ellipse so that the polarization state coincides with the eigen-state of the broadband polarizer 120. As FIGS. 4A through 4D show, with the configuration in FIG. 4, right handed circular light is completely reflected, and left-handed circular light is completely transmitted for incident angles up to at least 70 degrees for the entire visible range. Therefore, the CLC-based structure shown in FIG. 4 functions as a super-wide-angle CLC analyzer operating in both transmission and reflection modes. For normal or small angles of incidence θ, the transmitted left handed circular polarized light 220" and reflected right handed circularly polarized light 210" are approximately the same as without compensating layers 140 and 160 as FIGS. 4A through 4D shows, thus preserving the good behavior at small angles. For large angles of incidence θ, the eigen-states of the broadband polarizer 120 are elliptical, and thus right handed circular light 210 is partially reflected, and left-handed circular light 220 is partially reflected. Compensating layers 140 and 160 change the incident left-handed circular (right-handed circular) light to an elliptical state that is completely transmitted (reflected) from the polarizer 120.

The CLC-based structure shown in FIG. 4 also acts as a super-wide-angle CLC polarizer operating in reflection mode. Unpolarized light remains unpolarized when passing through layers 160 and 140. For incident light 200 normal or near normal to the surface, the light 210' reflected from the broadband polarizer 120 is circularly polarized, and it will pass practically unchanged through layers 140 and 160. As before with the uncompensated RH CLC broadband polarizer 120, normal or near normal light will be reflected as light 210" and transmitted as light 220" with values close to the uncompensated light 210' and 220' (shown in FIG. 1D) which are both circularly polarized with opposite handedness.

For incident light 200 at larger angles of incidence, as shown on the left-hand portion of FIG. 4, unpolarized incident light emerges from homeotropic layer 160 as light $200_{E1}$ which is still unpolarized light, it then passes through IR CLC layer 16 and emerges as light $200_{E2}$, which is still unpolarized light in the visible region. As before, the light is polarized at the right handed CLC broadband polarizer 120. However, as light 310' is a mixture of right handed and left handed circularly polarized light passes through IR CLC layer 140, it will be acted on and transformed by rotating the major axis to ±45 degrees emerging as 310 '$_{E1}$. Preferably, the IR CLC layer should be left handed when combined with a right handed broadband polarizer, or the order of the two compensation films should be reversed. The light then enters homeotropic layer 160 where it is converted into circularly polarized light emerging as light 310'.

FIGS. 4A through 4D graphically show the transmittance of the right handed 210 and left handed circularly polarized light 220 at different angles of incidence for the CLC broadband polarizer 120. FIGS. 4A through 4D also shows the comparative transmittance compensated by compensation layers 140 and 160. Compensation films 140 and 160 are used to correct for the distortions at large angles of incidence while retaining the characteristics of undistorted light at normal incidence and small angles of incidence.

FIGS. 4A through 4D show that when white visible light is used as the unpolarized light 200, the reflected beam 210" for low incident angles and beam 310 '$_{E2}$ for large incident angles, as seen through a perfect circular analyzer, of the super-wide-angle CLC based broadband circular polarizer, as shown in FIG. 4, is about 50% showing that it is a good polarizer in reflection mode all across the visible spectrum for angles up to at least 70 degrees. As described above, the incident light 200 on the helixes 130 of the CLC broadband polarizer 120, when at large angles of incidence, sees an elliptical cross section and not a circular cross section as light normal to the surface would see. Therefore, at oblique incident angles the eigen-states of the uncompensated broad-band polarizer 120 are not circular but elliptical, and the role of the compensation films for the polarizer in reflection mode is to convert the elliptically polarized reflected light 310' back to circular.

Figure 4E:
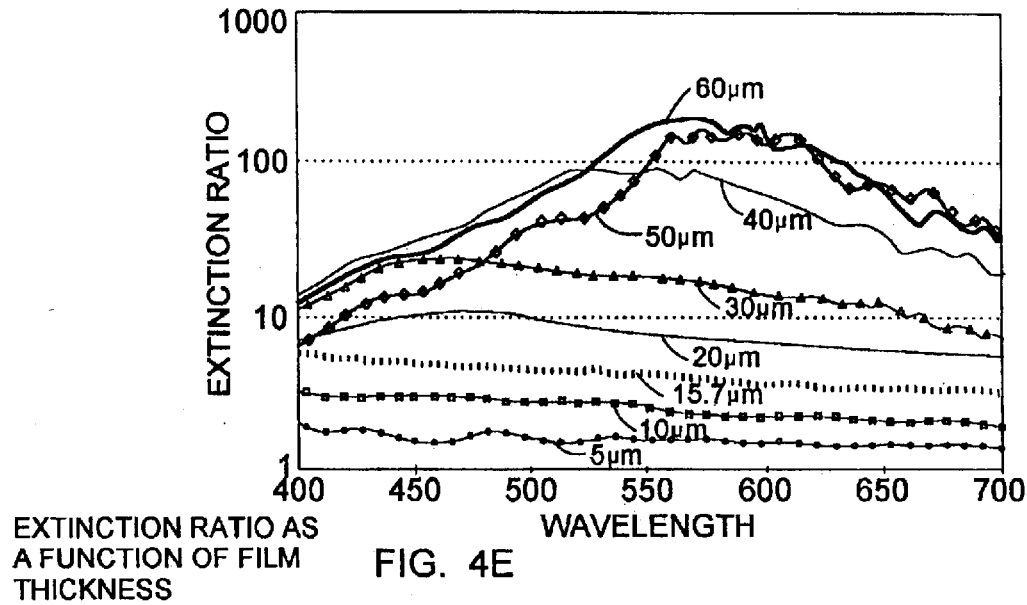
FIG. 4E is a schematic representation plotting the extinction ratio of the super-wide-angle CLC-based reflective broadband polarizer used in the LCD panel assembly of FIG. 2, as a function of the film thickness thereof.

In order to achieve saturated reflection and transmission from the broadband polarizer 120 for a large bandwidth, sufficient thickness and large enough birefringence are a prerequisite, as illustrated in the characteristics shown in FIG. 4E. Under these conditions the CLC broadband polarizers 120 exhibit the universal behavior that the light reflected 310 or transmitted 320 through the CLC broadband polarizing film 120 at large incident angles has polarization state such that the orientation of the major axis of the polarization ellipse is either in or perpendicular to the plane of incidence. Light with such a polarization state cannot be converted back to circular by homeotropic films 160 only, because these films exhibit only linear, and not the necessary circular birefringence. Only light that has a major axis orientation of its polarization ellipse at ±45 degrees with respect to the incident plane can be successfully converted back to circular at oblique incident angles using homeotropic films with positive and/or negative birefringence.

The major axis orientation of the light reflected from the CLC broadband polarizer 120 can be rotated by the IR CLC film to approximately +45 or −45 degrees. The role of IR CLC layer 140 is to rotate the major axis of the polarization ellipse of reflected light 310' to +45 or −45 degrees, and at the same time change the shape of the ellipse, after which the light can be converted to circular with an appropriate homeotropic film 160.

Figure 4F:
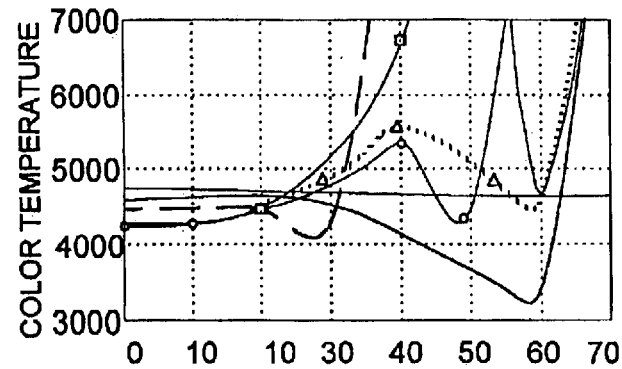
FIG. 4F is a schematic representation plotting the color temperature characteristics of the super-wide-angle CLC-based reflective broadband polarizer used in the LCD panel assembly of FIG. 2, as a function of the angle of incidence, for different film thicknesses and $\Delta n=0.15$.
Figure 4G:
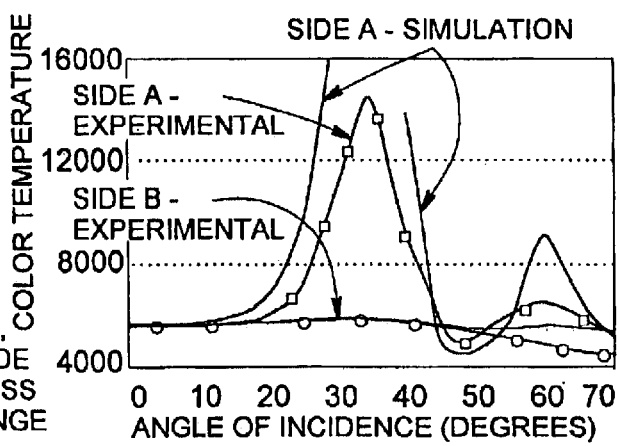
FIG. 4G is a schematic representation plotting the color temperature characteristics of the super-wide-angle CLC-based reflective broadband polarizer used in the LCD panel assembly of FIG. 2, as a function of the angle of incidence, for different film thicknesses and $\Delta n=0.20$.

As shown in FIGS. 4F and 4G, the broad-band CLC reflective polarizing panel 8 described above provides the LCD panel system of the present invention with a significant improvement in angular viewing performance, as indicated by the color temperature characteristics plotted as a function of angle of incidence for difference film thicknesses and birefringence measures.

For further details on the construction of the broad-band CLC reflective polarizer 8, reference can be made to copending application Ser. No. 09/312,164 entitled "Super-Wide-Angle Cholesteric Liquid Crystal Based Reflective Broadband Polarizing Films" by Hristina G. Galabova and Le Li, filed May 14, 1999, incorporated herein by reference as if set forth fully herein.

Figures 5, 5A:
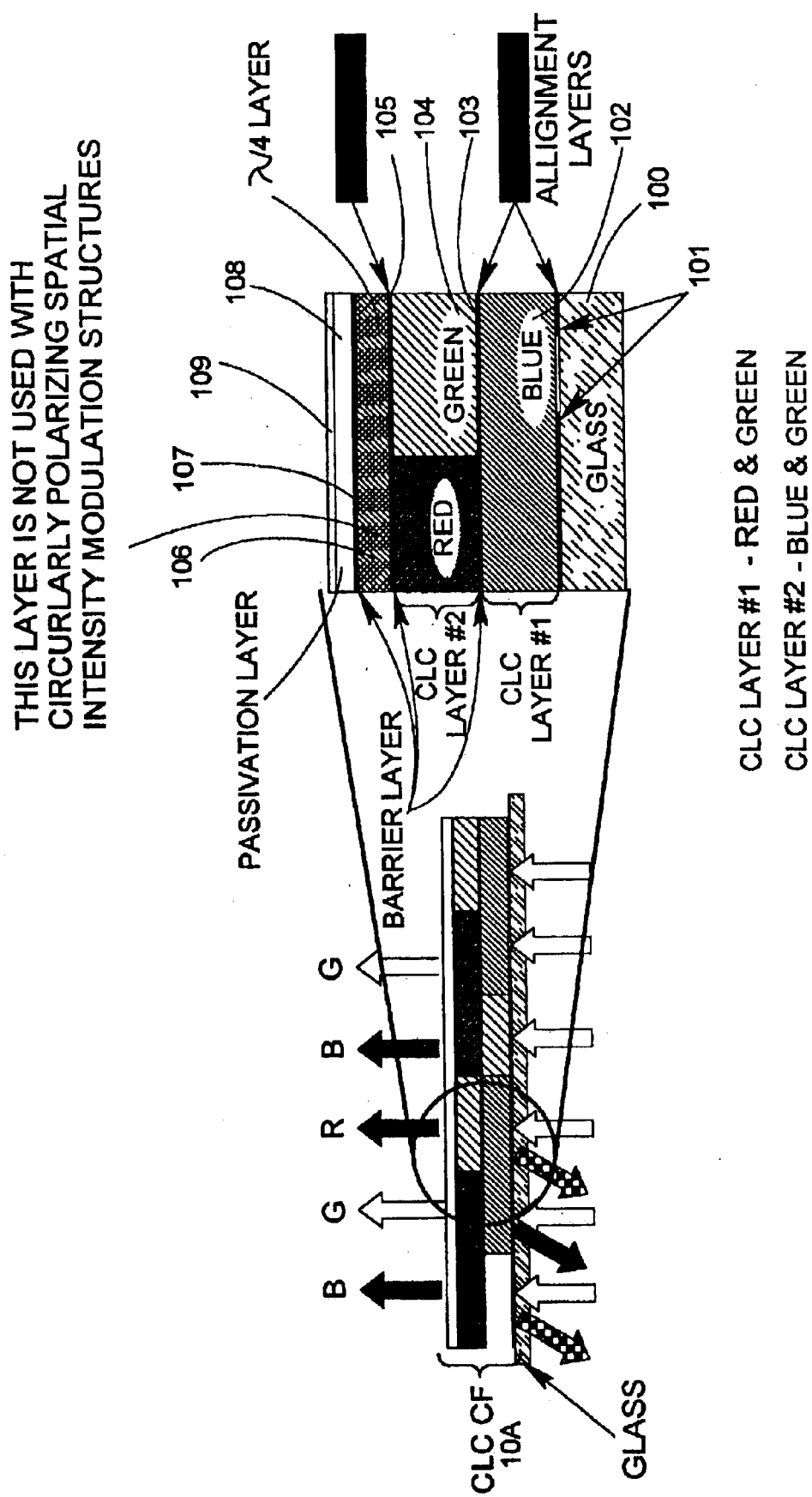
FIG. 5 is a schematic representation of the a first illustrative embodiment of a two-layer CLC-based spectral filtering structure employed in the LCD panel assembly shown in FIG. 2.
FIG. 5A is an enlarged view of the two-layer CLC-based spectral filtering structure schematically depicted in FIG. 5.

In FIGS. 5 through 5B2, a first illustrative embodiment of the CLC-based spectral filtering structure hereof, indicated by 10A, is shown in greater detail. As shown in FIG. 5A, the CLC spectral filtering structure 10A comprises: a glass plate 100; a patterned layer of patterned CLC broad-band film 101 deposited in the surface of the glass plate 100 and spatially registered with the regions of TFTs and wiring on the spatial intensity modulation structure 9, between subpixel transmission apertures therewithin; a first CLC layer 102 having two different spectrally-tuned color band regions formed therein; a first barrier layer 103 on the first CLC layer 102; a second CLC layer 104 having two different spectrally-tuned color band regions formed therein; a second barrier layer 105 formed on the second CLC layer 103; a quarter-wave phase retardation layer 106 disposed upon the second barrier layer (i.e. only in those embodiments using a linearly polarizing spatial intensity modulation panel as shown in FIGS. 30A1 and 30A2, and 32A1 and 32A2, but not in embodiments using a circularly polarizing spatial intensity modulation panel as shown in FIGS. 3A1 and 3A2 and 31A1 and 31A2); a third barrier layer 107 (i.e. only when the quarter-wave phase retardation layer 106 is used); a passivation layer 108; and an unpatterned ITO layer 109, as shown in FIG. 5A In FIG. 5B1, a complete pixel structure within the two-layer CLC spectral filter structure 10A of FIG. 5A is shown in greater detail. As shown in FIG. 5B1, each blue subpixel structure therein is realized by a green-band reflecting region in the first CLC layer 102 and a red band reflecting region in the second CLC layer 104; each green subpixel structure therein is realized by a blue band reflecting region in the first CLC layer 102 and a red band reflecting region in the second CLC layer 104; and each red subpixel structure therein is realized by a blue band reflecting region in the first CLC layer 103 and a green-band reflecting region in the second CLC layer 104. The patterned broad-band CLC reflective layer 101 provided beneath the first CLC layer 102 on glass plate 100 is shown in greater detail in FIG. 5B2. The function of this broad-band reflective pattern 101 on glass plate 100 is to provide a broad-band inter-subpixel "white or silver" reflective matrix-like pattern between neighboring subpixel regions; in order to improve light recycling off the TFT and associated wiring regions surrounding the light transmission aperture of each and every subpixel realized the liquid crystal (LC) spatial-intensity modulation panel of the LCD panel assembly of FIG. 2. By virtue of the fact that inter-subpixel reflective matrix pattern 101 is made from broad-band CLC film, as taught in U.S. Pat. No. 5,691,789, there is no need for quarter-wave retarders as taught in U.S. Pat. No. 5,822,029, as polarization state conversion does not occur upon reflection of incident light a broad-band CLC reflective film, in contrast with specular or quasi-specular reflectors made from metallic film material.

Figure 10:
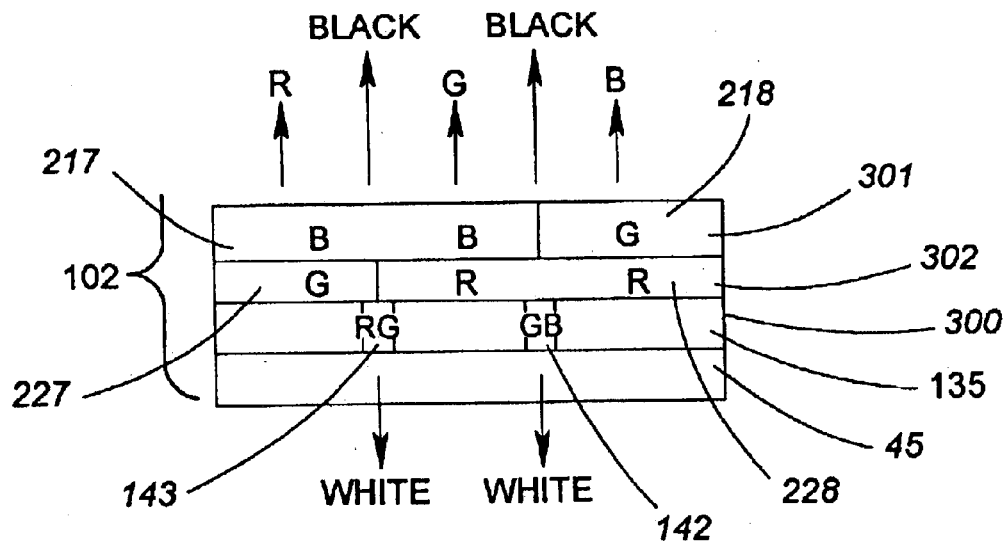
FIG. 10 is a schematic representation of a third illustrative embodiment of the CLC-based spectral filtering structure shown in FIG. 2, wherein each red subpixel structure therein is realized by a green-band reflecting region in the first CLC layer and a blue band reflecting region in the second CLC layer, wherein each green subpixel structure therein is realized by a green-red band reflecting region in the first CLC layer and a clear (non-reflecting) region in the second CLC layer, wherein each blue subpixel structure therein is realized by a red band reflecting region in the first CLC layer and a green-band reflecting region in the second CLC layer, and a green-blue band reflecting pattern and quarter-wave retardation surface thereover are provided beneath the first CLC layer in order to realize the broad-band inter-subpixel "white" reflective matrix-like pattern between neighboring subpixel regions.
Figure 11:
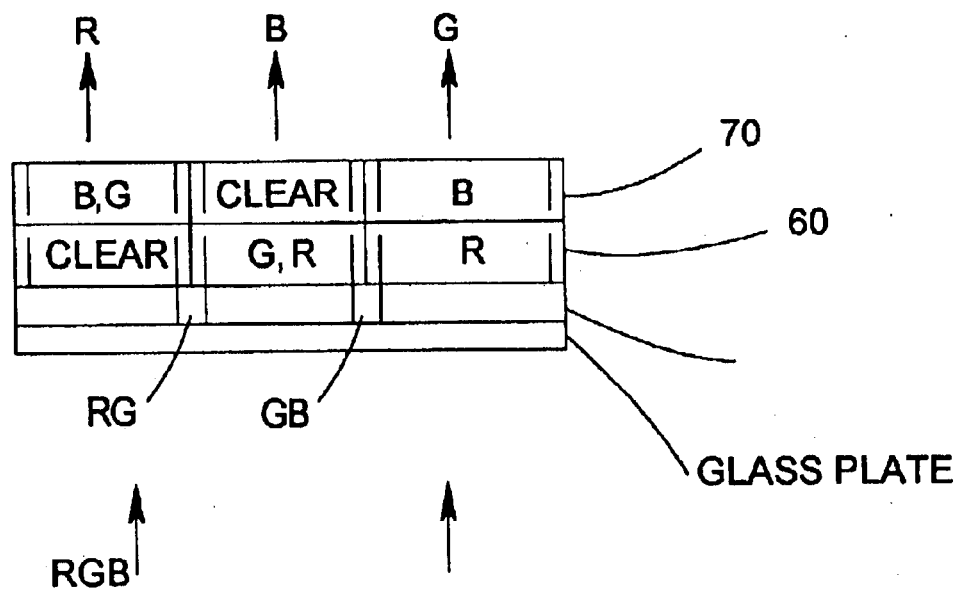
FIG. 11 is a schematic representation of a fourth illustrative embodiment of the CLC-based spectral filtering structure shown in FIG. 2, wherein each red subpixel structure therein is realized by a clear (non-reflecting) region in the first CLC layer and a blue-green band reflecting region in the second CLC layer, wherein each blue subpixel structure therein is realized by a green-red band reflecting region in the first CLC layer and a clear (non-reflecting) region in the second CLC layer, wherein each green subpixel structure therein is realized by a red band reflecting region in the first CLC layer and a blue-band reflecting region in the second CLC layer, and a broad-band reflecting pattern and quarter-wave retardation surface thereover are provided beneath the first CLC layer in order to realize the broad-band inter-subpixel "white" reflective matrix-like pattern between neighboring subpixel regions.
Figure 11A:
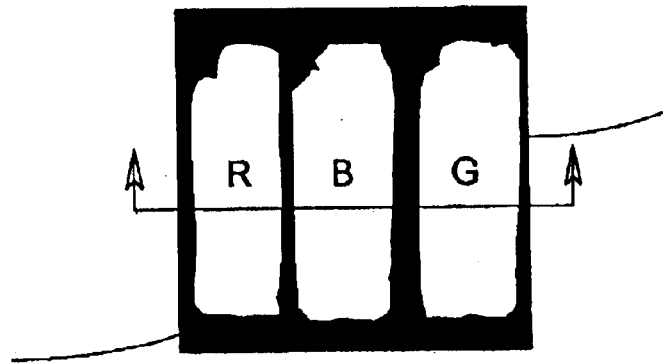
FIG. 11A is a schematic representation of an exemplary broad-band inter-subpixel "white" reflective matrix-like pattern formed about a single pixel structure (comprising red, green and blue subpixel structures) disposed beneath the lower CLC-filter layer of the CLC-based spectral filtering structure depicted in FIG. 11.
Figure 13:
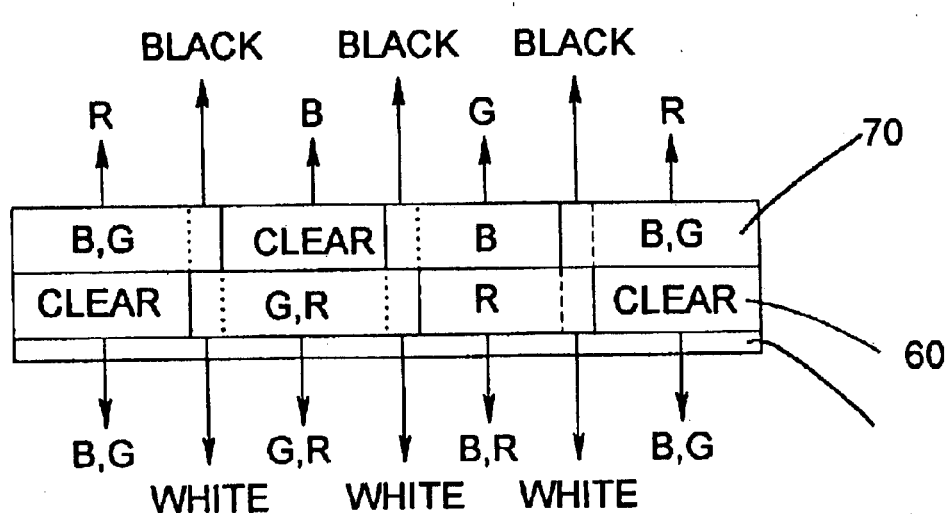
FIG. 13 is a schematic representation of a fifth illustrative embodiment of the CLC-based spectral filtering structure shown in FIG. 2, wherein each red subpixel structure therein is realized by a clear (non-reflecting) region in the first CLC layer and a blue-green band reflecting region in the second CLC layer, wherein each blue subpixel structure therein is realized by a green-red band reflecting region in the first CLC layer and a clear (non-reflecting) region in the second CLC layer, wherein each green subpixel structure therein is realized by a red band reflecting region in the first CLC layer and a blue-band reflecting region in the second CLC layer, and a broad-band inter-subpixel "white" matrix-like pattern is integrally-embodied within the spectral filtering structure, between neighboring subpixel regions, by virtue of (i) the spatially-overlapping green-red band reflecting regions in the first CLC layer and the blue-green band reflecting regions in the second CLC layer, and also (ii) the spatially-overlapping green-red band reflecting regions in the first CLC layer and the blue band reflecting regions in the second CLC layer.
Figure 13A:
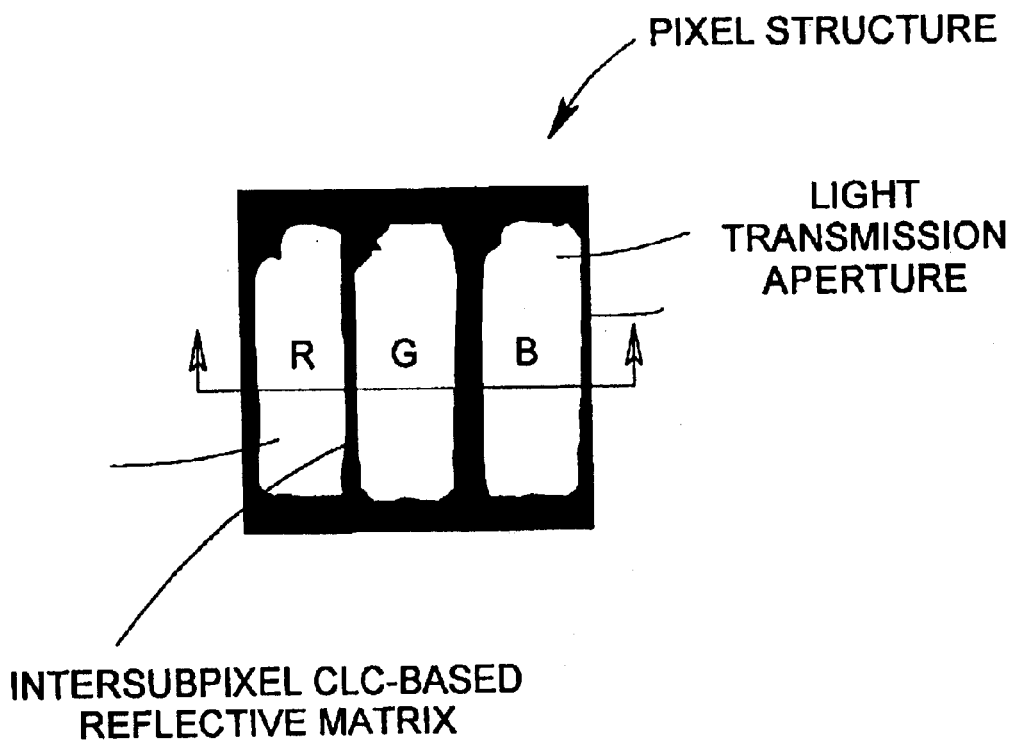
FIG. 13A is a schematic representation of the 2-D spatial layout of an exemplary broad-band inter-subpixel "white" matrix-like pattern integrally-embodied within the CLC-based spectral filtering structure depicted in FIG. 13.

Alternative ways of realizing reflective-type inter-subpixel matrix patterns 101 are detailed in alternative embodiments of the CLC-based spectral filter structures of the present invention, namely: in the spectral filter structure of FIG. 10, blue-green reflecting patterns 143 and 142 are disposed beneath the intersubpixel boundaries to achieve broad band reflection at the subpixel interface regions; in the spectral filter of FIG. 11, red-blue reflecting regions are disposed beneath BG reflecting and green-red reflecting regions, and green-blue reflecting regions are disposed beneath green-red reflecting regions and blue reflecting regions to achieve broad band reflection at the subpixel interface regions; and in the spectral filter of FIG. 13, blue-green reflecting regions are spatially overlapped with green-red reflecting regions, and green-red reflecting regions are spatially overlapped with blue reflecting regions so as to achieve broad band reflection at the subpixel interface regions, without the use of extra CLC reflective film patterns to achieve broad-band reflection at the intersubpixel regions along the surface of the spectral filtering structure.

Figure 6A:
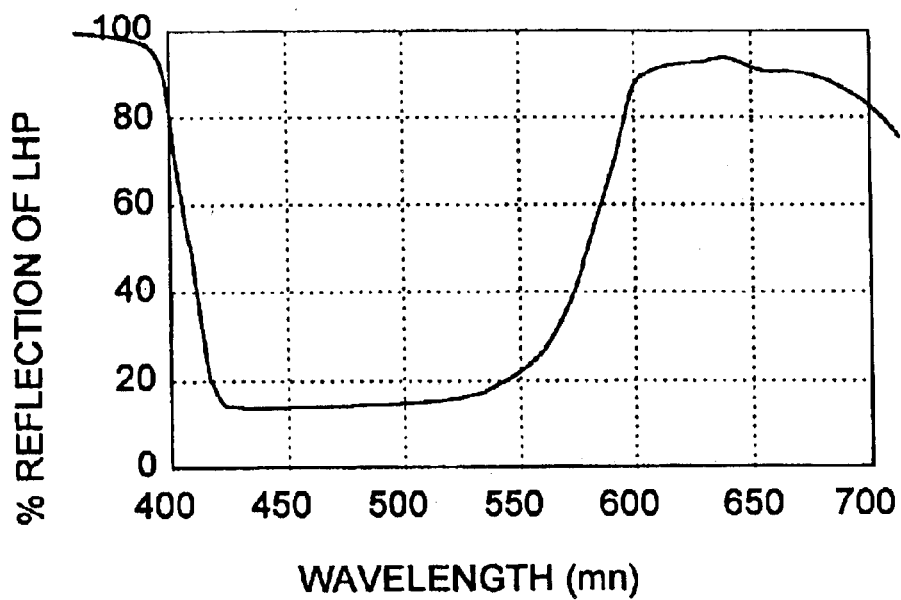
FIG. 6A is a schematic representation graphically illustrating the actual spectral reflection characteristics of a "red-band" reflecting region formed in the second (i.e. top) patterned CLC layer of the CLC-based spectral filtering structure depicted in FIGS. 5 through 5B1, made using CLC film fabrication methods of the present invention disclosed herein, showing that spectral wavelengths residing within the red-band of the electromagnetic spectrum and having a LHCP state are strongly reflected from the layer, while spectral wavelengths residing within the blue and green bands and having a LHCP polarization state are weakly reflected from the layer.
Figure 6B:
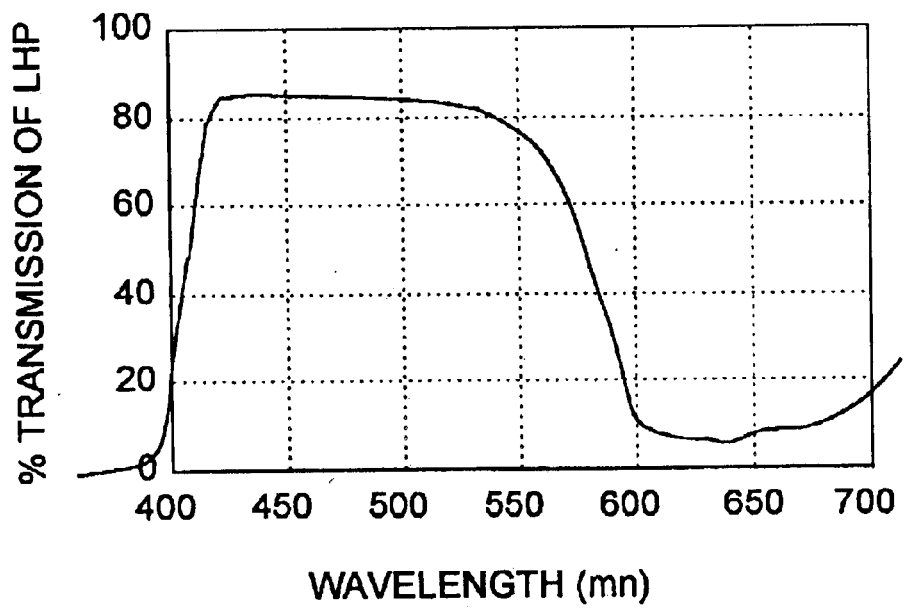
FIG. 6B is a schematic representation graphically illustrating the actual spectral transmission characteristics of a "red-band" reflecting region formed in the second (i.e. top) patterned CLC layer of the CLC-based spectral filtering structure depicted in FIGS. 5 through 5B1, made using CLC film fabrication methods of the present invention disclosed herein, showing that spectral wavelengths residing within the blue and green bands of the electromagnetic spectrum and having a LHCP state are strongly transmitted through the layer, while spectral wavelengths residing within the red band and having a LHCP polarization state are weakly transmitted through the layer.
Figure 6C:
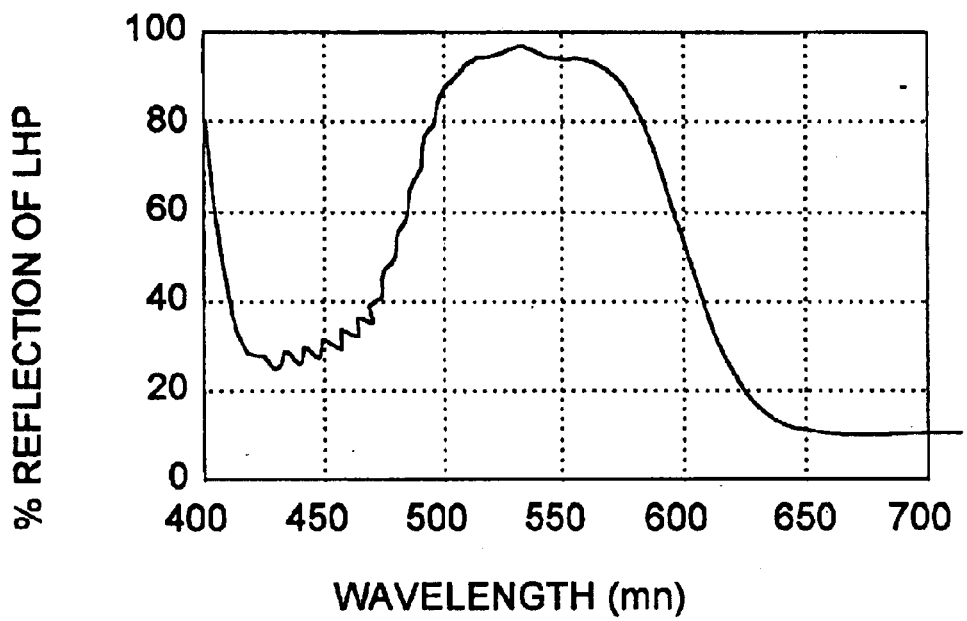
FIG. 6C is a schematic representation graphically illustrating the actual spectral reflection characteristics of a "green-band" reflecting region formed in the second (i.e. top) patterned CLC layer of the CLC-based spectral filtering structure depicted in FIGS. 5 through 5B1, made using CLC film fabrication methods of the present invention disclosed herein, showing that spectral wavelengths residing within the green-band of the electromagnetic spectrum and having a LHCP state are strongly reflected from the layer, while spectral wavelengths residing within the blue and red bands and having a LHCP polarization state are weakly reflected from the layer.
Figure 6D:
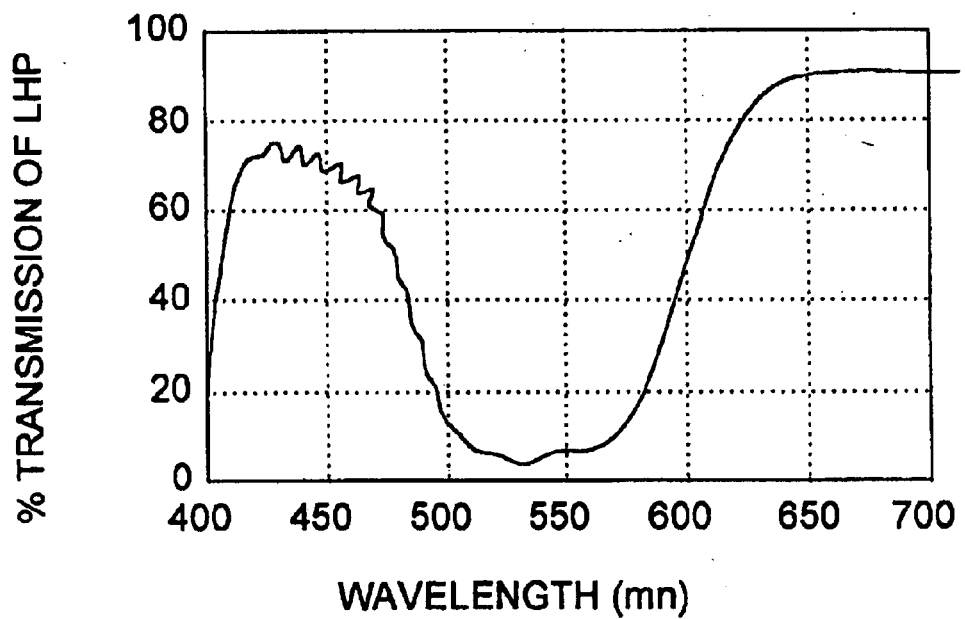
FIG. 6D is a schematic representation graphically illustrating the actual spectral transmission characteristics of a "green-band" reflecting region formed in the second (i.e. top) patterned CLC layer of the CLC-based spectral filtering structure depicted in FIGS. 5 through 5B1, made using CLC film fabrication methods of the present invention disclosed herein, wherein spectral wavelengths residing within the blue and red bands of the electromagnetic spectrum and having a LHCP state are strongly transmitted through the layer, while spectral wavelengths residing within the green band and having a LHCP polarization state are weakly transmitted through the layer.
Figure 6E:
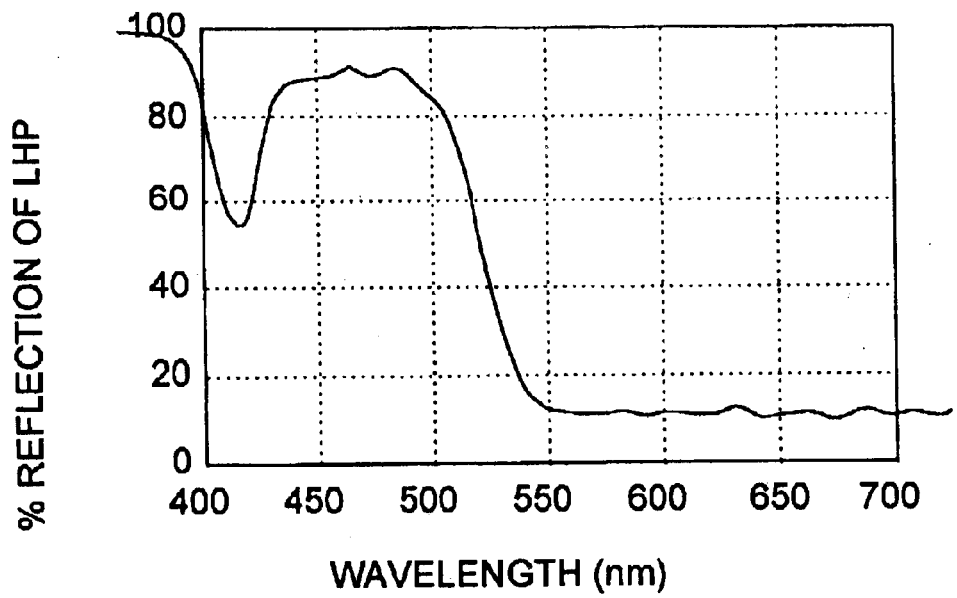
FIG. 6E is a schematic representation graphically illustrating the actual spectral reflection characteristics of a "blue-band" reflecting region formed in the second (i.e. top) patterned CLC layer of the CLC-based spectral filtering structure depicted in FIGS. 5 through 5B1, made using CLC film fabrication methods of the present invention disclosed herein, showing that spectral wavelengths residing within the blue-band of the electromagnetic spectrum and having a LHCP state are strongly reflected from the layer, while spectral wavelengths residing within the green and red bands and having a LHCP polarization state are weakly reflected from the layer.
Figure 6F:
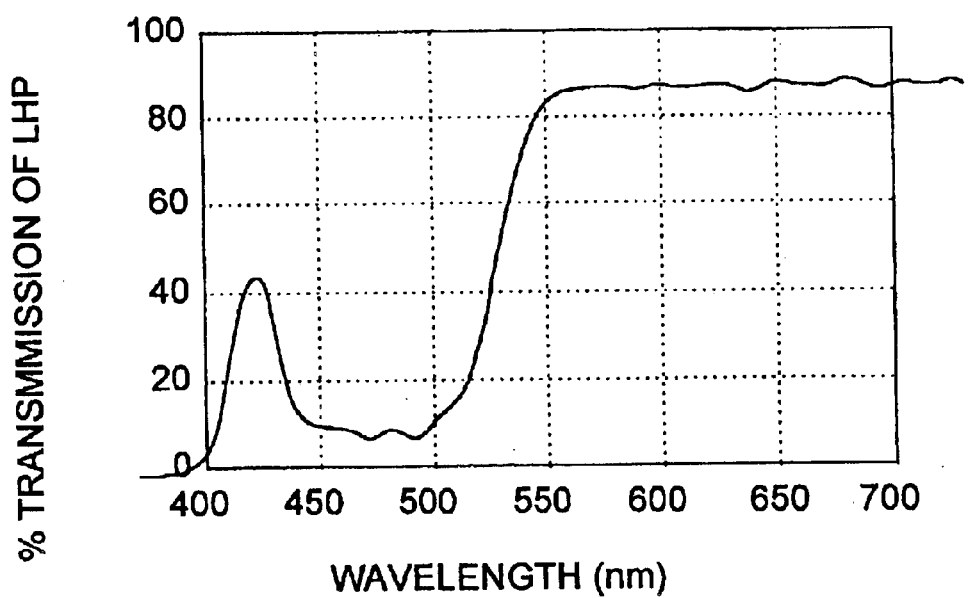
FIG. 6F is a schematic representation graphically illustrating the actual spectral transmission characteristics of a "blue-band" reflecting region formed in the second (i.e. top) patterned CLC layer of the CLC-based spectral filtering structure depicted in FIGS. 5 through 5B1, made using CLC film fabrication methods of the present invention disclosed herein, showing that spectral wavelengths residing within the green and red bands of the electromagnetic spectrum and having a LHCP state are strongly transmitted through the layer, while spectral wavelengths residing within the blue band and having a LHCP polarization state are weakly transmitted through the layer.
Figure 6G:
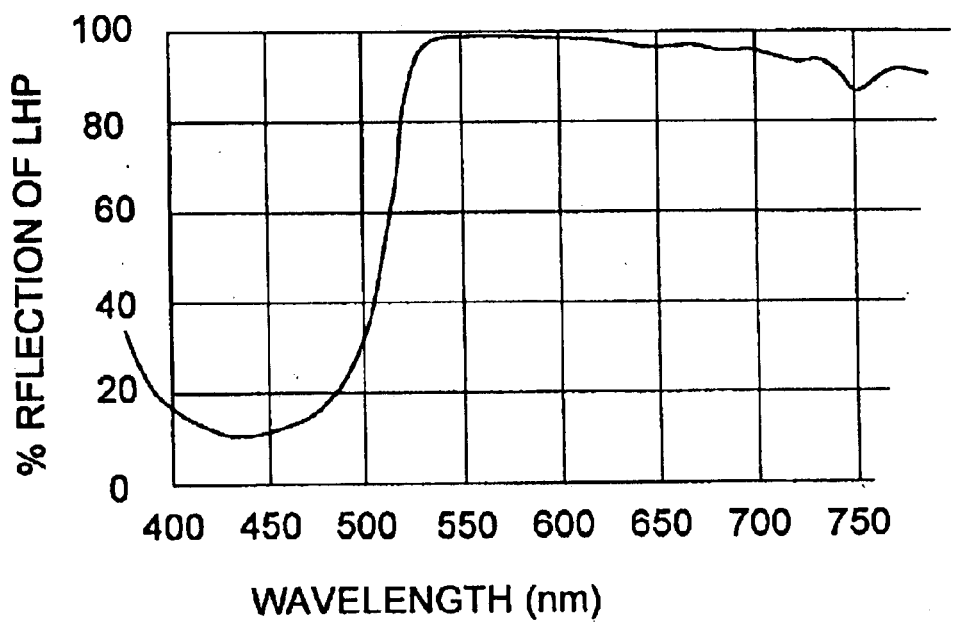
FIG. 6G is a schematic representation graphically illustrating the actual spectral reflection characteristics of a "blue" subpixel region formed by the composition of the CLC layers in the CLC-based spectral filtering structure depicted in FIGS. 5 through 5B1, made using CLC film fabrication methods of the present invention disclosed herein, showing that spectral wavelengths residing within the green and red bands of the electromagnetic spectrum and having a LHCP state are strongly reflected from the subpixel structure, while spectral wavelengths residing within the blue band and having a LHCP polarization state are weakly reflected from the layer (i.e. strongly transmitted therethrough)
Figure 6H:
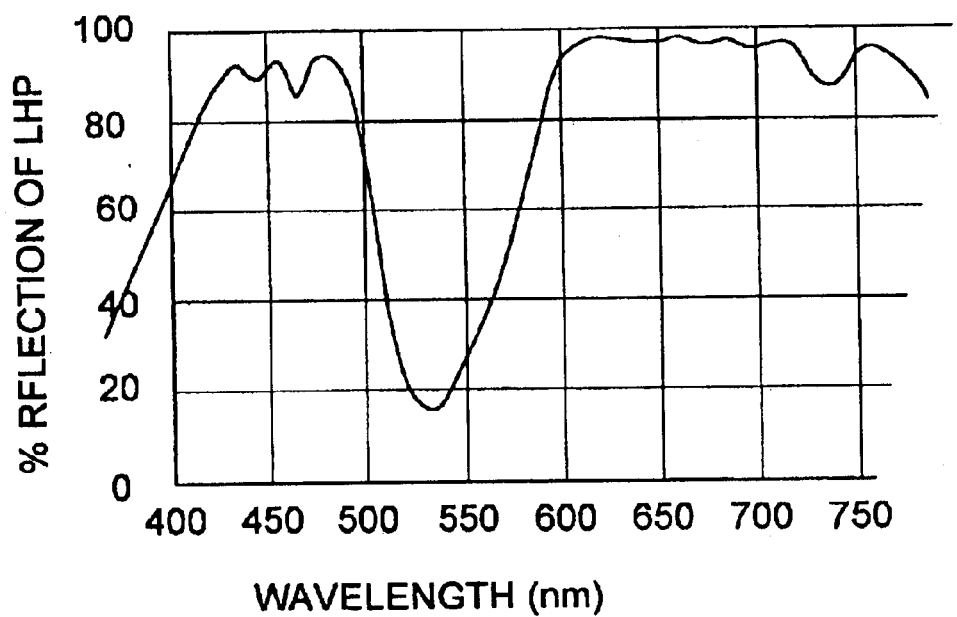
FIG. 6H is a schematic representation graphically illustrating the actual spectral reflection characteristics of a "green" subpixel region formed by the composition of the CLC layers in the CLC-based spectral filtering structure depicted in FIGS. 5 through 5B1, made using CLC film fabrication methods of the present invention disclosed herein, showing that spectral wavelengths residing within the blue and red bands of the electromagnetic spectrum and having a LHCP state are strongly reflected from the subpixel structure, while spectral wavelengths residing within the green band and having a LHCP polarization state are weakly reflected from the layer (i.e. strongly transmitted therethrough)
Figure 6I:
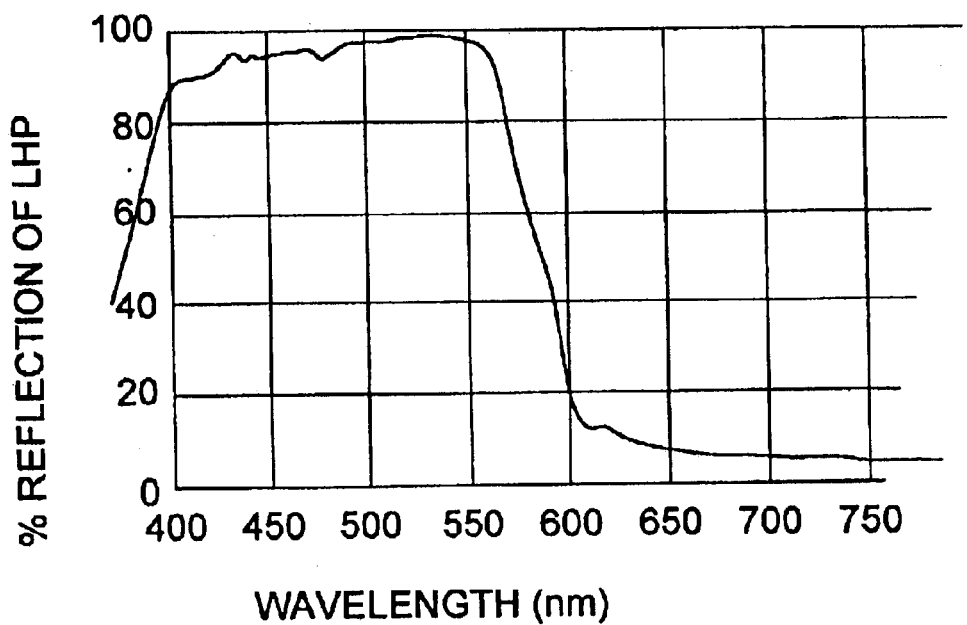
FIG. 6I is a schematic representation graphically illustrating the actual spectral reflection characteristics of a "red" subpixel region formed by the composition of the CLC layers in the CLC-based spectral filtering structure depicted in FIGS. 5 through 5B1, made using CLC film fabrication methods of the present invention disclosed herein, showing that spectral wavelengths residing within the blue and green bands of the electromagnetic spectrum and having a LHCP state are strongly reflected from the subpixel structure, while spectral wavelengths residing within the red band and having a LHCP polarization state are weakly reflected from the layer (i.e. strongly transmitted therethrough)
Figure 6J:
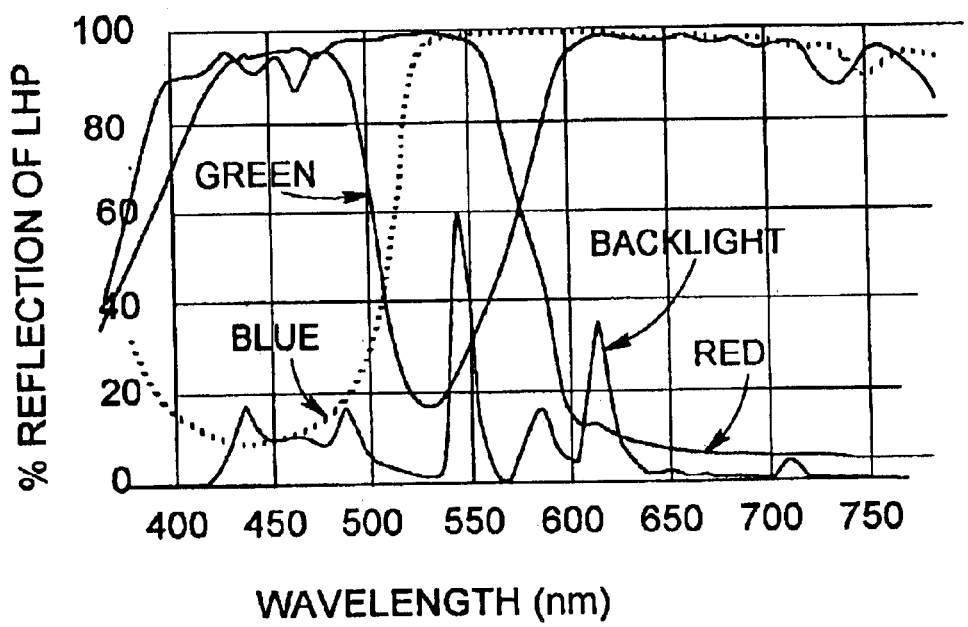
FIG. 6J is a schematic representation graphically illustrating the actual spectral reflection characteristics of the "blue, green and red" subpixel regions in the CLC-based spectral filtering structure depicted in FIGS. 5 through 5B1, plotted against the spectral emission characteristics of a cold cathode tungsten backlighting structure, employable within the LCD panel assembly of the present invention.
Figure 7C:
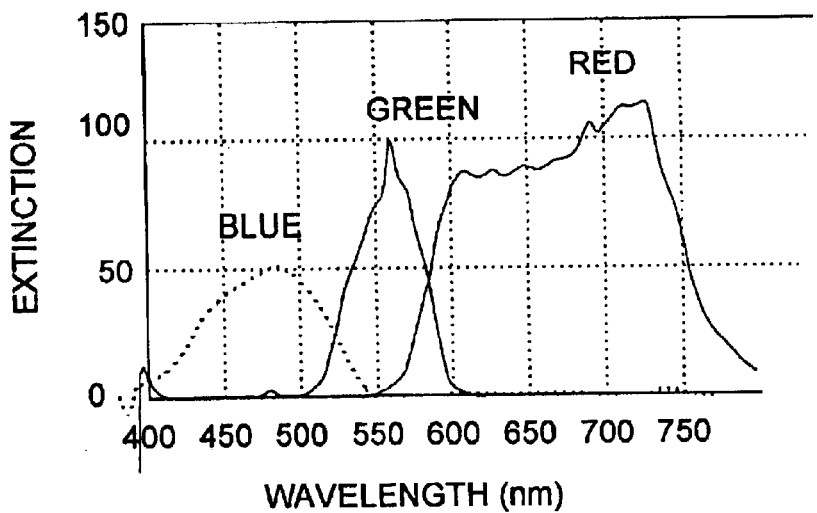
FIG. 7C is a schematic representation of the extinction ratio characteristics, plotted as function of wavelength, for each pixel structure in the actual LCD panel assembly constructed in accordance with FIGS. 2 through 5C using the CLC-based spectral filtering structure specified by the spectral reflection and transmission characteristics shown in FIGS. 6A through 6J.

In FIGS. 6A through 6F, actual spectral reflection and transmission characteristics for the first and second CLC layers for a prototype CLC spectral filtering structure are shown. In FIGS. 6G through 6I, the actual composite spectral reflection characteristics for the blue, green and red subpixel structures within the prototype CLC spectral filtering structure are shown. In FIG. 6J, the actual composite spectral reflection characteristics for the subpixel structures of the CLC spectral filtering structure are plotted against the spectral emission characteristics for the cold-cathode tungsten illuminated backlighting panel of the first illustrative embodiment. The improved color purity of the prototype CLC spectral filtering structure is indicated by the sample coordinates plotted on the chromaticity diagram shown in FIG. 7A. The improved color gamut of the prototype CLC spectral filtering structure is indicated by the sample coordinates plotted on the chromaticity diagram shown in FIG. 7B. The improved extinction characteristics of the prototype CLC spectral filtering structure are graphically illustrated in the extinction versus wavelength plot shown in FIG. 7C. Notably, the measured coordinates plotted on the chromaticity diagrams of FIGS. 7D1 through 7D3, indicate that one can expect significant improvements in the angular performance of the CLC-based LCD panel design of FIGS. 2B1 and 2B2 provided that the light condensing film 410 is disposed between the light diffusive layer 400 and the broad-band CLC reflective polarizing panel 8, and the light diffusive layer 400 is applied to the surface of the broad-band polarizing analyzer 11 as shown in FIG. 2 and described hereinabove. In FIGS. 7D1 through 7D3, the use of the subsystem comprising light condensing film 410 and light diffusive film 420 is indicated by the label "w/Condensing/Diffusing Film Layer System" or "w/CDFLS", whereas non-use thereof is indicated by "w/o CDFLS". Clearly, when using the CDFLS of the present invention, one can expect significant improvements in the angular performance of the CLC-based LCD panel assembly of the present invention (i.e. a significant reduction in color shifts as the viewer views the panel from 0 to 60 degrees away from the normal vector drawn to the surface of the display panel).

As shown in FIGS. 3A1 and 3A2, the pixelated polarization rotating array 9 of the first illustrative embodiment is realized as an array of electronically-controlled circular polarization rotating elements 9" which rotate the circularly polarized electric field from the LHCP direction to the RHCP direction as the light rays are transmitted through the spatially corresponding pixels in the LCD panel. In the illustrative embodiment of FIGS. 3A1 and 3A2, each electronically-controlled circular polarization rotating element 9A", 9B", 9C" can be realized as a π-cell, whose operation is by controlled by a control voltage well known in the art. In its electrically-inactive state (i.e. no-voltage is applied), the electric field intensity of light exiting from each π-cell is substantially zero and thus a "dark" level is produced. In its electrically-active state (i.e. threshold voltage $V_T$ is applied), the electric field intensity of light exiting from the cell is substantially non-zero and thus a "bright" subpixel level is produced.

In the illustrative embodiment of FIGS. 3A1 and 3A2, the array of spectral filtering elements 10A", 10B", 10C" is realized as an array of pass-band circularly polarizing reflective elements 10" formed within a single plane. As indicated in FIGS. 3A1 and 3A2, each pass-band circularly polarizing reflective element in the pixelated pass-band circularly polarizing panel 10" has a RHCP characteristic polarization state, whereas the broad-band circularly polarizing reflective panel 8" adjacent backlighting panel 7 has an LHCP characteristic polarization state and the broad-band circularly polarizing reflective panel 11" has a characteristic polarization state RHCP.

Figure 3D:
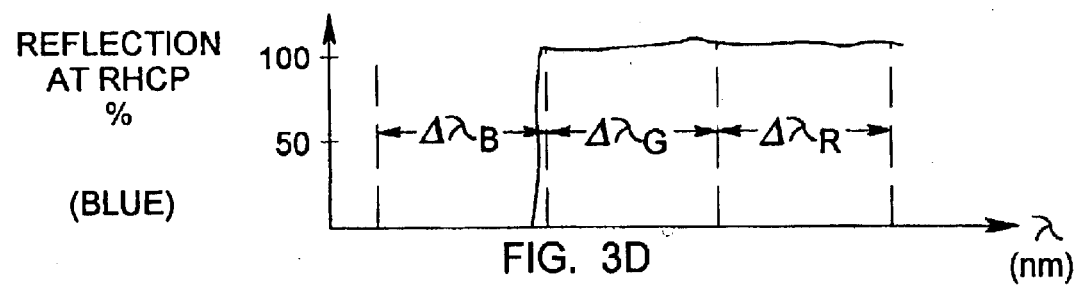
FIG. 3D is a schematic representation graphically illustrating ideal reflection characteristics for the pass-band circularly polarizing (RHCP) reflective filter element associated with each "blue" subpixel of the LCD panel of FIGS. 3A1 and 3A2, indicating how such a non-absorbing spectral filter element responds to incident broad-band illumination having circular polarization state RHCP.

As shown in FIG. 3D, each pass-band polarizing reflective element 10C" associated with a "blue" subpixel in the pixelated pass-band circularly polarizing panel 10" is particularly designed to reflect nearly 100% all spectral components having the RHCP characteristic polarization state and wavelengths within the green reflective band $\Delta\lambda_G$ and the red reflective band $\Delta\lambda_R$, whereas all spectral components having the RHCP characteristic polarization state and a wavelength within the blue reflective band $\Delta\lambda_B$ are transmitted nearly 100% through the pass-band polarizing reflective element. The pass-band polarizing reflective element associated with each "blue" subpixel is "tuned" during fabrication in the manner described hereinabove.

Figure 3E:
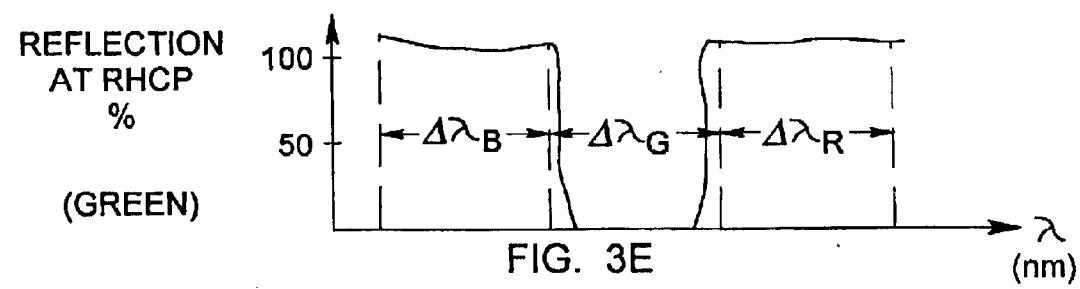
FIG. 3E is a schematic representation graphically illustrating ideal reflection characteristics for the pass-band circularly polarizing (RHCP) reflective filter element associated with each "green" subpixel of the LCD panel of FIGS. 3A1 and 3A2, indicating how such a non-absorbing spectral filter element responds to incident broad-band illumination having circular polarization state RHCP.

As shown in FIG. 3E, each pass-band polarizing reflective element 10B" associated with a "green" subpixel in the pixelated pass-band circular polarizing panel 10" is particularly designed to reflect nearly 100% all spectral components having the RHCP characteristic polarization state and wavelengths within the red reflective band $\Delta\lambda_R$ and the blue reflective band $\Delta\lambda_B$, whereas all spectral components having the RHCP characteristic polarization state and a wavelength within the green reflective band $\Delta\lambda_G$ are transmitted nearly 100% through the pass-band polarizing reflective element. The pass-band polarizing reflective element associated with each "green" subpixel is "tuned" during fabrication in the manner described hereinabove.

Figure 3F:
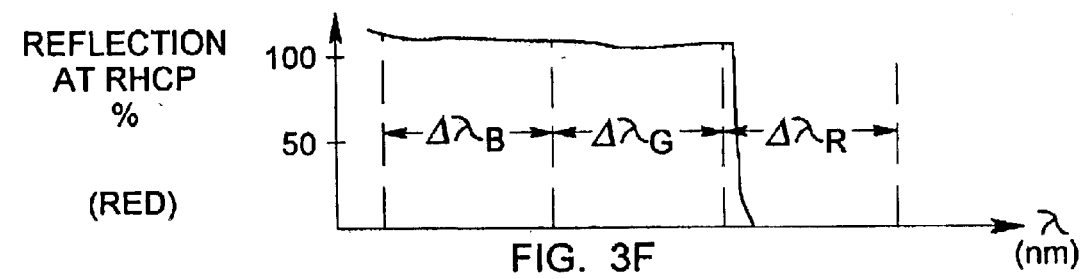
FIG. 3F is a schematic representation graphically illustrating ideal reflection characteristics for the pass-band circularly polarizing (RHCP) reflective filter element associated with each "red" subpixel of the LCD panel of FIGS. 3A1 and 3A2, indicating how such a non-absorbing spectral filter element responds to incident broad-band illumination having circular polarization state RHCP.

As shown in FIG. 3F, each pass-band polarizing reflective element 10A" associated with a "red" subpixel in the pixelated pass-band circular polarizing panel 10" is particularly designed to reflect nearly 100% all spectral components having the RHCP characteristic polarization state and wavelengths within the green reflective band $\Delta\lambda_G$ and the blue reflective band $\Delta\lambda_B$, whereas all spectral components having the RHCP characteristic polarization state and a wavelength within the red reflective band $\Delta\lambda_R$ are transmitted nearly 100% through the pass-band polarizing reflective element. The pass-band polarizing reflective element associated with each "red" subpixel is "tuned" during fabrication in the manner described hereinabove.

The preferred method of making broad-band circular polarizing reflective panels 8" and 11" shown in FIGS. 3A1 and 3A2 are disclosed in copending application Ser. No. 09/312,164 entitled "Super-Wide-Angle Cholesteric Liquid Crystal Based Reflective Broadband Polarizing Films" by Hristina G. Galabova and Le Li, filed May 14, 1999, and alternatively International Application Number PCT/US96/17464 entitled "Super Broad-band Polarizing Reflective Material", supra. The pixelated pass-band circularly polarizing reflective panel 10" can be fabricated in a manner similar to the way described in LCD panel fabrication method described in detail hereinabove.

In order to maximize the light transmission efficiency of the LCD panel of FIGS. 3A1 and 3A2, broad-band CLC reflective film pattern 53 is applied over the light blocking region 51 of each subpixel region on the backside thereof. In the first illustrative embodiment described above, a pattern of broad-band reflector film, corresponding to the light blocking portions of the subpixel regions, can be applied to the back surface of the broad-band polarizing reflective panel 8" (facing the backlighting structure) or pixelated spectral filtering panel 10", in spatial registration with the light blocking portions of the subpixel regions. This provides a light reflective mask which prevents the absorption and scattering of produced light from structures associated with the light blocking portion of the subpixels of the LCD panel.

In order to reduce glare at the surface of the LCD panel due to ambient light incident thereon, a broad-band absorptive film material (e.g. carbonized polymer film) 54 is applied over the light blocking region 51 of each subpixel region on the front surface thereof. In the first illustrative embodiment described above, a pattern of broad-band absorption film, corresponding to the light blocking portions of the subpixel regions, can be applied to the front surface of the broad-band polarizing panel 11", in spatial registration with the light blocking portions of the subpixel regions. This provides a light reflective mask which prevents reflection and scattering of ambient light off structures associated with the light blocking portion of the subpixels of the LCD panel, and thus reduces glare at the surface of the LCD panel due to ambient light incident thereon.

Having described in the first illustrative embodiment of the generalized LCD panel construction illustrated in FIG. 2, it is appropriate at this juncture to now describe the operation of its subcomponents with reference to the exemplary pixel structure detailed in FIGS. 3A1 and 3A2.

As shown in FIGS. 3A1 and 3A2, unpolarized light is produced within the backlighting structure and is composed of spectral components having both LHCP and RHCP polarization states. Only spectral components within the backlighting structure having the RHCP polarization state are transmitted through the broad-band circularly polarizing reflective panel 8" adjacent to the backlighting structure 7, whereas spectral components therewithin having polarization state LHCP incident thereon are reflected therefrom without energy loss or absorption. Spectral components reflecting off broad-band circularly polarizing reflective panel 8" on the backlighting structure side strike quasi-diffusive reflector 7A and undergo a polarization inversion (i.e. LHCP to RHCP and RHCP to LHCP). This reflection process occurs independent of wavelength. Only spectral components having the RHCP polarization state are retransmitted through the broad-band circularly polarizing reflective panel along the projection axis of the LCD panel.

In general, as shown in FIGS. 3A1 and 3A2, light emitted from the backlighting structure 7 is passed through the non-absorbing light diffusive layer 400 and then through the light condensing film or optical structure 410 so that, as shown in FIG. 2B2, the light rays are condensed within a cone of rays (within about 10–20 degrees from the normal) through the broad-band reflective polarizer 8, and thereafter, enters the CLC-based spectral filter 10 for spectral filtering operations. The pixelized pattern of spectrally filtered light then passes through liquid crystal spatial-intensity modulation panel 9 (e.g. operating on circularly polarized in FIGS. 3A1 and 3A2 but linearly polarized light in FIGS. 30A1 and 30A2) so as to modulate the spatial intensity of the spectrally filtered light pattern. The light transmitted from the spatial-intensity modulation panel 9 then passes the spatial intensity modulated distribution of light through a broad-band polarizing panel 11, and then through polarization-preserving light diffusing panel 420, such as a frosted glass diffuser, to produce a color image for viewing by a user of the display panel. Notably, the broad-band polarizing analyzer 11 and the light diffusing panel 420 may be placed in the display panel in reverse order. Light rays emanating from backlighting structure will emerge as colored light circularly polarized and have a large viewing angle without distortion of its color when viewed from different viewing angles.

In the illustrative embodiment frosted glass diffuser can be used to realize the polarization preserving light diffuser. This light diffusing panel 420 is necessary to increase the viewing angle when a light condensing structure 410 is jointly used to better control the light incident angle onto the reflective CLC spectral filter 10A.

By using broad-band reflective polarizer 8 of the present invention, the display panel system hereof reduces the color distortions at large viewing angles. In combination, these subcomponents cooperate to provide a CLC-based LCD panel assembly having markedly improved performance characteristics unavailable using prior art principles.

Having provided a general overview of the LCD panel system of FIG. 2, it is appropriate at this juncture to describe the operation of this system in greater detail herein below.

When a circular polarization rotating element associated with a red, green or blue subpixel is driven into its active-state as shown in FIG. 3A1, the circular polarization rotating element associated therewith transmits the spectral components therethrough independent of wavelength while effecting an orthogonal conversion in polarization state (i.e. LHCP to RHCP and RHCP to LHCP), thereby producing a "bright" subpixel level in response to the active-state into which it has been driven.

Figure 10A:
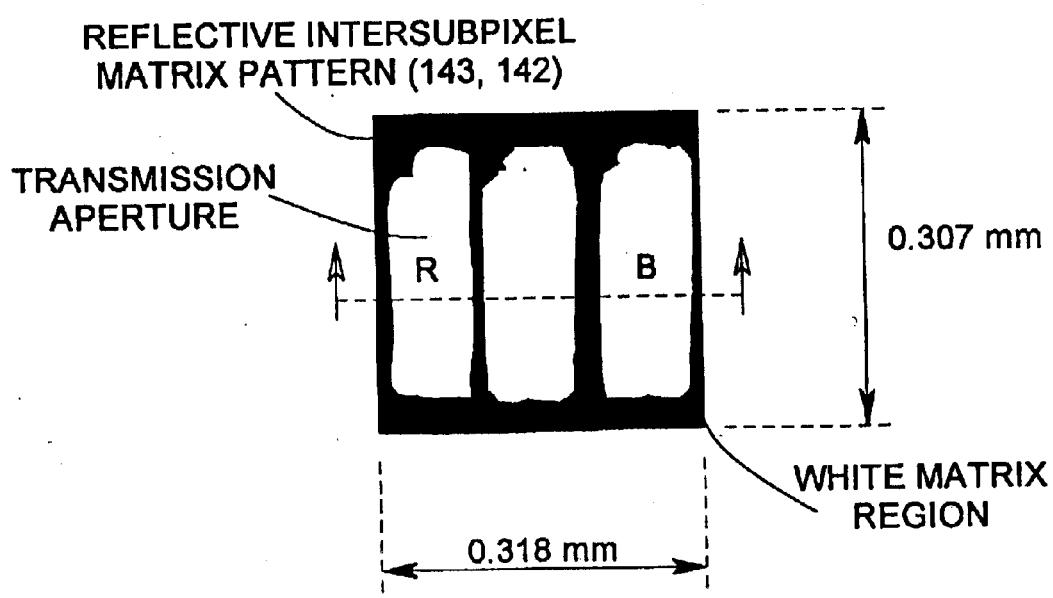
FIG. 10A is a schematic representation of an exemplary broad-band inter-subpixel "white" reflective matrix-like pattern formed about a single pixel structure (comprising red, green and blue subpixel structures) disposed beneath the lower CLC-filter layer of the CLC-based spectral filtering structure depicted in FIG. 10

When a "red" subpixel is driven into its "bright" state shown in FIG. 10A1, spectral components within the backlighting structure having wavelengths within the "red" band $\Delta\lambda_R$ and polarization state RHCP (i.e. $\lambda_R^{RHCP}$) are transmitted through the broad-band circularly polarizing reflective panel 8", the "red" pass-band circularly polarizing reflective element 10A", the circular polarization direction rotating element 9A", and the broad-band circularly polarizing reflective panel 11" without absorption. The "green" and "blue" spectral components with the RHCP polarization state (i.e. $\lambda_G^{RHCP}$, $\lambda_B^{RHCP}$) are transmitted through the broad-band linearly polarizing reflective panel 8" and reflected off the "red" pass-band circularly polarizing reflective element 10A", and are retransmitted through the broad-band circularly polarizing reflective panel 8" back into the backlighting structure for recycling among neighboring subpixels.

When a "green" subpixel is driven into its "bright" state shown in FIG. 3A1, spectral components having wavelengths within the "green" band and polarization state RHCP (i.e. $\lambda_G^{RHCP}$)) are transmitted through the broad-band circularly polarizing reflective panel 8", the "green" pass-band circularly polarizing reflective element 10B", the circular polarization direction rotating element 9B", and the broad-band circularly polarizing reflective panel 11" without absorption. The "red" and "blue" spectral components with the RHCP polarization state (i.e. $\lambda_R^{RHCP}$, $\lambda_B^{RHCP}$) are transmitted through the broad-band circularly polarizing reflective panel 8" and reflected off the "green" pass-band circularly polarizing reflective element 10B", and are retransmitted through the broad-band circularly polarizing reflective panel 8" back into the backlighting structure for recycling among neighboring subpixels.

When a "blue" subpixel is driven into its "bright" state shown in FIG. 3A1, spectral components within the backlighting structure having wavelengths within the "blue" band $\Delta\lambda_B$ and polarization state RHCP (i.e. $\lambda_B^{RHCP}$) are transmitted through the broad-band linear polarizing reflective panel 8', the "blue" pass-band circularly polarizing reflective element 10C", the circular polarization direction rotating element 9C", and the broad-band circularly polarizing reflective panel 11" without absorption. The "red" and "green" spectral components with the RHCP polarization state (i.e. $\lambda_R^{RHCP}$, $\lambda_G^{RHCP}$) are transmitted through the broad-band circularly polarizing reflective panel 8" and reflected off the "blue" pass-band circularly polarizing reflective element 10C", and are retransmitted through the broad-band circularly polarizing reflective panel 8" back into the backlighting structure for recycling among neighboring subpixels.

When a circular polarization rotating element is controlled in its inactive-state as shown in FIG. 3A2, the polarization rotating element transmits the spectral components therethrough independent of wavelength without effecting a conversion in polarization state, thereby producing a "dark" subpixel level.

When a "red" subpixel is driven into its "dark" state as shown in FIG. 3A2, spectral components within the backlighting structure having wavelengths within the "red" band $\Delta\lambda_R$ and a polarization state RHCP (i.e. $\lambda_R^{RHCP}$) are transmitted through the broad-band circularly polarizing reflective panel 8", the "red" pass-band circularly polarizing reflective element 10A" and the circular polarization rotating element 9A" and reflected off the broad-band circularly polarizing reflective panel 11" without absorption. In this state, these reflected spectral components are then retransmitted through the circular polarization rotating element 9A", the "red" pass-band circular polarizing reflective element 10A" and the broad-band circularly polarizing reflective panel 8" back into the backlighting structure for recycling among the neighboring subpixels.

Spectral components within the backlighting structure having wavelengths within the "green" band $\Delta\lambda_G$ or "blue" band $\Delta\lambda_B$ and a polarization state RHCP (i.e. $\lambda_G^{RHCP}$ $\lambda_B^{RHCP}$) are transmitted through the broad-band circularly polarizing reflective panel 8" and are reflected off the "red" pass-band circularly polarizing reflective element 10A" and retransmitted through the broad-band circularly polarizing reflective panel 8" back into the backlighting structure for recycling among neighboring subpixels.

When a "green" subpixel is driven into its "dark" state as shown in FIG. 3A2, spectral components within the backlighting structure having wavelengths within the "green" band $\Delta\lambda_G$ and a polarization state RHCP (i.e. $\lambda_G^{RHCP}$) are transmitted through the broad-band circularly polarizing reflective panel 8", the "green" pass-band circularly polarizing reflective element 10B", and the circular polarization rotating element 9B" and reflected off the broad-band circularly polarizing reflective panel 11" without absorption. In this state, these reflected spectral components are then retransmitted through the circular polarization rotating element 9B", the "green" pass-band circular polarizing reflective element 10B" and the broad-band circularly polarizing reflective panel 8" back into the backlighting structure for recycling among the neighboring subpixels. Spectral components within the backlighting structure having wavelengths within the "red" band $\Delta\lambda_R$ or "blue" band $\Delta\lambda_B$ and a polarization state RHCP (i.e. $\lambda_R^{RHCP}$, $\lambda_B^{RHCP}$) are transmitted through the broad-band circularly polarizing reflective panel 8" and are reflected off the "green" pass-band circularly polarizing reflective element 10B" and retransmitted through the broad-band circularly polarizing reflective panel 8" back into the backlighting structure for recycling among neighboring subpixels.

When a "blue" subpixel is driven into its "dark" state as shown in FIG. 3A2, spectral components within the backlighting structure having wavelengths within the "blue" band $\Delta\lambda_B$ and a polarization state RHCP (i.e. $\lambda_B^{RHCP}$) are transmitted through the broad-band circularly polarizing reflective panel 8", the "blue" pass-band circularly polarizing reflective element 10C", and the circular polarization rotating element 9C" and reflected off the broad-band circularly polarizing reflective panel 11" without absorption. In this state, these reflected spectral components are then retransmitted through the circular polarization rotating element 9C", the "blue" pass-band circularly polarizing reflective element 10C" and the broad-band circularly polarizing reflective panel 8" back into the backlighting structure for recycling among the neighboring subpixels. Spectral components within the backlighting structure having wavelengths within the "red" band $\Delta\lambda_R$ or "green" band $\Delta\lambda_G$ and a polarization state RHCP (i.e. $\lambda_R^{RHCP}$, $\lambda_G^{RHCP}$) are transmitted through the broad-band circularly polarizing reflective panel 8" and are reflected off the "blue" pass-band circularly polarizing reflective element 10C" and retransmitted through the broad-band circularly polarizing reflective panel 8" back into the backlighting structure for recycling among neighboring subpixels.

Methods for Making the CLC-Based Spectral Filters of the First Illustrative Embodiment Referring now to FIGS. 8A through 8D4, several preferred methods will now be described for fabricating the CLC-based spectral filtering structure shown in FIGS. 5 through 5B2, including the LCD panel shown in FIGS. 2, 3A1 and 3A2.

Figure 8A:
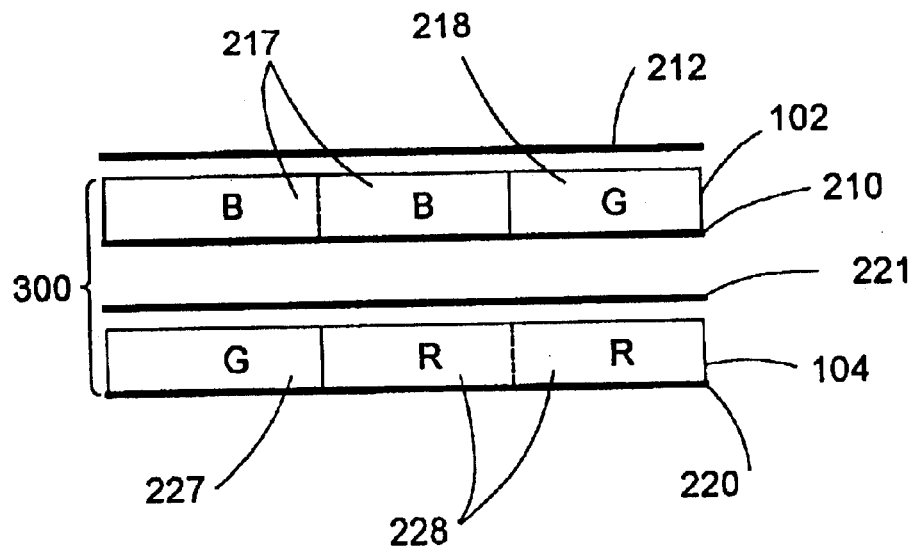
FIG. 8A is a schematic representation illustrating a first method of fabricating the two-layer CLC-based spectral filtering structure shown in FIGS. 5 through 5B2.

As shown in FIG. 8A, the reflective spectral filter 10A can be made by making the first and second CLC layers 102 and 104 individually and then combining them in a desired manner. To make the left handed reflective cholesteric liquid crystal (CLC) color filter of layer 102, first, prepare a bottom substrate 210 made of PVA (polyvinyl alcohol) coated glass plate, and buffing it in one direction. Then, prepare a top substrate 212 of PET (Mylar D) by buffing it in any direction.

Then mix a left handed CLC polymer comprising blue polysiloxane, such as that sold by Wacker Chemical Company of Germany as SLM 90032, 84.1% by weight, with a low molecular weight nematic liquid crystal, such as that sold by EMI Company of Germany as (E44, EMI): 14.8% by weight. Then add a left handed chiral dopant, such as that sold by EMI Company of Germany as (S1011, EMI), 0.1% by weight of total polysiloxane and nematic and photoinitiator (IG184, Ciba-Geigy), 1% by weight of polysiloxane. Mix the above materials at 120° C. and de-gas the mixture in a vacuum for 20 minutes at a temperature around 90° C.

The mixture is then coated onto the PVA coated glass bottom substrate 210 with the use of a knife coater. The coating is preferably about 8–12 microns thick. The coating temperature and the gap of the knife coater can be used to vary the thickness of the coating as applied.

The mixture is then laminated with the PET top substrate 212 using a laminator. The temperature and the gap between the rollers of the laminator will effect the final thickness of the film.

To make a CLC film with blue sub-pixel 217 and green sub-pixel 218 in layer 102, layer 102 is heated at 100° C. with the PET substrate 212 up, the heating is preferably done on a hot plate.

With the layer 102 at 100° C. it is preferable to mechanically shear the top substrate 212 downward with respect to the bottom substrate 210. The mechanical shearing provides a tangential mechanical force which helps align the liquid crystal molecules between substrates 210 and 212 in layer 102.

With layer 215 still on the hot plate or still heated to 100° C., apply a mask to the top substrate layer 212 having the PET material.

The mask will vary in size and shape depending on the use of the layer. For use in color displays the mask will be the size and shape of pixels used in the display. In the layer shown in FIG. 8A the CLC-based filter 10A uses two layers with two reflection colors per layer. The pixel sizes may vary in size within the layer. For example as two sub-pixels of blue 217 are used side by side only one large sub-pixel needs to be made, however two sub-pixels may also be used in the same space for the blue sub-pixel portion 217 in layer 102.

A mask is applied to block the portion of layer 102 to be the green sub-pixel 218 leaving blue sub-pixels 217 exposed.

While still at 100° C. layer 102 is exposed to UV light of about (360 nm) at 2.77 mW/cm$^2$ intensity for approximately 17 seconds to polymerize the exposed cholesteric liquid crystals in the blue sub-pixels 217 of layer 102.

Layer 102 is then heated at 61° C. preferably on a hot plate for about 5 minutes to control broadening of the bandwidth of the blue sub-pixel 217 of layer 104. The bandwidth is a function of the pitch gradient of the cholesteric liquid crystal material.

While at 61° C. the mask is removed and layer 15 is exposed to UV light of about 360 nm at 1.00 mW/cm$^2$ for approximately 150 seconds to polymerize the green sub-pixel 218 of layer 102 with the desired bandwidth.

Maintaining 61° C. layer 102 is then exposed to UV light of 360 nm at 20 mW/cm$^2$ for approximately 60 seconds to set the polymers of both the blue sub-pixels 217 and the green sub-pixel 218. The PET substrate 212 is then removed. Layer 102 is now ready for installation in a display or for other use.

To make left handed reflective cholesteric liquid crystal (CLC) color filter reflecting the green sub-pixel 227 and red sub-pixels 228 of layer 104, first, prepare a bottom substrate 220 of PVA (polyvinyl alcohol) coated glass, by buffing it in one direction. Then, prepare a top substrate 221 of PET (Mylar D) by buffing it in any direction.

Mix a left handed CLC polymer comprising blue polysiloxane, such as that sold by Wacker Chemical Company of Germany as SLM 90032, 79% by weight, with a low molecular weight nematic liquid crystal, such as that sold by EMI Company of Germany as (E44, EMI): 20% by weight. Then add a photo initiator (IG184, Ciba-Geigy), 1% of the CLC polymer SLM 90032. The above materials are mixed at 120° C. and de-gassed in a vacuum for 20 minutes at 90° C.

The mixture is then coated onto the PVA coated glass bottom substrate 220 with the use of a knife coater. The coating is preferably about 8–12 microns thick. The coating temperature and the gap of the knife coater can be used to vary the thickness of the coating as applied. The mixture is then laminated with the PET top substrate 221 using a laminator. The temperature and the gap between the rollers of the laminator will effect the final thickness of the film.

To make a CLC film with red 228 and green 227 sub-pixels in layer 104, layer 104 is heated to 58° C. with the PET substrate 220 up, the heating is preferably done on a hot plate.

With the layer 104 at 58° C. it is preferably mechanically sheared to make the liquid crystal molecules aligned. The mechanical shearing provides a tangential mechanical force which helps align the liquid crystal molecules between substrates 220 and 221 in layer 104. With layer 104 still on the hot plate or still heated to 58° C., apply a mask to the top substrate layer 221 having the PET material. The mask will vary in size and shape depending on the use of the layer. For use in color displays the mask will be the size and shape of pixels used in the display. In the layer shown in FIG. 8A the CLC-based spectral filter 10A uses two layers with two colors of reflective color filters per layer.

The pixel sizes may therefore vary in size within the layer. For example as two sub-pixels of red are used side by side only one large sub-pixel need be made, however two sub-pixels may also be used in the same space for the red sub-pixel 227 in layer 104.

The mask is applied to block the portion of the layer 104 to be the green sub-pixel 227 leaving exposed red sub-pixels 228.

While still at 58° C. layer 25 is then exposed to UV light of 360 nm at 1.0 mW/cm$_2$ intensity for approximately 77 seconds to polymerize the exposed cholesteric liquid crystals in the red sub-pixel 228 of layer 104.

Layer 104 is then heated at 83° C. preferably on a hot plate for about 5 minutes to control broadening of the bandwidth of the red sub-pixel 228 of layer 104.

The mask is then removed and layer 104 is held at 70° C. while layer 104 is exposed to UV light 360 nm at 20 mW/cm$^2$ for approximately 60 seconds to polymerize the green sub-pixel 227 of layer 104 with the desired bandwidth.

The PET substrate 22 is then removed. Layer 104 is now ready for installation in a display or for other use.

Figure 8B:
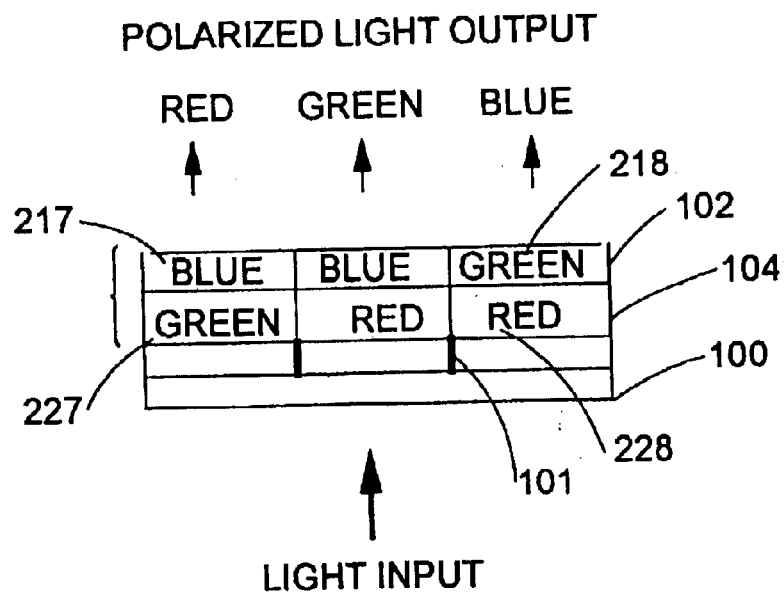
FIG. 8B is a schematic representation final structure produced when using the first method of spectral filter fabricating illustrated in FIG. 8A.

As shown in FIG. 8B the layers 102 and 104 can be laminated together to form a two layer color filter for a display.

In order to make a display, layer 104 is glued to a reflective matrix substrate 101 preferably by using a UV curable adhesive. The pixels of the green, red layer 104 are first aligned with the broad-band CLC reflective matrix 101. Then a strong UV light at 20 mW/cm$^2$ is used to cure the glue for approximately 60 seconds. Then heat layer 104 and reflective matrix 111 for approximately 30 seconds at 65° C., peel off the glass substrate 220 of the green-red reflecting layer 104 and apply a UV curable adhesive to the top of layer 104 to attached layer 102 thereto. Align the pixels and cure the glue with UV light at 20 mW/cm$^2$ for approximately 60 seconds.

There are several alternative ways of realizing the basic CLC spectral filtering structure depicted in FIGS. 5B through 5B2. These alternative ways will be considered below.

Figure 8C:
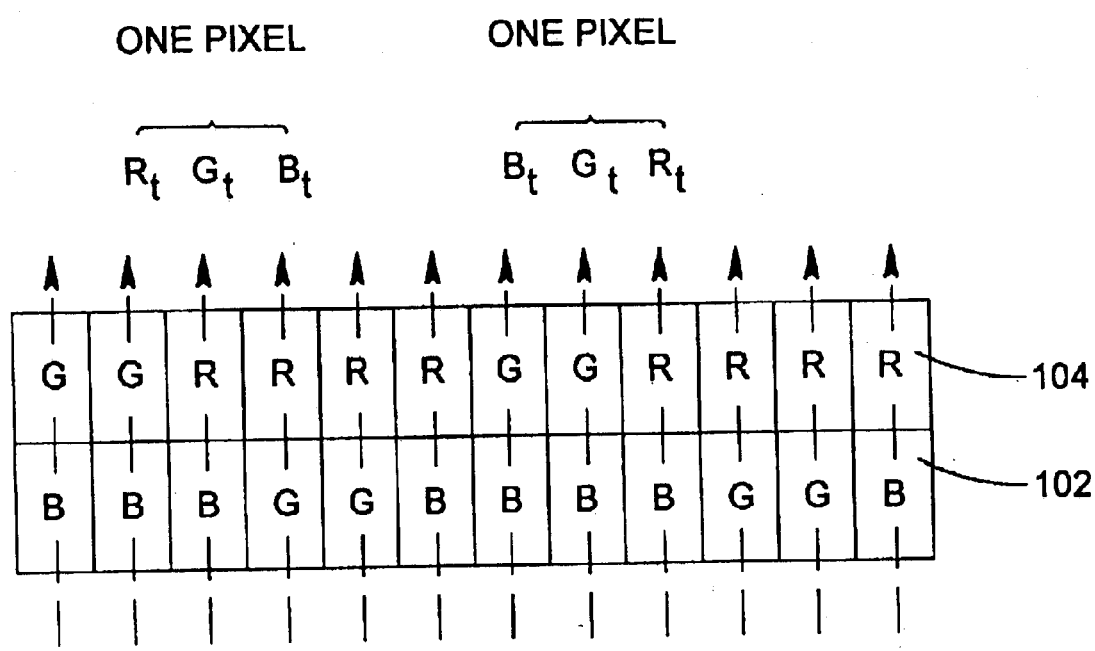
FIG. 8C is a schematic representation illustrating a second alternative method of fabricating the CLC-based spectral filtering structure shown in FIG. 2, wherein the subpixel structures of each pixel structure therein are arranged in a 3×1 array, and the order of the subpixel structures in neighboring pixel structures are periodically reversed to enable manufacturer of CLC layers having double-sized color-band reflection regions.

In FIG. 8C, a second alternative method of fabricating the CLC-based spectral filtering structure shown in FIG. 5B, wherein the subpixel structures of each pixel structure therein are arranged in a 3×1 array, and the order of the subpixel structures in neighboring pixel structures are periodically reversed to enable manufacturer of CLC layers having double-sized color-band reflection regions.

FIG. 8C shows an embodiment of the method for patterning the color filter in each layer associated with FIG. 5B1. Instead of patterning "green", "green", and "red" (R,R,G) in layer 40 in FIG. 5B1 it can be patterned into G,G,R,R,R,R,G,G,R,R,R,R,G,G,. Similarly, layer 50 can be patterned to be B,B,B,B,G,G,B,B,B,B,G,G . . . , where "R", "G" and "B" refer to the filter layer portion reflecting red, green, and blue light, respectively. If the two layers are aligned in the way as shown in FIG. 16, color filter pixels consist of sub-pixels ($R_t$, $G_t$, $B_t$) and ($B_t$, $G_t$, $R_t$) will be formed, where "$R_t$", "$G_t$", and "$B_t$" refer to the red, green, and blue sub-pixels in transmission. This method for patterning has the advantage of creating the patterned color portion on each layer with a size twice and four times larger than the display sub-pixel ($R_tG_tB_t$) size. The sub-pixels of red (R) can then be made as one large pixel instead of 4 small separate sub-pixels making it easier to fabricate the display. Similarly 4 blue(B) sub-pixels are made as one large pixel and two sub-pixels of green G are made as one pixel.

As shown in FIG. 5B1 a black matrix is automatically formed around the pixels and sub-pixels in FIG. 8C with the addition of a green blue GB 86, red, green RG 87, blue B 88 and red R 89 reflective portions in a black matrix layer.

In FIGS. 8D1 through 8D4 show a third alternative method of fabricating the CLC-based spectral filtering structure shown in FIG. 5B, wherein the subpixel structures of each pixel structure therein are arranged in a 2×2 array.

In order to eliminate all reflection at the interfaces between the various parts, index matching techniques should be used. In some cases, this can be simply achieved by gluing the parts together. This by itself will reduce the amount of reflection by a factor of almost 100. Alternatively, a transparent fluid (glycerol) can be disposed between the component parts for index matching. If even greater attenuation of such reflections is required the index of refraction (n) of the fluid or glue should be intermediate between the index values of the adjacent materials For example: if $n_{BBP}$=1.6 and $n_{GLASS}$=1.5 the least reflection will occur for a glue/fluid of index:

$$n=\sqrt{n_{BBP}n_{GLASS}}=1.549.$$

Alternative Embodiments of CLC-Based Spectral Filtering Structures for Use in the First Generalized LCD Panel of the Present Invention Having described how to make CLC spectral filters for use in the LCD panel assemblies, such as shown in FIGS. 5 though 5B2, a number of alternative embodiments come to mind.

To improve the quality of the transmitted light for a display, each color section reflecting red green and blue used in layers 40 and 50 is made with cholesteric liquid crystals which have sharply defined bands of color matched to the colors produced in the light source 100. With a narrow band of color transmitted, color images with improved color purity and better contrast are produced. FIG. 6J shows that cholesteric liquid crystals can be made for tuning the color around a narrow band from a central wavelength. Details of how to make such cholesteric liquid crystals are disclosed in copending patent application Attorney Docket Number PA1101 entitled "Cholesteric Liquid Crystal Reflective Color Filters and the Methods of Fabrication" which is hereby made a part hereof and incorporated herein by reference. In order to cover the correct bandwidth, the CLC bandwidth needs to be appropriately broadened. For example, in order to reflect the red portion of the light from 600 to 750 nm, a CLC with a bandwidth of 150 nm is required. However, a natural CLC can cover only 100 nm at the most. Such broadband reflective cholesteric liquid crystals are made by the method as shown in copending patent application Ser. No. 08/739,467 entitled "Circularly Polarizing Reflective Material Having Super Broad-Band Reflection And Transmission Characteristics And Method of Fabricating And Using Same In Diverse Applications" filed Oct. 29, 1996, which is hereby made a part hereof and incorporated herein by reference.

Although this spectral filtering device 10A is shown with left handed CLC polymers, it is understood that right handed polymers could also be used to produce a device with opposite handedness light being transmitted. In another embodiment of the present invention, the blue, green and red, green layers 102 and 104 respectively may be used in reverse order and the display will still function in the same way.

In addition to the above separate layers of cholesteric liquid crystal materials glued together, a single layer of cholesteric liquid crystal material with a top portion reflecting one color and a bottom portion reflecting another color, or multiple portions of cholesteric liquid crystal materials polymerized for different functions, can be all stacked in one layer. Pitch gradient CLC materials for use in making the spectral filters hereof are disclosed in copending application Ser. No. 08/739,467 entitled Circularly Polarizing Reflective Material Having Super Broad-Band Reflecting & Transmission Characteristics & Method of Fabricating & Using Same in Diverse Applications, each of which is incorporated herein by reference, in its entirety.

By polymerizing different portions of layers by depth of penetration of UV radiation at different temperatures, discrete portions of a linear stack in a layer of CLC materials can be formed with different optical properties. With a continuous change in temperature and a continuous change in frequency of UV light to change the depth of penetration of UV light, broadband reflective cholesteric liquid crystal color filters can be formed.

Such pitch control techniques can be used to make a fourth illustrative embodiment of the spectral filter structure shown in FIG. 10, wherein narrow-band blue-reflecting CLC material of pitch B 17 and a narrow-band green-reflecting CLC material of pitch G 18 are formed in a top portion 301 of layer 300, whereas a narrow-band green-reflecting CLC material of pitch G 227 and a narrow-band red-reflecting CLC material of pitch R 228 are formed in a bottom portion 302 of layer 300.

In this example, assume the cholesteric liquid crystals are left handed circularly polarized. The pitch of a cholesteric material can be tuned by varying the sample temperature: P(T). Starting with the bottom portion 302 of layer 300 a mixture of cholesteric liquid crystal material at one temperature has a pitch $P(T_L)=P_R$ reflecting red 228. With other portions of the layer 300 masked, the red 228 portion of layer 302 is exposed to UV light of a specific wavelength which penetrates approximately half way through the layer 300 before it is totally attenuated. This UV light polymerizes the red portion 228 of layer 300. The mask on the bottom portion 302 is removed revealing the green portion 227. At a different temperature either higher or lower than the temperature polymerizing the CLC material for red 228 the temperature for polymerizing green 227 reflective CLC material is reached. UV light of a specific wavelength is then irradiated on the green portion 227 as above for the red 228, such that the UV light is attenuated half way through the layer 300. The bottom portion 227 of layer 300 is now polymerized. Layer 300 may be turned over. A mask is applied covering the blue portion 217. The green portion 218 of layer 302 is polymerized by UV light at a UV wavelength which is attenuated half way through layer 301. Alternatively a mask applied to the bottom layer 302 can be used and a UV light which will penetrate layer 225 to polymerize layer 301 can be used. With the temperature again adjusted to the temperature for reflecting blue light. The mask covering the blue portion 217 is removed and the layer 300 is exposed to UV light at a wavelength to penetrate half way through layer 300.

If a layer is only partially polymerized at one temperature, then only part of the molecules acquire a periodicity for the color desired. When the temperature is changed, the LC molecules that are not strongly anchored yet by the partial cross-linking, must adopt a different pitch. This pitch will not be the same as before since, in the new environment, they interact not only with free molecules like themselves, but also with the strongly anchored LC molecules, due to the previous partial polymerization process.

With a series of small steps in temperature variation and UV penetration wavelengths, a broadband of spectral components will be reflected by the layer 300. Each incremental portion of layer 300 will have a band about a central wavelength that it reflects. With a continuous change in temperature linked to a continuous change in UV penetration wavelength, broadband reflective cholesteric liquid crystal color filters can be made about a central wavelength. Therefore broadband polarizers may be made with variable pitch cholesteric liquid crystal materials, by varying the temperature gradient and UV penetration gradient in a coordinated manner, for example, by changing the temperature of a hotplate in conjunction with changing the UV frequency, such that the change in pitch in the cholesteric liquid crystal material is polymerized for a broadband reflective CLC material layer.

Figure 14:
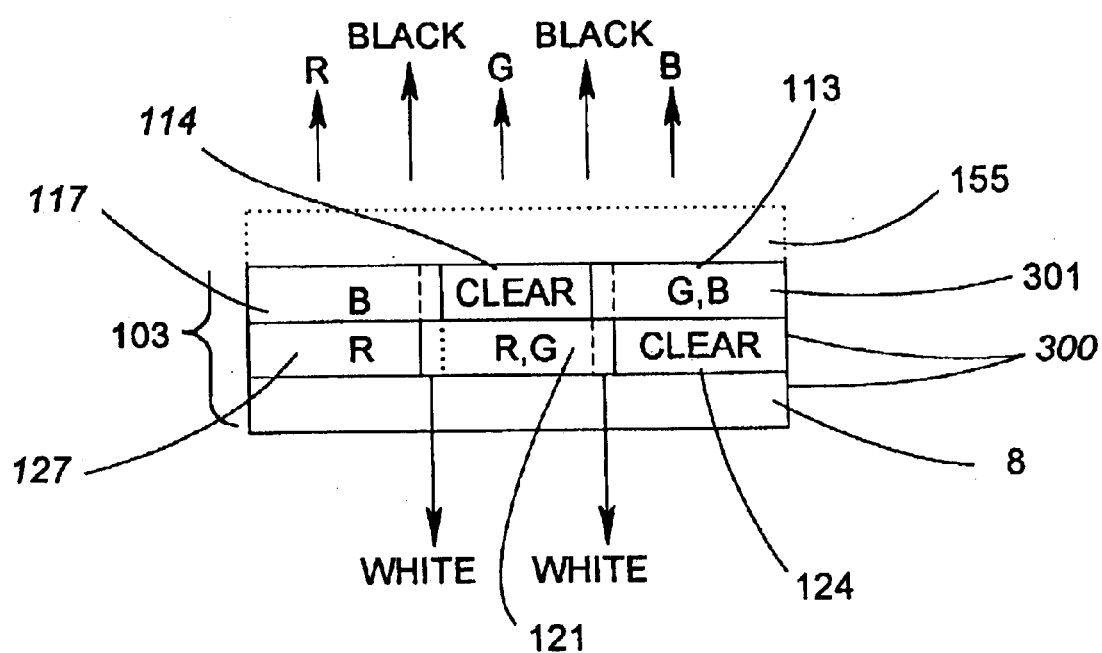
FIG. 14 is a schematic representation illustrating a first method of fabricating the two-layer CLC-based spectral filtering structure shown in FIG. 13.

The above technique can be used to make the spectral filter shown in FIG. 14. In this filter structure, the broadband reflective portions 121 for red-green reflecting regions and 113 for green-blue reflecting regions can be made using the above process of masking and changing temperatures while changing the UV wavelength to penetrate half way through layer 300. Thus the upper portion 301 of layer 101 has a blue reflecting sub-pixel 117 and a green, blue reflecting sub-pixel 113 and a clear isotropic sub-pixel 114. The bottom portion 302 of layer 300 is polymerized to have a red reflecting sub-pixel 127, a red, green reflecting sub-pixel 121 and a clear sub-pixel 124.

As shown in FIG. 14, the light transmitted through layer 300 will have: a red sub-pixel portion; a white reflective portion made by overlapping the red-green portion 121 with the blue portion 117 automatically forming a reflective-type intersubpixel matrix; a green sub-pixel portion; another reflective-type intersubpixel portion made by overlapping the red-green reflecting portion 121 with the green-blue reflecting portion 113 automatically forming a reflective matrix and a blue sub-pixel portion; and a third black portion made by overlapping the green blue portion 113 with the red portion 127 automatically forming a reflective-type interpixel matrix. Since all of these regions are realized on single layer of material, the process for making CLC-based LCD panels is simplified by requiring fewer layers, and fewer gluing and aligning steps to make a final display panel.

Since the penetration of the UV light is attenuated differently at different frequencies several distinct portions providing different functions can be stacked in a single layer of CLC material.

By using the methods described above for masking and polymerizing, each sub-pixel emitting a color can also be provided with its own zero-order quarter wave plate pixel tuned to that color. Or in another embodiment, one quarter wave plate 155 can be geared for all the colors transmitted by the reflective portions of the layer. The quarter wave plate portion 155 can be polymerized by a different wavelength than the other portions of the layer and can therefore be polymerized before layer 301.

For example, for a layer of aligned nematic mixture, which is not polymerized, a UV light with a shorter penetration length polymerizes a small depth into the layer. Exposing the film through a mask, the temperature and the exposure times are adjusted so as to polymerize only a thin nematic sub-layer (about $2 \mu$m). The sample's temperature is set such that when the pixel is polymerized through the mask it would become a 0-order $\lambda/4$ portion of the layer for the red sub-pixel. The mask is then shifted to expose the position of the Green sub-pixels and temperature-time are adjusted to create a 0-order $\lambda/4$ portion of the layer for the green sub-pixel. The same is done for the Blue sub-pixels. The temperature is then raised to the isotropic phase and the whole sample is flooded with a longer wavelength to achieve a deeper penetration. During this step the remaining unpolymerized LC molecules, within the $\lambda/4$ portion, are polymerized into an isotropic state so that the retardation of the nematic layer will not changed by successive UV exposures. This step also creates an additional thin polymerized isotropic portion of the layer that "seals" the top $\lambda/4$ portion from the rest of the yet unpolymerized mixture below. Clearly, the top substrate must be UV transparent and have a low sticking coefficient to the polymerized portion of the layer.

Alternatively, rather than changing temperature for each color (which may be time consuming), the short UV wavelength can be varied with filters so as to change the effective penetration length. In this method, each $\lambda/4$ sub-pixel is the same (since the temperature is fixed) while its effective thickness is varied by the UV wavelength. The step of isotropic "sealing" is the same in both methods.

Once the $\lambda/4$ portion is fabricated at the top 2 $\mu$m (and supported by an alignment film on the top substrate), fabrication of the color filters themselves in the bulk of the layer below can start according to the process outlined before. However, in the presence of an isotropic portion at the top of the substrate, the color filter alignment will have to rely only on the bottom substrate alignment portion.

There are contradictory demands on the mixture components: fabrication of the $\lambda/4$ portion requires a nematic polymer while the color filter below requires a cholesteric polymer. This can be resolved by using a nematic LC polymer doped with a chiral component. Since the fabrication of the $\lambda/4$ portion calls for UV exposure with a very large gradient inside the mixture, the chiral component is driven out from the top 2 $\mu$m by diffusion to recover the nematic phase. The color filter fabrication process is carried out using UV light, which has uniform distribution throughout the sample and therefore will not drive a diffusion process.

The above two fabrication methods of the $\lambda/4$ portion can be also implemented with the current pitch-gradient process when the requirements for a nematic polymer are satisfied.

Instead of having two separate layers 102 and 104 on separate films, as shown in FIG. 8A, spectrally tuned CLC regions can be formed on one layer having the top portion polymerized with one bandwidth around one wavelength and the bottom portion of the layer polymerized with a second bandwidth around a second wavelength. Therefore two-color band reflection regions can be formed within the structure of one layer. Alternatively, two color-band reflection regions can also be formed by attaching two separate layers, each layer having one color band. In either case, there is a top light reflecting portion reflecting one part of the spectrum, and a bottom light reflecting portion reflecting a different part of the spectrum to realize the spectral filter structure at hand.

In FIG. 10, an alternative embodiment of the spectral filter structure is provided, wherein a reflective-type "white or silver" matrix is realized by adding a stacked portion 135 having reflective blocking portions for the red-green color band in block 143 and for green-blue color band in block 142, thus providing broad-band reflection over the intersubpixel regions defined thereby, as show in FIG. 10. Notably, the filter structure of FIG. 10 has five portions stacked in its LC layer, in contrast to the filter structure of FIG. 14 which has four portions stacked in its LC layer.

The single layer embodiments of FIGS. 10 and 14 are useful since an entire device is all realized in a single LC layer. With this technique, no peeling, gluing, aligning, steps are needed to make the display device. With fewer layers, the LCD panel can be made thinner, lighter, and have fewer index of reflection problems between layers as there are fewer optical interfaces therewithin.

FIG. 10 shows an embodiment of FIG. 5B1 in which both left handed CLC layers 40 and 50 are combined with right handed layers 45 and 55. In this embodiment both polarized and/or unpolarized white light 201, which is composed of right handed and left handed circularly polarized light, can be transmitted as red, green, or blue unpolarized light since layers 45 and 55 transmit the right handed portion of the blue, green, and red light and layers 40 and 50 transmit the left handed portion of the blue, green, and red light. Layers 40, 45, 50 and 55 can be placed in any order in the stack without effecting the transmitted light. Also as described herein the layers 40, 45, 50 and 55 of cholesteric liquid crystal material can be on one layer or two layers instead of on 4 layers of cholesteric liquid crystal material. Since this polarizer is insensitive to the incident polarization, it can also work with linear polarized light. In this case no quarter wave plate is required. Due to the symmetric arrangement between the left-handed layer pair (40, and 50) and right-handed layer pair (45, and 55), the optical rotation by the left- and right-handed CLC color filters are automatically cancelled provided that the two pairs have the same parameters, such as reflection wavelength, refractive index, birefringence, and film thickness. Therefore, when a linear light is incident on to the CLC color filter, the output light from different color pixel is still linearly polarized in the same polarization plane.

FIG. 11 shows a second embodiment of the invention with two color sections per layer. In this embodiment, reflective cholesteric liquid crystals having a broad band spanning two primary colors are used. Such reflective cholesteric liquid crystals are also made by the method as shown in the description of FIG. 5B1, with the cholesteric liquid crystals of copending patent application Ser. No. 08/739,467. Using the CLC film fabrication method described above, the blue and green light portion of the spectrum can be reflected by a first layer of broadband cholesteric liquid crystal film material. Using the CLC film fabrication method described above, the green and red light portion of the spectrum can be reflected by a second layer of broadband cholesteric liquid crystal film material. Using these broadband cholesteric liquid crystals the reflective cholesteric liquid crystal color filters of FIGS. 11, 13, 14, 39, 41, and 15 through 26D, are made possible. In these embodiments, the top reflective portion and bottom reflective portion may be on one layer of material or on two layers as shown above.

Returning to the embodiment in FIG. 11 when circularly polarized white light 120 is incident on layer 60 on the red (R) reflecting portion, red is reflected while green and blue are transmitted, while in layer 70 the blue (B) component is reflected and green (G) component is transmitted. In the adjacent section G,R of layer 60, both green and red light are reflected, as shown in the broadband cholesteric liquid crystal material described above. This section uses the broadband Cholesteric Liquid Crystals of the patent application Ser. No. 08/739,467 incorporated by reference above to obtain the broad band reflectivity needed. Since the green and red colors are reflected, blue is transmitted. The top layer in layer 70 does not have to reflect any colors. It is therefore made from the same material but in an isotropic state. Or it can be made to reflect light in the infrared or ultraviolet bands and transmit visible light. Similarly in the red (R) transmitting section, layer 60 is clear and layer 70 reflects both green (G) and blue (B) components of light while transmitting red (R)components thereof.

The spectral filter design shown in FIG. 11 has an advantage of being able to make a white (broad-band) reflective matrix integrated within the spectral filter in order to improve contrast. For example, by extending the green-red (G,R) section of layer 60 under the blue-green (B,G) section of layer 70 and under the blue (B) section of layer 70 all the colors are reflected from the overlapping portion, thus reflecting white light and transmitting nothing so that the overlapping portion appears black from the viewing direction. Similarly, the red (R) pixel region in layer 60 is extended under the blue-green (B,G) pixel region in layer 70, and thus a totally reflective black matrix is created at the overlapped portion. Using this architecture, a black matrix is produced.

Figure 25:
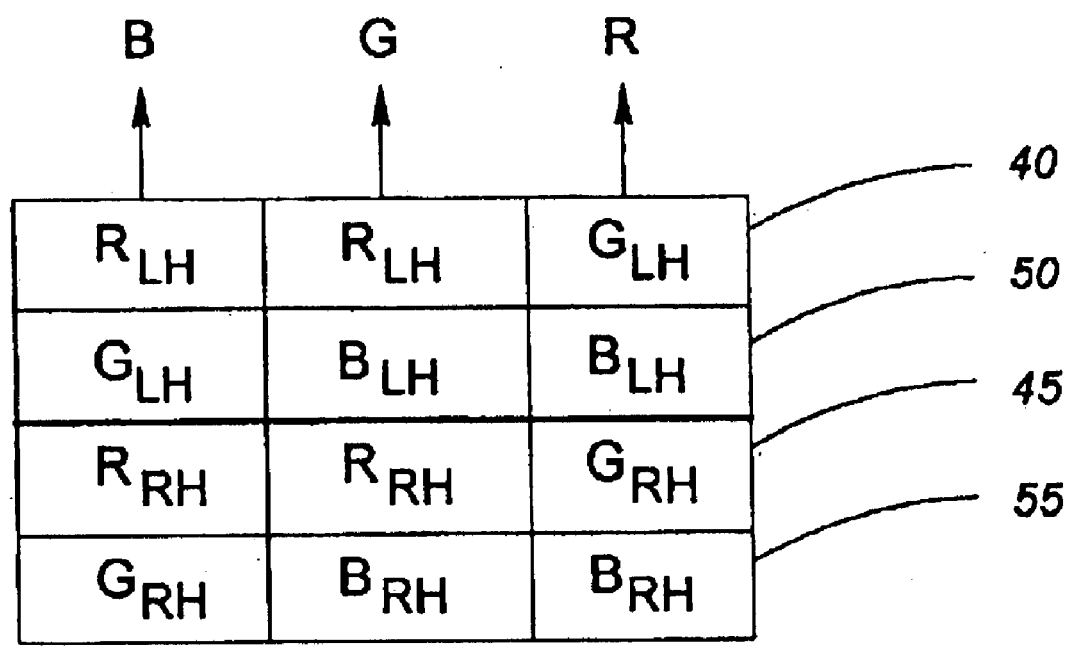
FIG. 25 is a fifteenth illustrative embodiment of the CLC-based spectral filtering structure shown in FIG. 2 which is polarization independent, and wherein each blue subpixel structure therein is realized by a green-band RHCP reflecting region in the first CLC layer, a red-band RHCP reflecting region in the second CLC layer, a green-band LHCP reflecting region in the third CLC layer, and a red-band LHCP reflecting region in the fourth CLC layer, wherein each green subpixel structure therein is realized by a blue-band RHCP reflecting region in the first CLC layer, a red-band RHCP reflecting region in the second CLC layer, a blue-band LHCP reflecting region in the third CLC layer and a red-band RHCP reflecting region in the fourth CLC layer, and wherein each red subpixel structure therein is realized by a blue-band RHCP reflecting region in the first CLC layer, a blue-band RHCP reflecting region in the second CLC layer, a green-band LHCP reflecting region in the third CLC layer, and a red-band LHCP reflecting region in the fourth CLC layer.
Figure 26:
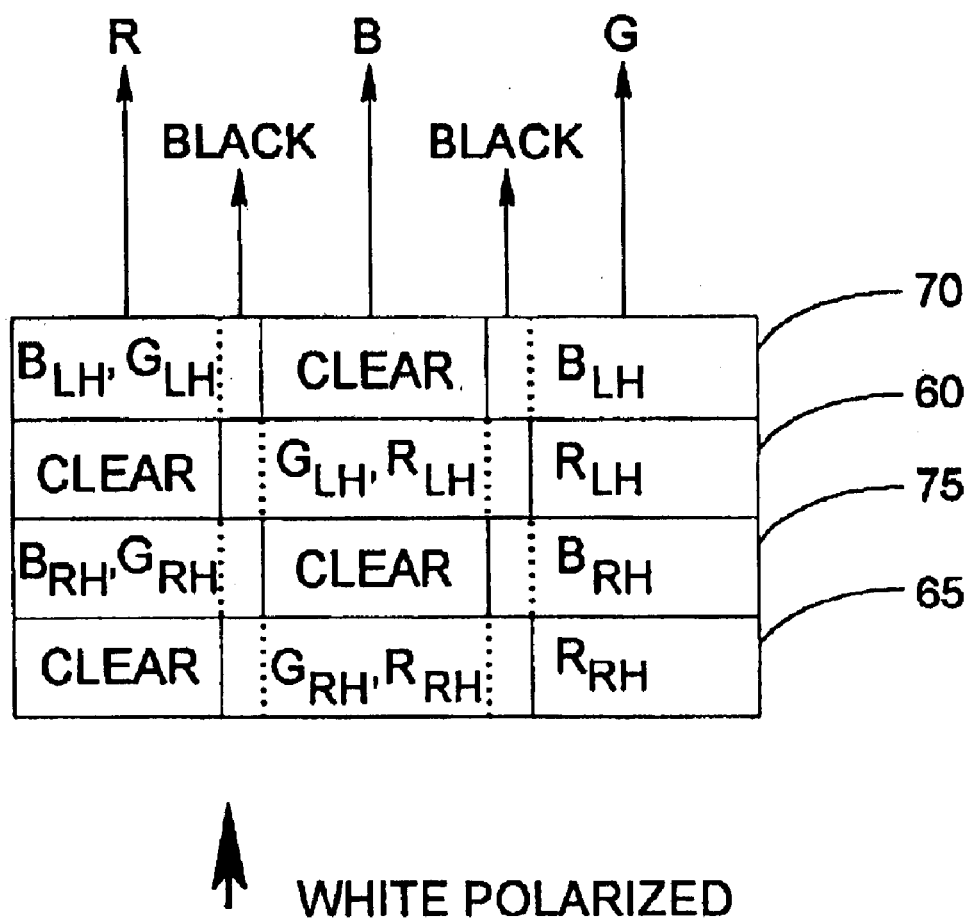
FIG. 26 is a sixteenth illustrative embodiment of the CLC-based spectral filtering structure shown in FIG. 2 which is polarization independent, and wherein each red subpixel structure therein is realized by a clear (i.e. non-reflecting) region in the first CLC layer, a blue-green-band RHCP reflecting region in the second CLC layer, a clear non-reflecting region in the third CLC layer, and a blue-green band LHCP reflecting region in the fourth CLC layer, wherein each blue subpixel structure therein is realized by a green-red band RHCP reflecting region in the first CLC layer, a clear non-reflecting region in the second CLC layer, a green-red band LHCP reflecting region in the third CLC layer, and a clear non-reflecting region in the fourth CLC layer, and wherein each green subpixel structure therein is realized by a red-band RHCP reflecting region in the first CLC layer, a blue-band RHCP reflecting region in the second CLC layer, a red-band LHCP reflecting region in the third CLC layer, and a blue-band LHCP reflecting region in the fourth CLC layer, and wherein a inter-subpixel "white" reflective matrix-like pattern is integrally-embodied within the spectral filtering structure, between neighboring red and blue subpixel regions by virtue of (i) the spatially-overlapping green-red band RHCP reflecting regions in the first CLC layer and the blue-green band RHCP reflecting regions in the second CLC layer, (ii) the spatially-overlapping blue-green band RHCP reflecting regions in the second CLC layer and the green-red band LHCP reflecting regions in the third CLC layer, and (iii) the spatially-overlapping green-red band LHCP reflecting regions in the third CLC layer and the blue-green band LHCP reflecting regions in the second CLC layer, between the red and blue subpixel regions, and between neighboring blue and green subpixel regions by virtue of (i) the spatially-overlapping green-red band RHCP reflecting regions in the first CLC layer and the blue band RHCP reflecting regions in the second CLC layer, (ii) the spatially-overlapping blue band RHCP reflecting regions in the second CLC layer and the green-red band LHCP reflecting regions in the third CLC layer, and (iii) the spatially-overlapping green-red LHCP band reflecting regions in the third CLC layer and the blue band LHCP reflecting regions in the second CLC layer.

FIG. 26 shows another stack of layers for producing colored light from both polarized and/or unpolarized white light 201, similar to the stack in FIG. 25. The stack in FIG. 26 has left handed cholesteric liquid crystals in layers 60 and 70 and right handed cholesteric liquid crystals in layer 65 and 75. Although FIG. 26 shows the stack producing a black matrix, it is understood from FIGS. 11 and 13 that stack in FIG. 26 can produce colored light with or without a black matrix for all the incident polarizations.

Figure 12A:
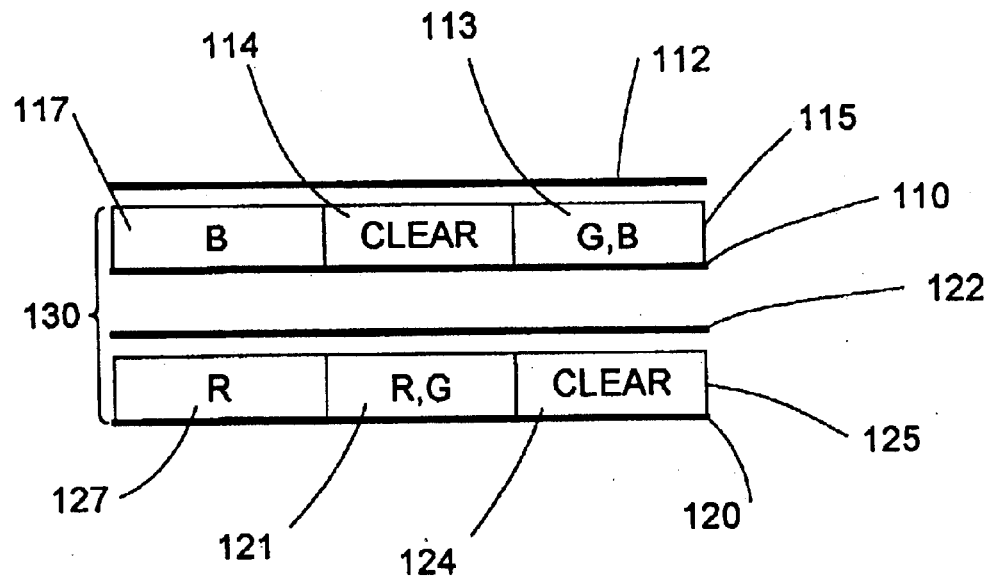
FIG. 12A is a schematic representation illustrating a first method of fabricating the two-layer CLC-based spectral filtering structure shown in FIGS. 11 and 11A.
Figure 12B:
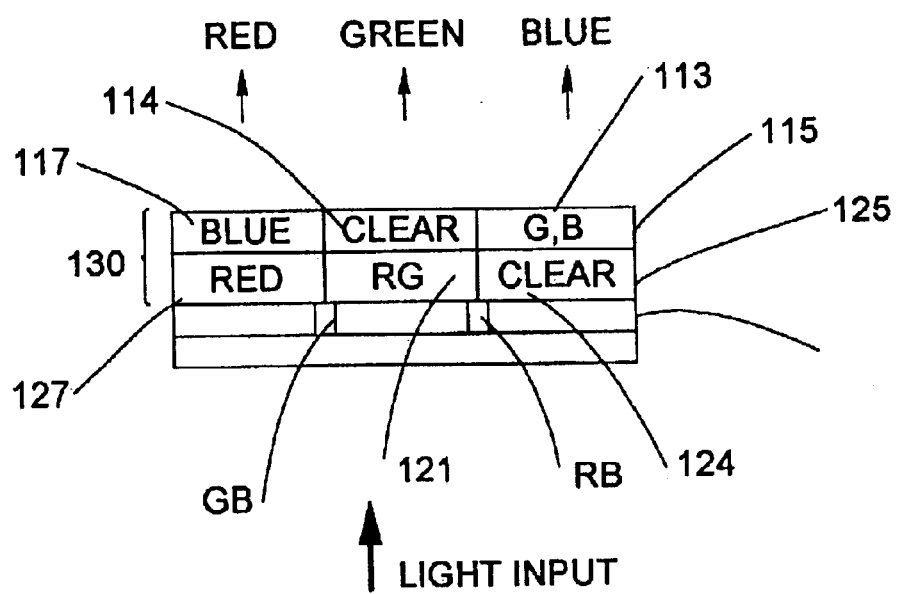
FIG. 12B is a schematic representation final structure produced when using the first method of spectral filter fabricating illustrated in FIG. 12A.

FIG. 12A shows a method of making a reflective filter display 130 having two layers. The first layer is a top layer 115 having three sub-pixels: a sub-pixel 113 for reflecting blue-green light, a sub-pixel 117 for reflecting blue light and a clear isotropic sub-pixel 114. The second layer is a bottom layer 125 having three sub-pixels, a sub-pixel 121 for reflecting red-green light, a sub-pixel 127 for reflecting red light, and a clear isotropic sub-pixel 124.

To make a left handed reflective cholesteric liquid crystal (CLC) color filter layer 115 reflecting blue-green light in sub-pixel 113, blue light in sub-pixel 117 and having a clear sub-pixel 113, the method first involves preparing a bottom substrate 110 of PVA (polyvinyl alcohol) coated glass, by buffing it in one direction. Then, prepare a top substrate 112 of PET (Mylar D) by buffing it in any direction.

The next step of the process involves mixing a left handed CLC polymer comprising blue polysiloxane, such as that sold by Wacker Chemical Company of Germany as SLM 90032, 47.5% by weight, a left handed CLC polymer comprising blue polysiloxane, such as that sold by Wacker Chemical Company of Germany as SLM 90031, 19.1% by weight, with a low molecular weight nematic liquid crystal, such as that sold by EMI Company of Germany as (E44, EMI): 32.1% by weight. Then a chiral dopant such as (S1011) sold by EMI and photo initiator (IG184) sold by Ciba-Geigy of U.S.A., 0.35% of the polymers is added to the mixture. The above materials should be mixed at 120° C. and de-gassed in a vacuum for 20 minutes at 90° C.

The mixture is then coated onto the PVA coated glass bottom substrate 110 with the use of a knife coater. The coating is preferably about 8–12 microns thick. The coating temperature and the gap of the knife coater can be used to vary the thickness of the coating as applied.

The mixture is then laminated with the PET top substrate 112 using a laminator. The temperature and the gap between the rollers of the laminator will effect the final thickness of the film.

To make a CLC film with blue, green sub-pixel 113, blue sub-pixel 117 and clear sub-pixel 113 in layer 115, the layer 115 is heated at 75° C. with the PET substrate 112 up, the heating is preferably done on a hot plate.

With the layer 115 at 75° C. it is preferably mechanically sheared to align the liquid crystal molecules. Mechanical shearing provides a tangential mechanical force which helps align the liquid crystal molecules between substrates 110 and 112 in layer 115.

With layer 115 still on the hot plate or still heated to 75° C., apply a mask to the top substrate layer 112 having the PET material. The mask will vary in size and shape depending on the use of the layer. For use in color displays the mask will be the size and shape of pixels used in the display. In the layer shown in FIG. 3 the display uses two layers with three sub-pixels, two being reflective color filter portions per layer. Architectures for such displays are disclosed in the applicants' copending application attorney docket number PA1100 entitled "Cholesteric Liquid Crystal Reflective Color Filter Architectures", which is hereby made a part hereof and incorporated herein by reference.

A mask is applied to block the sub-pixels of the layer 115 to be the blue-green sub-pixel 113 and the clear sub-pixel 114 leaving exposed the blue sub-pixel 117.

While still at 75° C. layer 115 is then exposed to UV light of 360 nm at 0.1 mW/cm$^2$ intensity for approximately 20 seconds to polymerize the exposed cholesteric liquid crystals in the blue sub-pixel 117 of layer 115.

While still at 75° C. layer 115 is further exposed at 75° C. with a collimated UV of about 360 nm at another intensity of about 10 mW/cm$^2$ for about 30 seconds.

While still at 75° C. the mask blocking the blue-green sub-pixel 113 is removed and layer 115 is exposed to UV light 360 nm at 0.1 mW/cm$^2$ for approximately 40 seconds to polymerize the blue-green sub-pixel 113 of layer 115 with the desired bandwidth.

While still at 75° C., layer 115 is further exposed at 75° C. with a collimated UV of about 360 nm at another intensity of about 10 mW/cm$^2$ for about 30 seconds.

The mask is then totally removed exposing all of layer 115.

The temperature is raised to 150° C. to polymerize the clear isotropic phase sub-pixel 114.

Maintaining 150° C. layer 115 is then exposed to UV light of 360 nm at 20 mW/cm$^2$ for approximately 30 seconds to set the polymers.

The PET substrate 112 is then removed. Layer 115 is now ready for installation in a display or for other use.

To make left handed reflective cholesteric liquid crystal (CLC) color filter layer 125 reflecting red-green broadband light in sub-pixel 121, red light in sub-pixel 127 and having a clear isotropic sub-pixel 124, the method first involves preparing a bottom substrate 120 of PVA (polyvinyl alcohol) coated glass, by buffing it in one direction. Then, a top substrate 122 of PET (Mylar D) is prepared by buffing it in any direction.

The next step of the method involves mixing a left handed CLC polymer comprising blue polysiloxane, such as that sold by Wacker Chemical Company of Germany as SLM 90032, 63% by weight, with a low molecular weight nematic liquid crystal, such as that sold by EMI Company of Germany as (E44, EMI): 28.6% by weight. Then a low molecular nematic liquid crystal such as (TEB30) sold by SLICHEM of China, 8.4% by weight, and photo initiator (IG184, Ciba-Geigy), 0.35% of the liquid crystal polymer is added to the mixture. The above materials are mixed at 120° C. and de-gassed in a vacuum for 20 minutes at 90° C.

The mixture is then coated onto the PVA coated glass bottom substrate 120 with the use of a knife coater. The coating is preferably about 8–12 microns thick. The coating temperature and the gap of the knife coater can be used to vary the thickness of the coating as applied.

The mixture is then laminated with the PET top substrate 122 using a laminator. The temperature and the gap between the rollers of the laminator will effect the final thickness of the film.

To make a CLC film with red-green sub-pixel 121, red sub-pixel 127 and clear sub-pixel 124 in layer 125, layer 125 is heated at 75° C. with the PET substrate 122 up. The heating is preferably done on a hot plate.

With the layer 125 at 75° C. it is preferably mechanically sheared to align the liquid crystal molecules. Mechanical shearing provides a tangential mechanical force which helps align the liquid crystal molecules between substrates 120 and 122 in layer 125.

With layer 125 still on the hot plate or still heated to 75° C., a mask is applied to the top substrate layer 122 having the PET material. The mask is applied to block the sub-pixels of the layer 125 to the red-green sub-pixel region 121 and the clear sub-pixel 124, leaving the red sub-pixel 127 exposed.

While still at 75° C., layer 125 is then exposed to UV light of 360 nm at 0.1 mW/cm$^2$ intensity for approximately 20 seconds to polymerize the exposed cholesteric liquid crystals in the red sub-pixel 127 of layer 125.

While still at 75° C., layer 125 is further exposed by a collimated UV of about 360 nm at another intensity of about 10 mW/cm$^2$ for about 30 seconds.

While still at 75° C., the mask blocking the red, green sub-pixel 121 is moved and layer 125 is exposed to UV light 360 nm at 0.1 mW/cm$^2$ for approximately 40 seconds to polymerize the red-green sub-pixel 121 of layer 125 with the desired bandwidth.

While still at 75° C., layer 125 is further exposed by a collimated UV of about 360 nm at another intensity of about 10 mW/cm$^2$ for about 30 seconds.

The mask is then totally removed exposing all of layer 125.

The temperature is raised to 150° C. to polymerize the clear isotropic phase 124.

Maintained at 150° C., layer 125 is then exposed to UV light of 360 nm at 20 mW/cm$^2$ for approximately 30 seconds in order to set the polymers The PET substrate 122 is then removed. Layer 125 is now ready for installation in a display or for other use.

As shown in FIG. 4, layers 115 and 125 can be installed in a display device by using UV curable adhesives as applied with the layers 15 and 25 of FIG. 2.

Figure 27:
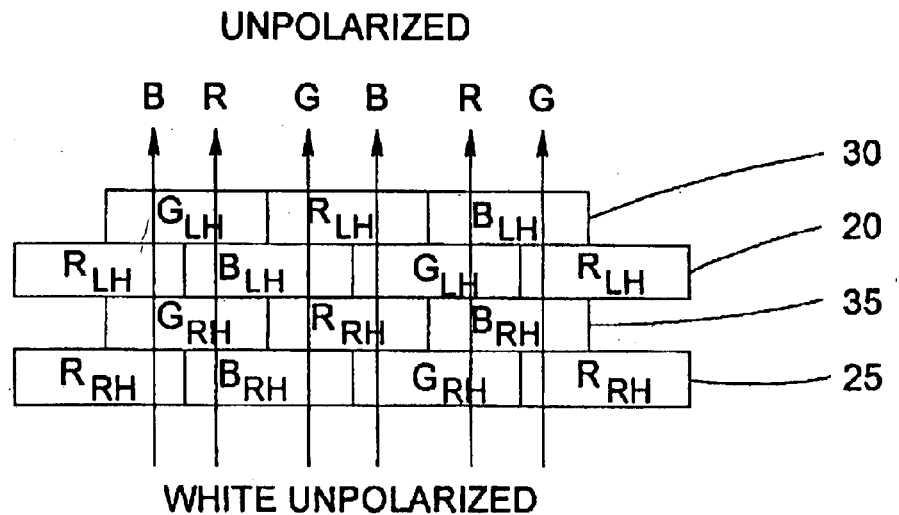
FIG. 27 is a seventeenth illustrative embodiment of the CLC-based spectral filtering structure shown in FIG. 2 which is polarization independent, and wherein each blue subpixel structure therein is realized by a red-band RHCP reflecting region in the first CLC layer, a green-band RHCP reflecting region in the second CLC layer, a red-band LHCP reflecting region in the third CLC layer, and a green-band LHCP reflecting region in the fourth CLC layer, wherein each red subpixel structure therein is realized by a blue-band RHCP reflecting region in the first CLC layer, a green-band RHCP reflecting region in the second CLC layer, a blue-band LHCP reflecting region in the third CLC layer and a green-band RHCP reflecting region in the fourth CLC layer, and wherein each green subpixel structure therein is realized by a blue-band RHCP reflecting region in the first CLC layer, a red-band RHCP reflecting region in the second CLC layer, a blue-band LHCP reflecting region in the third CLC layer, and a red-band LHCP reflecting region in the fourth CLC layer.

Similarly, as shown in FIG. 27, right handed and left handed layers 30, 20 and 35, 25 from FIG. 5B1 can also be used to produce colored light from both polarized and/or unpolarized white light 201.

Figure 15:
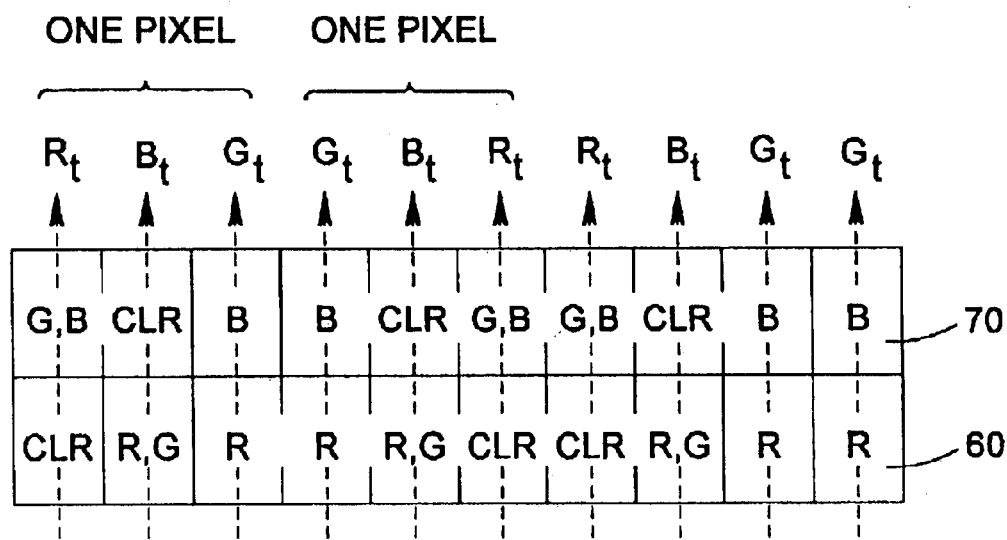
FIG. 15 is a schematic representation illustrating a second alternative method of fabricating the two-layer CLC-based spectral filtering structure shown in FIGS. 13 through 13, which enables the realization of an integrally-embodied broad-band inter-subpixel "white" matrix-like pattern only among the subpixels of each pixel structure, but not between all neighboring pixel structures within the CLC-based spectral filtering structure.

FIG. 15 shows another embodiment of the method for patterning the color filter in each layer associated with FIGS.

11 and 13. Instead of patterning "green-blue", "clear", and "blue" ("B,G", "clear", "B") as in layer 70 of FIG. 4, it can be patterned into "Clear", "B", "B", "Clear", "G,B", "G,B", "Clear". Similarly, layer 60 can be patterned to be "R,G", "R", "R", "R,G", "Clear", "Clear", "R,G", "R", "R", where "R", "G" and "B" refer to the filter layer portion reflecting blue and red light, respectively and Clr refers to a clear portion of the layer. If the two layers are aligned in the way as shown in FIG. 17, color filter pixels consist of sub-pixels ($R_r$, $B_r$, $G_t$) and ($G_r$, $B_r$, $R_t$) will be formed, where "$R_t$", "$G_t$", and "$B_t$" refer to the red, green, and blue sub-pixels are transmission. In this manner the blue B, green-blue G,B, red(R) and clear Clr sub-pixels are doubled up such that one large sub-pixel takes the place of two smaller ones providing an easier fabrication process. Using the same scheme as suggested in FIG. 5, a black matrix will be automatically formed in this color filter structure when overlapping reflective portions reflecting all colors are used.

Pixels in a display having three sub-pixels one for each of the primary colors of red, green, and blue being transmitted are shown above in FIG. 5B1.

Pixels in a display may also have four sub-pixels one for each of the primary colors red, green, and blue and one for transmitting white light, shown as a clear sub-pixel in FIGS. 11, 13 and 14 through 24D. Again, the clear pixel can be made from the same material in a clear isotropic state or, this clear sub-pixel can be made to reflect light in the infrared or ultraviolet bands and transmit the visible light.

As shown above for three sub-pixel arrays of pixels made up of two layers of reflective color filters, the sub-pixels can be arranged to make 2 or more adjacent sub-pixels in a layer the same color for ease of manufacture. Sub-pixels of one color can then be made 2 times or even 4 times as large as one sub-pixel.

With four sub-pixels per pixel the number of combinations of sub-pixel patterns is much larger than with three sub-pixels. The object is to find combinations for the two layers of reflective color filters making up the arrays of the display with the largest possible number of adjacent sub-pixels having the same color for ease of manufacturing the displays.

The pixels in the four sub-pixel display will have 24 combinations of sub-pixels per pixel. If the pixel sizes are small enough the human eye will not be able to detect that the sub-pixels are in different places for adjacent pixels. Therefore pixels which are mirror images of each other may be used where the sub-pixels will then have adjacent colors for ease of manufacture.

Figure 16A:
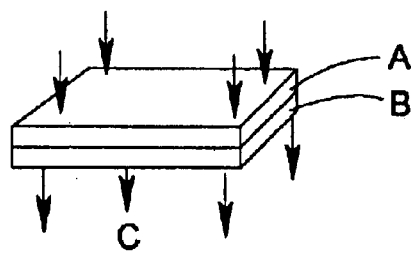
FIG. 16A is a perspective schematic representation of a sixth illustrative embodiment of the CLC-based spectral filtering structure shown in FIG. 2, wherein the subpixel structures of each pixel structure therein are arranged in a 2×2 array.
Figure 16B:
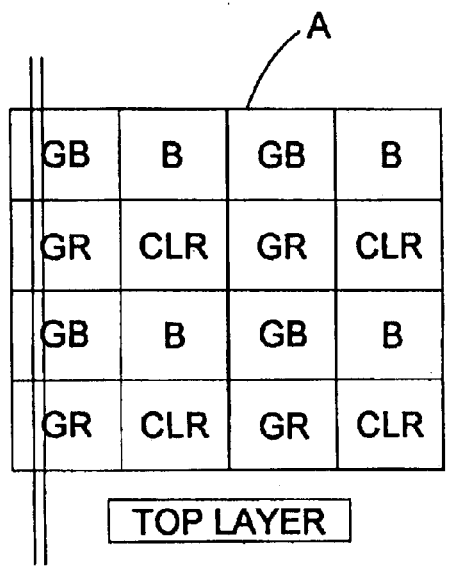
FIG. 16B is a schematic representation of one pixel structure in the first (i.e. bottom) CLC layer of the CLC-based spectral filtering structure of FIG. 16A, showing the 2-D spatial layout of the individual subpixel structures contained therein.
Figure 16C:
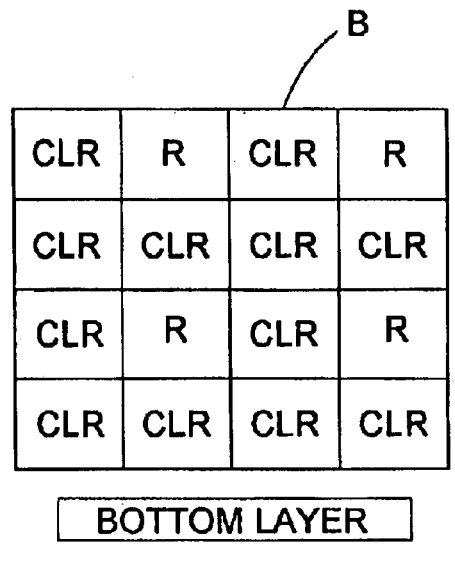
FIG. 16C is a schematic representation of one pixel structure in the second (i.e. top) CLC layer of the CLC-based spectral filtering structure of FIG. 16A, showing the 2-D spatial layout of the individual subpixel structures contained therein.
Figure 16D:
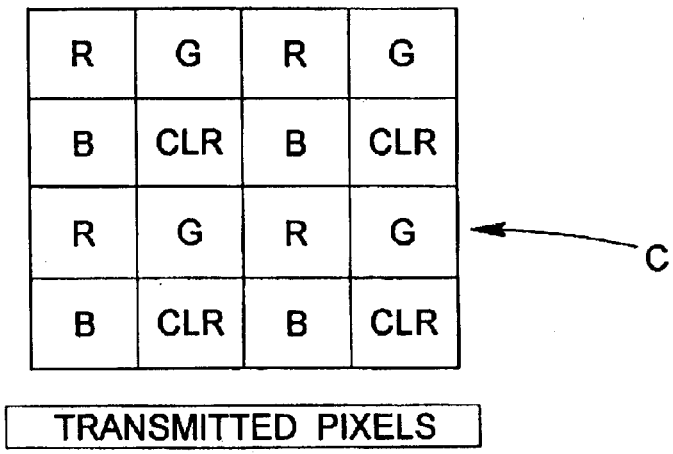
FIG. 16D is a schematic representation of light output from the subpixel structures contained in one pixel structure in the CLC-based spectral filtering structure of FIG. 16A.

In FIG. 16A, a two-layer color filter system is shown. FIG. 16B is the top layer, FIG. 16C is the bottom layer and FIG. 16D is the transmissive color pixel pattern. In the figure, "GR" means that the pixel reflects in green and red; "GB" means that the pixel reflects in green and blue; "B" means that the pixel reflects in blue; "R" means that the pixel reflects in red, and "Clr" means that the pixel is transparent in the visible. However, it can reflect infrared and/or ultraviolet light. When the two layers are aligned and laminated to each other, a color filter is generated with a transmission color configuration as shown in FIG. 8D2.

In the pixel pattern of FIG. 16B, the top layer of the highlighted pixel has a pixel array wherein the sub-pixel pattern in the top row has from left to right green-blue (GB) and blue (B) the bottom row has green-red (GR) and Clear (Clr). The pattern repeats throughout the array. The bottom layer of FIG. 16C has a pixel array wherein the sub-pixel pattern in the top row has from left to right clear (Clr) and red (R) the bottom row has clear (Clr) and clear (Clr). This pattern results in a pixel FIG. 16D having a top row from left to right transmitting red (R) and green (G) and a bottom row transmitting blue(B) and clear (Clr). The array has pixels which are all the same. However the pattern in the top layer has no adjacent colors which are the same making the array more difficult to make. The bottom layer has an array with mostly clear (Clr) sub-pixels but the red(R) sub-pixels are never adjacent, making it more difficult to make the red(R) sub-pixels.

Figure 17A:
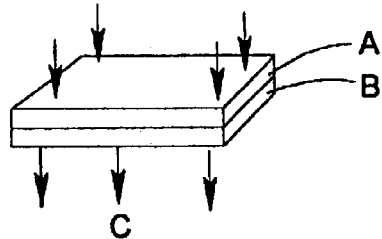
FIG. 17A is a perspective schematic representation of a seventh illustrative embodiment of the CLC-based spectral filtering structure shown in FIG. 2, wherein the subpixel structures of each pixel structure therein are arranged in a 2×2 array.
Figure 17B:
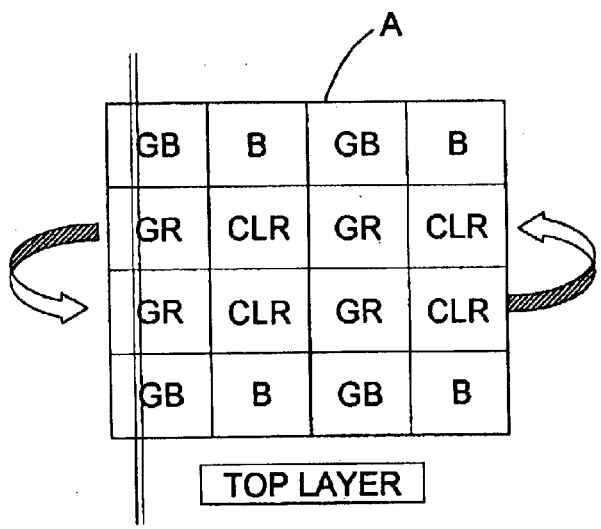
FIG. 17B is a schematic representation of one pixel structure in the first (i.e. bottom) CLC layer of the CLC-based spectral filtering structure of FIG. 17A, showing the 2-D spatial layout of the individual subpixel structures contained therein.
Figure 17C:
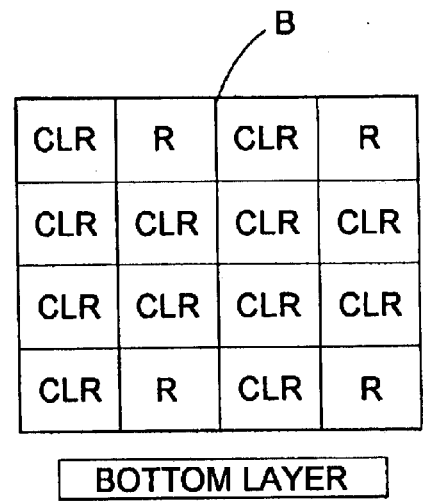
FIG. 17C is a schematic representation of one pixel structure in the second (i.e. top) CLC layer of the CLC-based spectral filtering structure of FIG. 17A, showing the 2-D spatial layout of the individual subpixel structures contained therein.
Figure 17D:
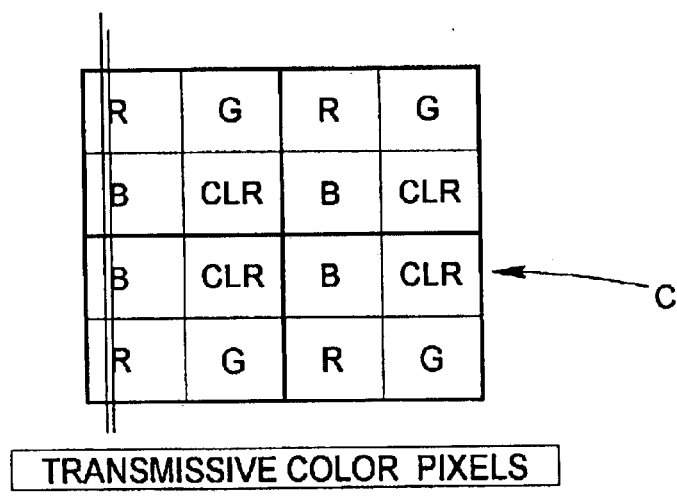
FIG. 17D is a schematic representation of light output from the subpixel structures contained in one pixel structure in the CLC-based spectral filtering structure of FIG. 17A.

To make the pixel arrays easier to manufacture, FIG. 17A shows the pixel array of FIG. 16A with rows 1 and 2 reversed in the top layer and the bottom layer. The top layer now has in rows 2 and 3 a green-red (GR) sub-pixel adjacent to a green-red (GR) sub-pixel and a clear (Clr) sub-pixel adjacent to a clear Clr sub-pixel. Similarly with the array extended beyond what is shown it is easy to see that a green-blue (GB) sub-pixel and a blue sub-pixel will also be adjacent. This doubles the size of the sub-pixels and makes the top layer easier to manufacture. The pattern on the bottom layer is also easier to manufacture because rows 2 and 3 are all clear (Clr) making 8 sub-pixels adjacent with the same color. However, as shown in FIG. 17D, the transmissive color pixel has a top pixel with a mirror image of the bottom pixel. When the pixel sizes are small the human eye will not be able to tell that the pixels are different and the images shown will not be distorted by the different sub-pixel patterns in the adjacent pixels.

Figure 18A:
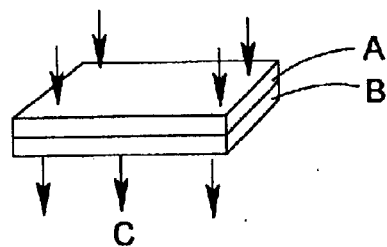
FIG. 18A is a perspective schematic representation of a eighth illustrative embodiment of the CLC-based spectral filtering structure shown in FIG. 2, wherein the subpixel structures of each pixel structure therein are arranged in a 2×2 array.
Figure 18B:
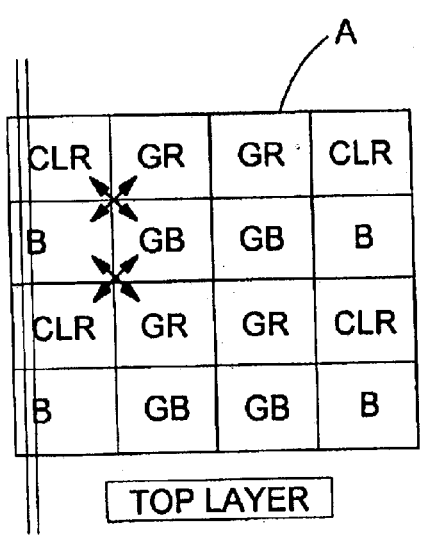
FIG. 18B is a schematic representation of one pixel structure in the first (i.e. bottom) CLC layer of the CLC-based spectral filtering structure of FIG. 18A, showing the 2-D spatial layout of the individual subpixel structures contained therein.
Figure 18C:
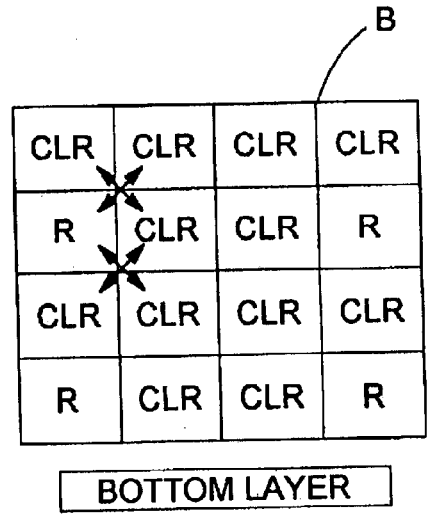
FIG. 18C is a schematic representation of one pixel structure in the second (i.e. top) CLC layer of the CLC-based spectral filtering structure of FIG. 18A, showing the 2-D spatial layout of the individual subpixel structures contained therein.
Figure 18D:
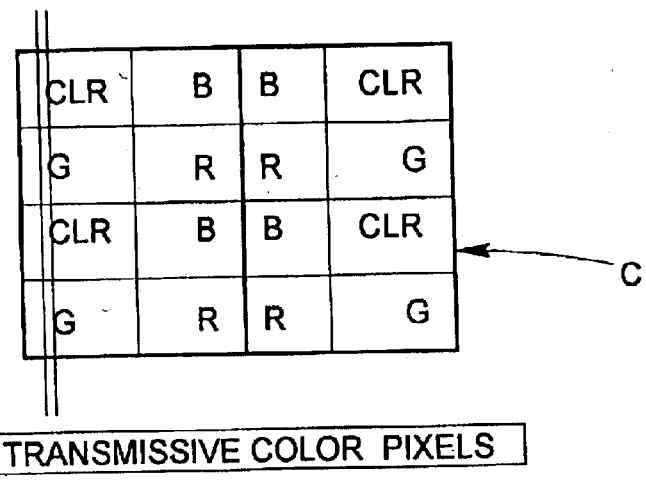
FIG. 18D is a schematic representation of light output from the subpixel structures contained in one pixel structure in the CLC-based spectral filtering structure of FIG. 18A.

To further enlarge the sub-pixel sizes, the arrows in FIG. 18B for the top layer show the top left clear (Clr) and bottom right green-blue (GB) sub-pixels exchanging positions and the bottom left and top right sub-pixels exchanging positions. Now the array, by extension, has in the top row two adjacent clear (Clr) sub-pixels, then two adjacent green-red (GR) sub-pixels, then two adjacent clear (Clr) sub-pixels again, etc. The second row has two blue (B) sub-pixels then two green, blue GB sub-pixels etc. Similarly the third and fourth rows also always have two adjacent sub-pixels of the same color. The sub-pixels can now all be twice the size when manufactured making the top layer easier to manufacture. The bottom layer in FIG. 18 is the same complexity to make as in FIG. 17C with two adjacent columns of clear (Clr) sub-pixels instead of two adjacent rows. FIG. 17D shows that all the adjacent columns of pixels will be mirror images of each other. If the pixels are small enough the human eye will not see any distortion of the images displayed by this difference in pixels.

Figure 19A:
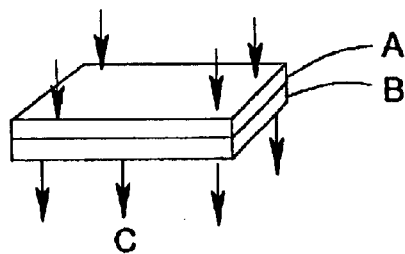
FIG. 19A is a perspective schematic representation of a ninth illustrative embodiment of the CLC-based spectral filtering structure shown in FIG. 2, wherein the subpixel structures of each pixel structure therein are arranged in a 2×2 array.
Figure 19B:
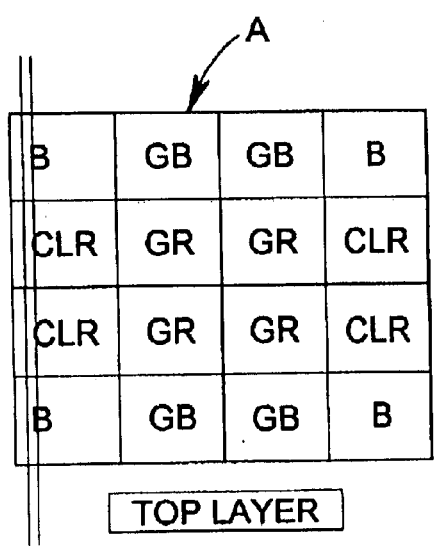
FIG. 19B is a schematic representation of one pixel structure in the first (i.e. bottom) CLC layer of the CLC-based spectral filtering structure of FIG. 19A, showing the 2-D spatial layout of the individual subpixel structures contained therein.
Figure 19C:
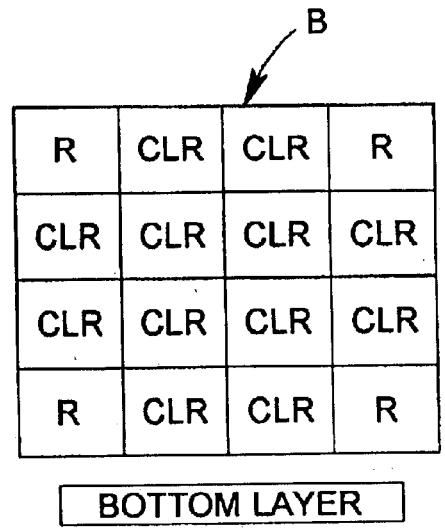
FIG. 19C is a schematic representation of one pixel structure in the second (i.e. top) CLC layer of the CLC-based spectral filtering structure of FIG. 19A, showing the 2-D spatial layout of the individual subpixel structures contained therein.

The arrows in FIG. 17 show the top two rows from FIG. 16 can be exchanged in the top and bottom layers. The top layer FIG. 19B now shows groups of four adjacent sub-pixels for green-red (GR), clear (Clr), green-blue (GB) and blue(B) in a pixel array. Since the manufactured sub-pixel sizes are now four times the size of one sub-pixel, it is much easier to make the top layer. The bottom layer FIG. 19C shows that the second and third rows, and the second and third columns, are all clear sub-pixels making it easy to manufacture, and the array will have squares of four adjacent red sub-pixels for ease of manufacture of the bottom layer.

Figure 19D:
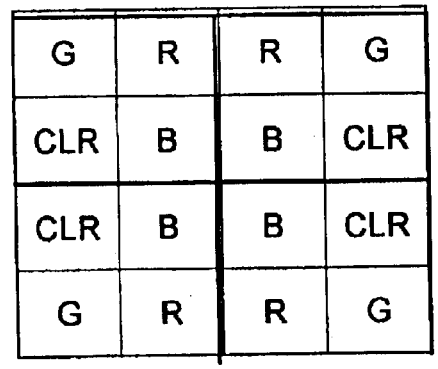
FIG. 19D is a schematic representation of light output from the subpixel structures contained in one pixel structure in the CLC-based spectral filtering structure of FIG. 19A.
Figure 20A:
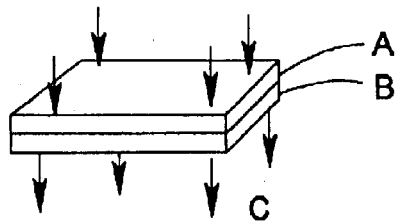
FIG. 20A is a perspective schematic representation of a tenth illustrative embodiment of the CLC-based spectral filtering structure shown in FIG. 2, wherein the subpixel structures of each pixel structure therein are arranged in a 2×2 array.
Figure 20B:
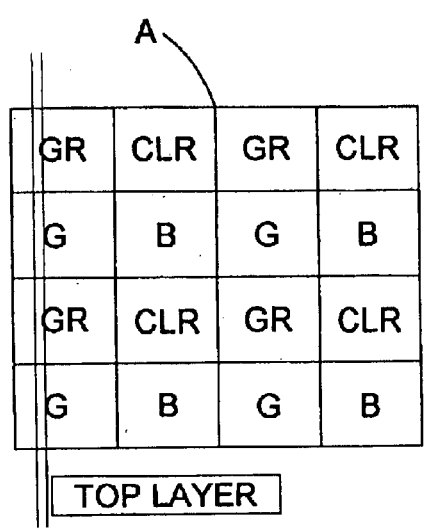
FIG. 20B is a schematic representation of one pixel structure in the first (i.e. bottom) CLC layer of the CLC-based spectral filtering structure of FIG. 20A, showing the 2-D spatial layout of the individual subpixel structures contained therein.
Figure 20C:
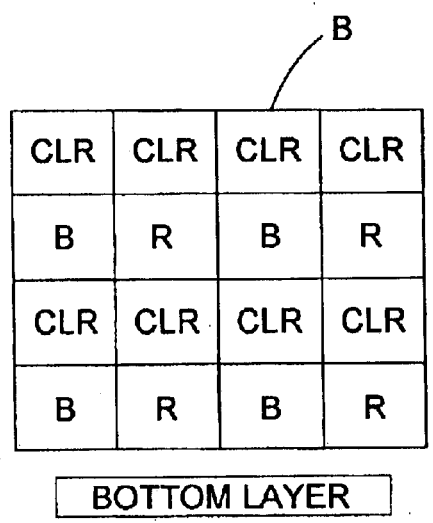
FIG. 20C is a schematic representation of one pixel structure in the second (i.e. top) CLC layer of the CLC-based spectral filtering structure of FIG. 20A, showing the 2-D spatial layout of the individual subpixel structures contained therein.
Figure 20D:
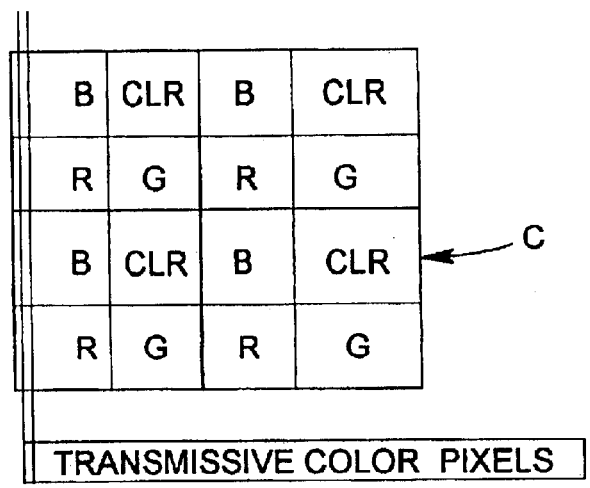
FIG. 20D is a schematic representation of light output from the subpixel structures contained in one pixel structure in the CLC-based spectral filtering structure of FIG. 20A.

The transmissive array of pixels will have sub-pixels, as shown in FIG. 19D with each adjacent sub-pixel being different and the mirror image of the adjacent pixel either diagonally, top to bottom, or left to right. With sufficiently small pixel sizes, the human eye will not be able to tell that each adjacent pixel has a different sub-pixel arrangement. FIG. 20 shows a new pixel array wherein each pixel has a top layer with green-red (GR), Clear (Clr), green(G) and blue(B) a bottom layer with, Clear (Clr), Clear (Clr), blue(B)

and green(G) in the positions, as shown in FIG. 20B and FIG. 20C. The resulting transmitted light is as shown in FIG. 22C having blue (B), clear (Clr), red(R) and green(G) sub-pixels.

FIG. 21 shows an equivalent pixel array to the one shown in FIG. 20. However in the sub-pixels for transmitting red light, instead of using a green(G) sub-pixel in the top layer, and a blue(B) in the bottom layer of FIG. 20, we now use a clear (Clr) sub-pixel in the top layer and a green-blue (GB) sub-pixel in the bottom layer. This now provides two clear Clr sub-pixels in the top layer pixels which can be rearranged in patterns of adjacent clear portions for ease of manufacture.

Figure 22A:
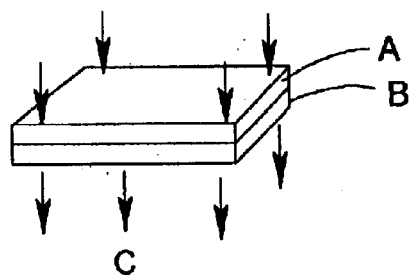
FIG. 22A is a perspective schematic representation of a twelfth illustrative embodiment of the CLC-based spectral filtering structure shown in FIG. 2, wherein the subpixel structures of each pixel structure therein are arranged in a 2×2 array.
Figure 22B:
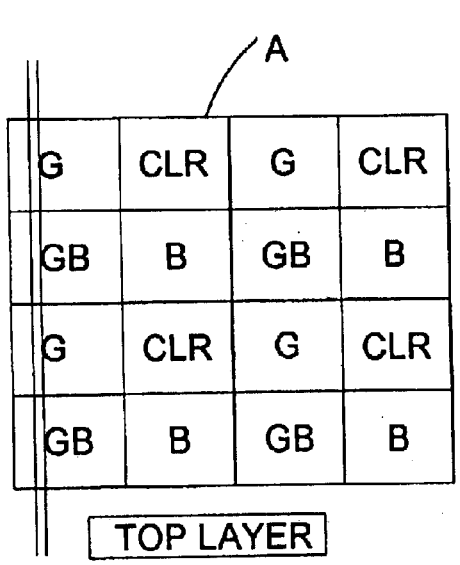
FIG. 22B is a schematic representation of one pixel structure in the first (i.e. bottom) CLC layer of the CLC-based spectral filtering structure of FIG. 22A, showing the 2-D spatial layout of the individual subpixel structures contained therein.
Figure 22C:
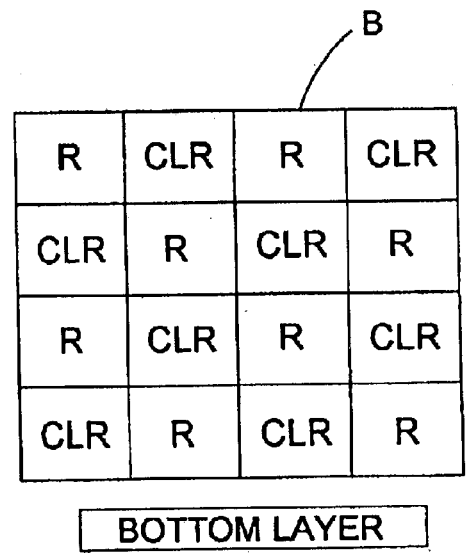
FIG. 22C is a schematic representation of one pixel structure in the second (i.e. top) CLC layer of the CLC-based spectral filtering structure of FIG. 22A, showing the 2-D spatial layout of the individual subpixel structures contained therein.
Figure 22D:
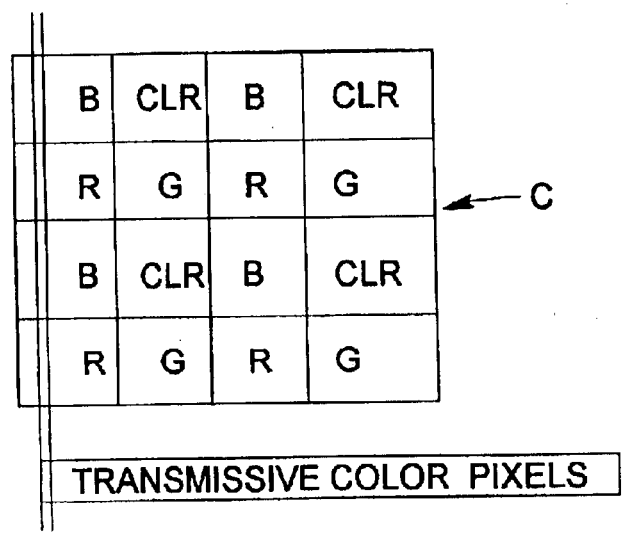
FIG. 22D is a schematic representation of light output from the subpixel structures contained in one pixel structure in the CLC-based spectral filtering structure of FIG. 22A.
Figure 24A:
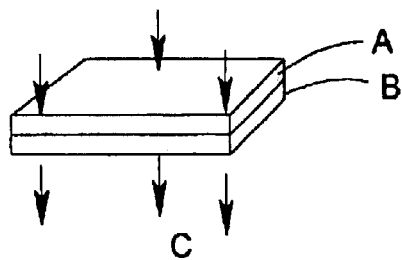
FIG. 24A is a perspective schematic representation of a fourteenth illustrative embodiment of the CLC-based spectral filtering structure shown in FIG. 2, wherein the subpixel structures of each pixel structure therein are arranged in a 2×2 array.
Figure 24B:
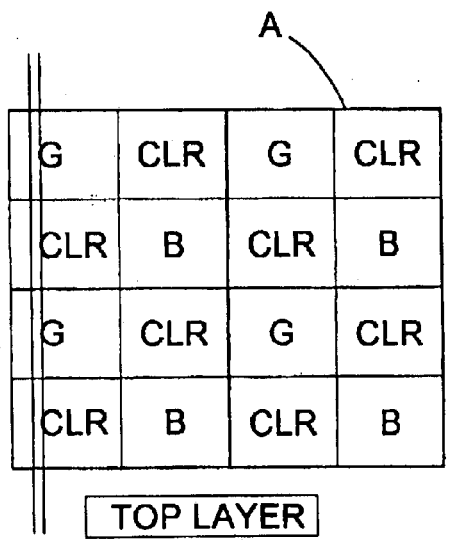
FIG. 24B is a schematic representation of one pixel structure in the first (i.e. bottom) CLC layer of the CLC-based spectral filtering structure of FIG. 24A, showing the 2-D spatial layout of the individual subpixel structures contained therein.

FIG. 22D shows the same resultant pixel as FIG. 21D however the top layer sub-pixels as shown in FIG. 22B and the bottom layer sub-pixels of FIG. 24B have been altered to show that the same results are obtained (i) by changing a sub-pixel such as clear (Clr) in the top layer with the green blue GB layer in the bottom layer, and (ii) by changing the green-red (GR) in the top layer to green(G) while changing the corresponding bottom layer sub-pixel from Clear (Clr) to red (R).

The sub-pixel arrangement of FIGS. 23B and 23C are the equivalent of 22B and 22C as the transmitted light shown in FIG. 22D and FIG. 23D are the same, the only difference being the green-blue (GB) sub-pixel of FIG. 22B paired with the clear (Clr) of FIG. 22C has been replaced with the equivalent pair of the green(G) sub-pixel of FIG. 23B and the blue(B) sub-pixel of FIG. 23C. This substitution yields a column of green sub-pixels in the top layer as shown in FIG. 23B which is easier to manufacture.

Figure 24C:
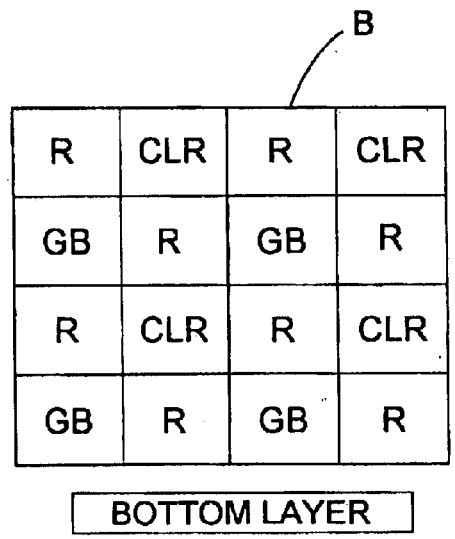
FIG. 24C is a schematic representation of one pixel structure in the second (i.e. top) CLC layer of the CLC-based spectral filtering structure of FIG. 24A, showing the 2-D spatial layout of the individual subpixel structures contained therein.
Figure 24D:
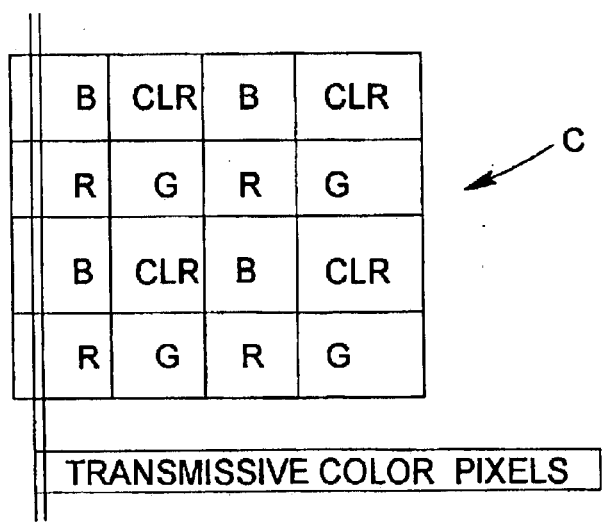
FIG. 24D is a schematic representation of light output from the subpixel structures contained in one pixel structure in the CLC-based spectral filtering structure of FIG. 24A.

Similarly, combining the green (G) sub-pixel top layer of FIG. 23B and blue (B) sub-pixel of FIG. 23C to form the clear (Clr) sub-pixel of the top layer of FIG. 24B and the green-blue (GB) sub-pixel of FIG. 24C forms top layer 24B and bottom layer 24C with a pattern that can be rearranged to form rows and columns with the same color sub-pixels for ease of manufacturing as shown above in FIGS. 1614 20.

As illustrated above, by switching patterns in just the top and bottom layers, and between the top and bottom layers, different patterns of pixels and sub-pixels can be formed. Combinations with adjacent sub-pixels of the same color in each layer are preferred for ease of manufacture.

Figure 28:
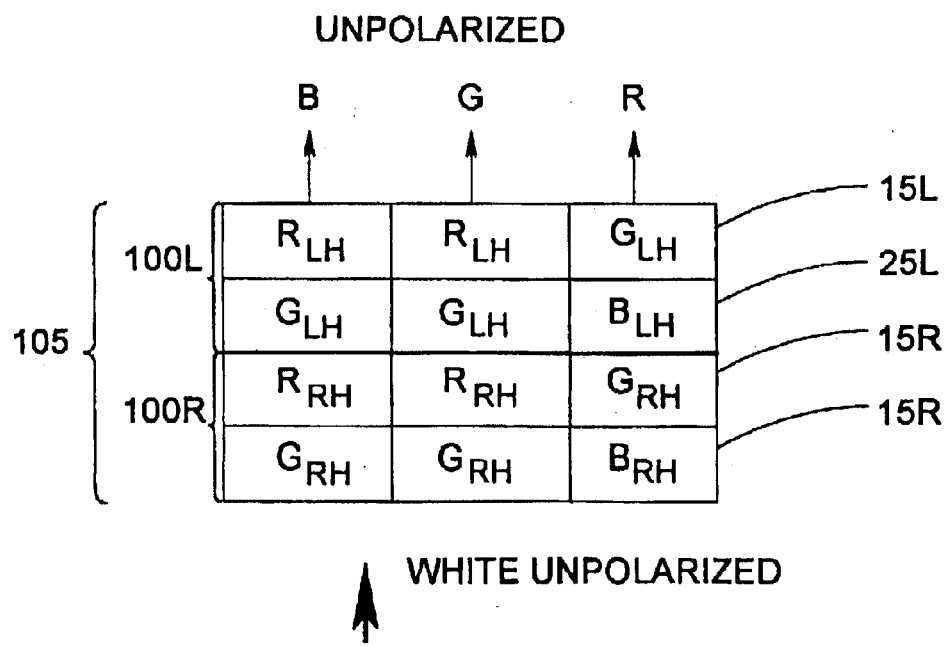
FIG. 28 is an eighth illustrative embodiment of the CLC-based spectral filtering structure shown in FIG. 2 which is polarization independent, and wherein each blue subpixel structure therein is realized by a green-band RHCP reflecting region in the first CLC layer, a red-band RHCP reflecting region in the second CLC layer, a green-band LHCP reflecting region in the third CLC layer, and a red-band LHCP reflecting region in the fourth CLC layer, wherein each green subpixel structure therein is realized by a blue-band RHCP reflecting region in the first CLC layer, a red-band RHCP reflecting region in the second CLC layer, a blue-band LHCP reflecting region in the third CLC layer and a red-band RHCP reflecting region in the fourth CLC layer, and wherein each red subpixel structure therein is realized by a blue-band RHCP reflecting region in the first CLC layer, a blue-band RHCP reflecting region in the second CLC layer, a green-band LHCP reflecting region in the third CLC layer, and a red-band LHCP reflecting region in the fourth CLC layer.

FIG. 28 shows another embodiment of stacking where the stack of FIG. 5 is repeated with opposite handedness cholesteric liquid crystals to form a four layer stack transmitting any polarized light with a correct color. Portion 100R is for right handed cholesteric liquid crystals and portion 100L is for left handed cholesteric liquid crystals. The stack is made by polymerizing portion 15L, 15R, 25L and 25R in separate steps to form the four portion stack in one layer 105.

The polymerizable cholesteric liquid crystal materials used to make the reflective materials above can be mixtures of polymerizable and non-polymerizable components. The polymerizable components may be monomers, oligmers, nematics, or active chiral additives. The non-polymerizable components pitch distribution is non linear resulting in a broad band of reflection wavelengths in the reflective cholesteric liquid crystal color filters produced. The non-polymerizable liquid crystal component is phase segregated from the polymerizable liquid crystal and diffuses along the UV field to generate a pitch gradient. The bandwidth is adjusted by the diffusion rate of the non-polarizable liquid crystal component being slower than the polymerization rate of the polymerizable liquid crystal.

Second Illustrative Embodiment of the Generalized LCD Panel Construction Shown in FIG. 2

Figure 29:
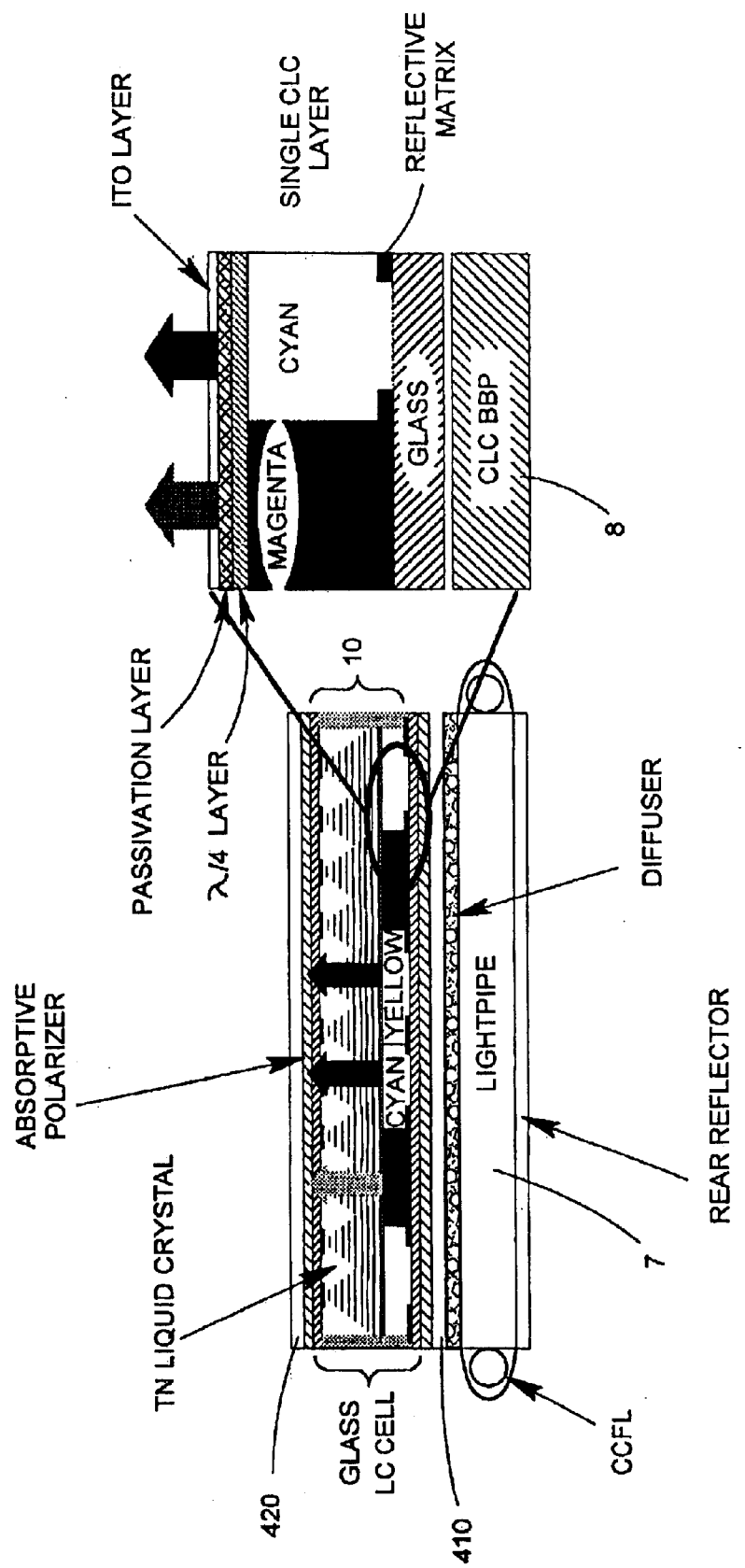
FIG. 29 is a cross-sectional view of a portion of a second illustrative embodiment of the generalized LCD panel assembly shown in FIG. 2.
Figure 29A:
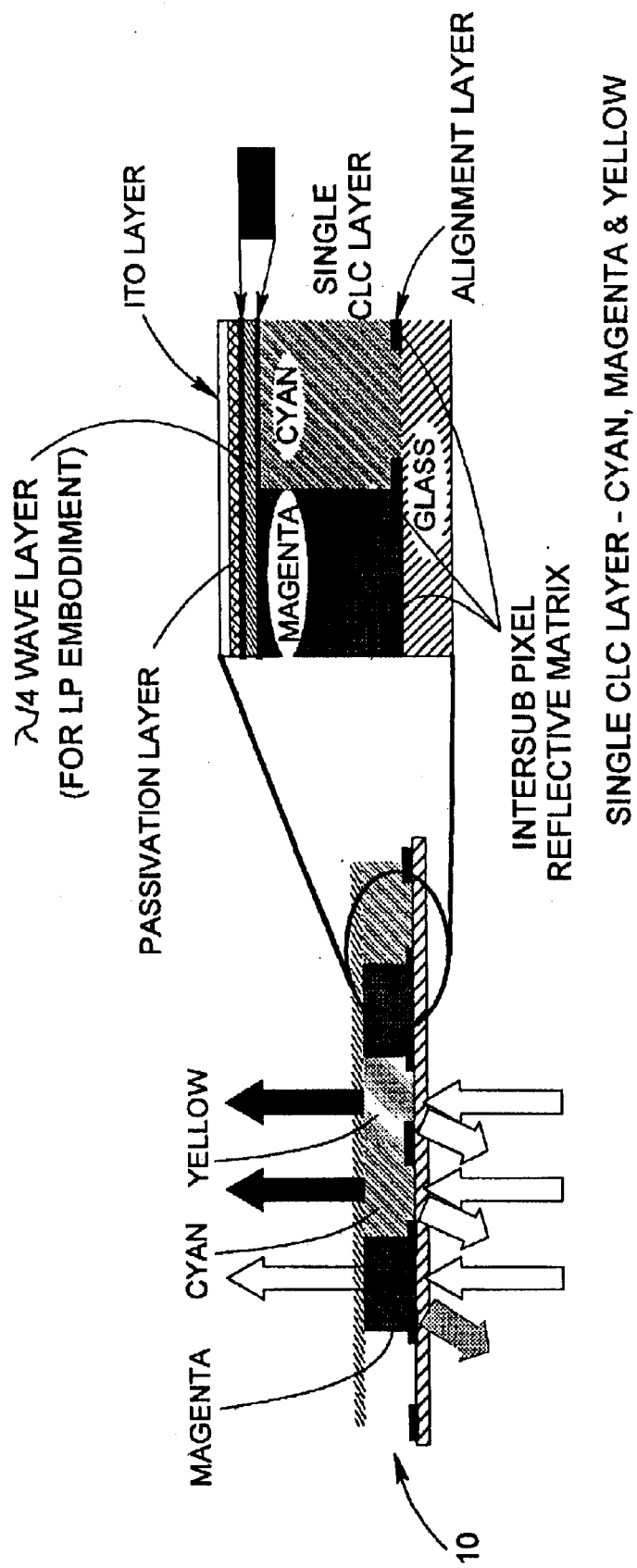
FIG. 29A is a schematic representation of a first illustrative embodiment of a single-layer CLC-based spectral filtering structure which can be employed in the LCD panel assembly shown in FIG. 2.

In the illustrative embodiments shown in FIGS. 29 through 30A2, the backlighting structure 7 is realized in a manner described above. Understandably, there are other techniques for producing a plane of unpolarized light for use in connection with the LCD panel of the present invention.

In the illustrative embodiment of FIGS. 29 through 30A2, the pixelated array of polarization rotating elements 9 is realized as an array of linear polarization rotating elements 9' formed within a single plane. As indicated in FIGS. 30A1 and 30A2, each pass-band linear polarizing reflective element 10A', 10B', and 10C' in the pixelated pass-band linearly polarizing panel 10' has a LP2 characteristic polarization state, whereas the broad-band linear polarizing reflective panel 8' adjacent to the backlighting structure has an LP1 characteristic polarization state and the broad-band linearly polarizing reflective panel 11' has an LP2 characteristic polarization state.

A method of making the broad-band linearly polarizing reflective panels 8' and 11' is disclosed in great detail in International Application Number PCT/US96/17464 entitled "Super Broad-band Polarizing Reflective Material" published on May 9, 1997 under International Publication Number WO 97/16762, which is incorporated herein by reference in its entirety. The reflection characteristics of the broad-band linearly polarizing reflective panel 8' are graphically illustrated in FIG. 30B for incident light having linear polarization state LP1, whereas the reflection characteristics of the broad-band linearly polarizing reflective panel 11' are graphically illustrated in FIG. 30C for incident light having linear polarization state LP2.

In the illustrative embodiment of FIGS. 30A1 and 30A2, the polarization rotating array 9 is realized as an array of electronically-controlled linear polarization rotating elements 9A', 9B', and 9C', for rotating the linearly polarized electric field along LP1 to the LP2 polarization direction as the light rays are transmitted through the spatially corresponding pixels in the LCD panel. In the illustrative embodiment of FIGS. 30A1 and 30A2, each electronically-controlled linear polarization rotating element can be realized as a twisted nematic (TN) liquid crystal cell, super-twisted nematic (STN) liquid crystal cell, or ferro-electric cell, whose operation is by controlled by a control voltage well known in the art. To construct the linear polarization rotating elements, thin film transistors (TFTs) can be used to create the necessary voltages across a layer of liquid crystal material in order to achieve alignment of the liquid crystal molecules, thus causing the corresponding element to not rotate the polarization direction of transmitted light passing therethrough. In its electrically-inactive state (i.e. no voltage is applied), the electric field intensity of light exiting from the cell is substantially zero and thus a "dark" subpixel level is produced. In its electrically-active state (i.e. the threshold voltage $V_T$ is applied), the electric field intensity of light exiting from the cell is substantially non-zero and thus a "bright" subpixel level is produced.

In the illustrative embodiment of FIGS. 30A1 and 30A2, the pixelated array of spectral filtering elements (i.e. spectral filter structures) 10 is realized as an array of pass-band linear polarizing reflective elements 10A', 10B', and 10C' formed within a single plane. Broad-band linearly polarizing reflective panel 11' is laminated to the pixelated array of spectral filtering elements 10.

As shown in FIG. 30D, each pass-band polarizing reflective element 10C' associated with a "blue" subpixel in the pixelated pass-band linear polarizing panel 10' is particularly designed to reflect nearly 100% all spectral components having the LP2 characteristic polarization state and a wavelength within the green reflective band $\Delta\lambda_G$ or the red reflective band $\Delta\lambda_R$, whereas all spectral components having the LP2 characteristic polarization state and a wavelength within the blue reflective band $\Delta\lambda_B$ are transmitted nearly 100% through the pass-band polarizing reflective element. The pass-band polarizing reflective element associated with each "blue" subpixel is "tuned" during fabrication in the manner described hereinabove.

As shown in FIG. 30E, each pass-band polarizing reflective element 10B' associated with a "green" subpixel in the pixelated pass-band linearly polarizing panel 10' is particularly designed to reflect nearly 100% all spectral components having the LP2 characteristic polarization state and a wavelength within the red reflective band $\Delta\lambda_R$ or the blue reflective band $\Delta\lambda_B$, whereas all spectral components having the LP2 characteristic polarization state and a wavelength within the green reflective band $\Delta\lambda_G$ are transmitted nearly 100% through the pass-band polarizing reflective element. The pass-band polarizing reflective element associated with each "green" subpixel is "tuned" during fabrication in the manner described hereinabove.

As shown in FIG. 30F, each pass-band polarizing reflective element 10C' associated with a "red" subpixel in the pixelated pass-band linear polarizing panel 10' is particularly designed to reflect nearly 100% all spectral components having the LP2 characteristic polarization state and a wavelength within the green reflective band $\Delta\lambda_G$ or the blue reflective band, whereas all spectral components having the LP2 characteristic polarization state and a wavelength within the red reflective band $\Delta\lambda_R$ are transmitted nearly 100% through the pass-band polarizing reflective element. The pass-band polarizing reflective element associated with each "red" subpixel is "tuned" during fabrication in the manner described hereinabove.

The pixelated pass-band linearly polarizing reflective panel 9' can be fabricated in a manner similar to the way described in the LCD panel fabrication method described hereinabove.

The Second Generalized LCD Panel Construction of the Present Invention

In the second generalized LCD panel construction shown in FIG. 31, spectral filtering occurs before spatial intensity modulation. In the first illustrative embodiment of this LCD panel construction shown in FIGS. 31A1 and 31A2, circular polarization techniques are used to carry out the spatial intensity modulation and spectral filtering functions employed therein. In the second illustrative embodiment of this LCD panel construction shown in FIGS. 32A1 and 32A2, linear polarization techniques are used to carry out the spatial intensity modulation and spectral filtering functions employed therein. In each such illustrative embodiment, modifications are made among the various components of the LCD panel shown in FIG. 31. Details regarding such modifications will be described hereinafter.

In FIG. 31, the subcomponent structure of the second generalized embodiment of the LCD panel hereof is shown in great clarity. As shown, the second generalized embodiment of the LCD panel 2 comprises: a backlighting structure 7 including a quasi-diffusive reflector 7A, for producing a plane of broad-band light having a substantially uniform light intensity over the x and y coordinate axes thereof; a broad-band CLC-based polarizing reflective panel 8; a light condensing film layer 410 applied to the broad-band polarizing reflective panel 8; pixelated array 10 of pass-band polarizing reflective (filter) elements 10A, 10B, 10C, for spectral filtering of light produced from the backlighting structure; a pixelated array 9 of polarization direction rotating elements 9A, 9B, 9C for spatial intensity modulation of light produced from the pixelated array of pass-band polarizing reflective (filter) elements; a broad-band polarizing reflective panel 11 for cooperative operation with the pixelated array of polarization direction rotating elements 9 and the pixelated array of pass-band polarizing reflective (filter) elements 10; and a polarization-preserving light diffusive film layer 420 applied to the broad-band reflective polarizing panel 11 to improve the angular viewing performance of the LCD panel assembly. In an alternative embodiment, a broad-band absorptive-type panel can be substituted for broad-band polarizing reflective panel 11 in order to reduce glare due to ambient light incident upon the LCD panel during operation.

In order to produce high-resolution color images, the spatial period of the pixelated arrays 9 and 10 is selected to be relatively small in relation to the overall length and height dimensions of the LCD panel. In a conventional manner, each pixel structure in the LCD panel is comprised of a red subpixel 13A, a green subpixel 13B and blue subpixel 13C. As shown therein, each red subpixel structure 13A comprises a red-band spectral filtering element 10A which is spatially registered with a first polarization direction rotating element 9A. Each green subpixel structure 13B comprises a green-band spectral filtering element 10B spatially registered with a second polarization direction rotating element 9B. Each blue subpixel element 13C comprises a blue-band spectral filtering element 10C spatially registered with a third polarization direction rotating element 9C. The output intensity (i.e. brightness or darkness level) of each red subpixel structure is controlled by applying pulse-width modulated voltage signal $V_R$ to the electrodes of its electrically-controlled spatially intensity modulating element. The output intensity of each green subpixel structure is controlled by applying pulse-width modulated voltage signal $V_G$ to the electrodes of its electrically-controlled spatially intensity modulating element. The output intensity of each blue subpixel structure is controlled by providing pulse-width modulated voltage signal $V_B$ applied to the electrodes of its electrically-controlled spatially intensity modulating element. By simply controlling the width of the above-described voltages $V_R$, $V_G$, $V_B$, the grey-scale intensity (i.e. brightness) level of each subpixel structure can be controlled in a manner well known in the LCD panel art.

In FIGS. 31A1 through 31F, a circularly polarizing embodiment of the system shown in FIG. 31 is shown in detail, along with a schematic of its operation during the generation of bright and dark subpixel structures.

In FIGS. 32A1 through 32F, a linearly polarizing embodiment of the system shown in FIG. 31 is shown in detail, along with a schematic of its operation during the generation of bright and dark subpixel structures.

Modifications to the Four Basic LCD System Designs to Reduce Glare from Ambient Light and Improve Image Contrast As shown in FIG. 33, the LCD panel of FIGS. 10A1 and 10A2 is shown modified by mounting a first broad-band absorptive circular polarizer panel 8A" to the front surface of broad-band circularly polarizing reflective panel 8", and mounting a second broad-band absorptive circular polarizer panel 11A" to the front surface of broad-band circularly polarizing reflective panel 11". The polarization state of broad-band absorptive circular polarizer panel 8A" is LHCP in order to match the LHCP polarization state of broad-band circularly polarizing reflective panel 8". Such polarization matching ensures that spectral energy which is not reflected from the broad-band polarizing reflective panel 8", but is transmitted (i.e. leaked) therethrough due to a suboptimal extinction ratio, is absorbed by the broad-band absorptive circular polarizer panel 8A" through energy dissipation. Similarly, the polarization state of broad-band absorptive circular polarizer panel 11A" is RHCP in order to match the RHCP polarization state of broad-band polarizing reflective panel 11". Such polarization matching ensures that spectral energy which is not reflected from the broad-band polarizing reflective panel 11", but is transmitted (i.e. leaked) therethrough due to a suboptimal extinction ratio, is absorbed by the broad-band absorptive circular polarizer panel 11A" through energy dissipation. Preferably, these absorptive circularly polarizing filter panels 8A" and 11A" are laminated directly onto broad-band circularly polarizing reflective panels 8" and 11", respectively. The use of broad-band absorptive circular polarizers 8A" and 11A" substantially improves the contrast of images formed by the LCD panel, without reducing the light transmission efficiency along the light projection axis of the LCD panel. Such broad-band absorptive polarizers can be realized using dichroic polarizing material well known in the art.

As shown in FIG. 34, the LCD panel of FIGS. 9A1 and 9A2 is shown modified by mounting a first broad-band absorptive linear polarizer 8A' to the front surface of broad-band linearly polarizing reflective panel 8', and mounting a second broad-band absorptive linear polarizer panel 11A' to the front surface of broad-band linearly polarizing reflective panel 11'. The polarization state of broad-band absorptive linear polarizer panel 8A' is LP1 in order to match the LP1 polarization state of broad-band linearly polarizing reflective panel 8'. Such polarization matching ensures that spectral energy which is not reflected from the broad-band linearly polarizing reflective panel 8', but is transmitted (i.e. leaked) therethrough due to a suboptimal extinction ratio, is absorbed by the broad-band absorptive linear polarizer panel 8A' through energy dissipation. Similarly, the polarization state of broad-band absorptive linear polarizer 11A' is LP2 in order to match the LP2 polarization state of broad-band linearly polarizing reflective panel 11'. Such polarization matching ensures that spectral energy which is not reflected from the broad-band polarizing reflective panel 11', but is transmitted (i.e. leaked) therethrough due to a suboptimal extinction ratio, is absorbed by the broad-band absorptive linear polarizer 11A' through energy dissipation. Preferably, these absorptive polarizing filter panels 8A' and 11A' are laminated directly onto broad-band linearly polarizing reflective panels 8 and 11, respectively. The use of broad-band absorptive linear polarizers 8A' and 8A" substantially improves the contrast of images formed by the LCD panel, without reducing the light transmission efficiency along the light projection axis of the LCD panel. Such broad-band absorptive polarizers can be realized using dichroic polarizing material well known in the art.

As shown in FIG. 35, the LCD panel of FIGS. 3A1 and 3A2 can be modified by mounting a first broad-band absorptive circular polarizer 8A" to the front surface of broad-band circularly polarizing reflective panel 8", and mounting a second broad-band absorptive circular polarizer panel 11A" to the front surface of broad-band circularly polarizing reflective panel 11". The polarization state of broad-band absorptive circular polarizer panel 8A" is LHCP in order to match the LHCP polarization state of broad-band circularly polarizing reflective panel 8". Such polarization matching ensures that spectral energy which is not reflected from the broad-band circularly polarizing reflective panel 8", but is transmitted (i.e. leaked) therethrough due to a suboptimal extinction ratio, is absorbed by the broad-band absorptive circular polarizer 8A" through energy dissipation. Similarly, the polarization state of broad-band absorptive circular polarizer panel 11A" is RHCP in order to match the RHCP polarization state of broad-band circularly polarizing reflective panel 11". Such polarization matching ensures that spectral energy which is not reflected from the broad-band polarizing reflective panel 11", but is transmitted (i.e. leaked) therethrough due to a suboptimal extinction ratio, is absorbed by the broad-band absorptive circular polarizer panel 11A" through energy dissipation. The use of broad-band absorptive circular polarizers 8A" and 11A" substantially improves the contrast of images formed by the LCD panel, without reducing the light transmission efficiency along the light projection axis of the LCD panel. Such broad-band absorptive polarizers can be realized using dichroic polarizing material well known in the art. Preferably, these absorptive circularly polarizing filter panels 8A" and 11A" are laminated directly onto broad-band circularly polarizing reflective panels 8" and 11", respectively, during the fabrication process of the LCD panel.

As shown in FIG. 36, the LCD panel of FIGS. 30A1 and 30A2 can be modified by mounting a first broad-band absorptive linear polarizer 8A' to the front surface of broad-band polarizing reflective panel 8', and mounting a second broad-band absorptive linear polarizer 11A' to the front surface of broad-band polarizing reflective panel 11'. The polarization state of broad-band absorptive linear polarizer panel 8' is LP1 in order to match the LP1 polarization state of broad-band linearly polarizing reflective panel 8'. Such polarization matching ensures that spectral energy which is not reflected from the broad-band polarizing reflective panel 8', but is transmitted (i.e. leaked) therethrough due to a suboptimal extinction ratio, is absorbed by the broad-band absorptive linear polarizer 8A' through energy dissipation. Similarly, the polarization state of broad-band absorptive linear polarizer 11A' is LP1 in order to match the LP1 polarization state of broad-band polarizing reflective panel 11'. Such polarization matching ensures that spectral energy which is not reflected from the broad-band linearly polarizing reflective panel 11', but is transmitted (i.e. leaked) therethrough due to a suboptimal extinction ratio, is absorbed by the broad-band absorptive linear polarizer 11A' through energy dissipation. The use of broad-band absorptive linear polarizers 8A' and 11A' substantially improves the contrast of images formed by the LCD panel, without reducing the light transmission efficiency along the light projection axis of the LCD panel which, as shown in FIG. 2, extends from the backlighting structure towards the eyes of the viewer. Such broad-band absorptive polarizers can be realized using dichroic polarizing material well known in the art. Preferably, these absorptive polarizing filter panels 8A' and A' are laminated directly onto broad-band linearly polarizing reflective panels 8' and 11', respectively, during the fabrication process of the LCD panel.

As shown in FIG. 37A, the LCD panel of the present invention is shown as part of a direct-view type color image display system 1 which is capable of supporting displaying high-resolution color images. During operation, the LCD panel 2 is actively driven by pixel driver circuitry 3 in response to color image data sets produced from a host system 4 which can be a computer-graphics board (subsystem), a video source (e.g. VCR), camera, or like system. The function of the LCD panel 2 is to spatial intensity modulate and spectrally filter on a subpixel basis the light emitted from an edge-illuminated backlighting structure 2A which may be realized in a variety of ways. The optically processed pattern of light forms color images at the surface of the LCD panel for direct viewing.

As shown in FIG. 37B, the LCD panel of the present invention 2' is shown as part of a projection-view type color image display system 1' which is capable of supporting displaying high-resolution color images. During operation, the LCD panel 2' is actively driven by pixel driver circuitry 3 in response to color image data sets produced from host system 4 which can be a computer-graphics board (subsystem), a video source (e.g. VCR), camera, or like system. The function of light source 5 is to produce and project a beam of light through the entire extent of the LCD panel. The function of the LCD panel is to spatial intensity modulate and spectrally filter the projected light on a sub-pixel basis. The optically processed pattern of light forms color images at the surface of the LCD panel which are then projected by projection optics 6 onto a remote display surface (e.g. screen or wall) for projection viewing.

The systems shown in FIGS. 37A and 37B are each designed to support monoscopic viewing of color images representative of 2-D and/or 3-D geometry. However, these image display systems can be readily adapted to support stereoscopic viewing of 3-D objects and scenery of either a real and/or synthetic nature. One way of providing such viewing capabilities is to mount (i.e. laminate) a micropolarization panel upon the display surface of the LCD panels 2 and 2' in order to display micropolarized spatially multiplexed images (SMIs) of 3-D objects and scenery, for viewing through electrically-passive polarizing eyeglasses, as disclosed in U.S. Pat. No. 5,537,144 and International Application Serial No. PCT/US97/03985, incorporated herein by reference.

In general, there are many applications to which the LCD panels of the present invention can be put. One such application is illustrated in FIG. 15. As shown, the LCD panel hereof can be integrated into a ultra-high brightness color image projection system of transportable design. In this particular embodiment, the image projection system is embodied within a laptop computer system having both direct and projection viewing modes, similar to the systems described in Applicant's: International Application No. PCT/US96/19718; International Application No. PCT/US95/12846; and International Application No. PCT/US95/05133, each incorporated herein by reference in its entirety.

As shown in FIG. 38, portable image projection system 30 comprises a number of subsystem components, namely: a compact housing of transportable construction having a display portion 31A with a frontwardly located display window 32, and a base portion 32B hingedly connected to the display portion 31A and having a keypad 33 and a pointing device 34; an LCD panel 2, 2' according to the present invention described above, mounted within the housing display portion 31A; an ultra-thin projection lens panel 35 (e.g. Fresnel lens, holographic lens, etc.) laminated to the front surface of the LCD panel 2; a backlighting structure 7' of cascaded construction, mounted to the rear of the LCD panel 2 in a conventional manner; associated apparatus 36, (e.g. pixel driver circuitry, image display buffers, an image display controller, a rechargeable battery power supply, input/output circuitry for receiving video input signals from various types of external sources, microprocessor and associated memory, etc.), contained within the base portion 31B; a projection lens 37 supported by a bracket 38 which can be removed during the direct viewing mode and stored within a compartment 39 formed within the base portion of the housing; and an electro-optically controllable light diffusing panel 40 which does not scatter backprojected light in the projection viewing mode, and scatters back project light in the direct viewing mode.

In the direct-viewing mode of the system of FIG. 38, the projection lens 38 is stored within compartment 39, electro-optically controllable light diffusing panel 40 is switched to its light scattering state, and the backlighting structure produces light which is spatial-intensity modulated and spectrally filtered to produce color images on the surface of the LCD panel 2. In the projection-viewing mode, the projection lens 38 is mounted along the projection axis (optical axis) 41 of the Fresnel lens panel 35, electro-optically controllable light diffusing panel 40 is switched to its light non-scattering state, and the backlighting structure produces light which is spatial-intensity modulated and spectrally filtered to produce color images on the surface of the LCD panel 2. Projection lens 37 projects the formed color image onto a remote viewing surface 42 for projection viewing. By virtue of the ultra-high light transmission efficiency of the LCD panel 2 hereof, the system of FIG. 15 can projected bright color images onto remote surfaces without the use of external high-intensity lighting sources required by prior art LCD projection systems. In portable applications, such images can be projected using the battery power source aboard the transportable system. With this design, there is not need for a rearwardly opening window in the back of display housing portion 31A, required of prior art projection system. When not in use, the system easily folds into a ultra-slim book-like configuration for easy of storage and transportability.

The CLC filter structures described hereinabove can be assembled as optical devices designed for use in various types of LCD panel systems of the improved image brightness and color qulaity. Several examples of such optical devices and described below.

FIG. 39 shows an embodiment of FIG. 11 where an unpolarized white light 200 is incident on a right handed broadband cholesteric liquid crystal 115 which transmits left handed circularly polarized white incident light and reflects right handed circularly polarized white light. A white matrix is provided by white matrix layer 85 by physically blocking transmission of light into the left handed reflective color filter layers 60 and 70. After layer 70, red (R) green (G) and blue (B) left handed circularly polarized light are transmitted as shown above in FIG. 4 with left handed cholesteric liquid crystal color filter layers 60 and 70. A quarter wave plate 80 adjacent reflective cholesteric liquid crystal color filters in layer 70 transforms the transmitted left handed circularly polarized light into linearly polarized light, which is used in liquid crystal displays, such as those disclosed in copending patent application Ser. No. 08/715,314 entitled "Image Display Panel Recycling Of Light From A Plurality Of Light Reflective Elements Therewithin So As To Produce Color Images With Enhanced Brightness" filed Sep. 16, 1996, which is hereby made a part hereof and incorporated herein by reference.

FIG. 40 is similar to FIG. 5B1 in that FIG. 40 shows a modification of FIG. 5B1 where an unpolarized white light 200 is incident on a right handed broadband Cholesteric Liquid Crystal film 115 which transmits left handed circularly polarized white incident light and reflects right handed circularly polarized white incident light. A black matrix is provided by black matrix layer 85 by physically blocking transmission of light into the left handed reflective color filter layers 40 and 50. After layer 50, red (R) green (G) and blue (B) left handed circularly polarized light is transmitted as shown above in FIG. 3 with left handed cholesteric liquid crystal color filter layers 40 and 50. A quarter wave plate 80 adjacent reflective cholesteric liquid crystal color filters in layer 40 transforms the transmitted left handed circularly polarized light into linearly polarized light, which is used in liquid crystal displays.

Quarter wave plates can be used to convert circularly polarized light to linearly polarized light for any of the embodiments shown for devices using linearly polarized light, such as displays having twist nematic to turn on and off the light emitting from the pixels in the displays.

FIG. 41 shows an embodiment of FIG. 5 having white unpolarized light 200 incident on a right handed cholesteric liquid crystal layer 115 for transmitting a broad band left handed circularly polarized light covering the primary colors and reflecting the complimentary right handed circularly polarized light. When the green, red (G,R) portion of layer 60 overlaps the blue, green (B,G) portion and the blue (B) portion of layer 70, a black matrix is created at the overlapped portion, which separates the transmitted colors as described above in FIG. 5. The transmitted light from layer 70 then passes through the quarter wave plate 80 and is converted to linearly polarized light, making it suitable for use in a display which uses twisted nematic or super twisted nematic LC elements to actively control the transmission of selected spectral components through the pixel structures of the spectral filter in conjunction with a broad-band linear polarizing analyzer. The ability to embody a black matrix structure into the spectral filter structure improves color contrast, and eliminates the need to deposit layers for reflective masking or other means of blocking light to form the black matrix as used in prior art devices.

The modifications described above are merely exemplary. It is understood that other modifications to the illustrative embodiments will readily occur to persons with ordinary skill in the art. All such modifications and variations are deemed to be within the scope and spirit of the present invention as defined by the accompanying claims to Invention.

What is claimed is:

1. A wide incident angle reflective broadband polarizer comprising:
    a first varying pitch helix cholesteric liquid crystal film for reflecting and transmitting circularly polarized light over a broad band of wavelengths,
    a first constant pitch helix cholesteric liquid crystal film for rotating the elliptical axis of light from the first varying pitch helix cholesteric liquid crystal film, adjacent the first varying pitch helix cholesteric liquid crystal film,
    a first homeotropic film for compensating the phase of the light from the first constant pitch helix cholesteric liquid crystal film, adjacent the first constant pitch helix cholesteric liquid crystal film such that unpolarized light entering the first varying pitch helix cholesteric liquid crystal film exits the first homeotropic film as circularly polarized light of one handedness for small and large angles of incidence.

2. A wide incident angle reflective broadband polarizer as in claim 1 wherein:
    the helical axis of the first variable pitch helix cholesteric liquid crystal film is oriented perpendicular to the film surface,
    the helical axis of the first constant pitch helix cholesteric liquid crystal film is oriented perpendicular to the film surface,
    the long molecular axes of the first homeotropic film are aligned perpendicular to the film surface.

3. A wide incident angle reflective broadband polarizer as in claim 1 wherein:
    a second varying pitch helix cholesteric liquid crystal film for reflecting and transmitting circularly polarized light over a broad band of wavelengths, adjacent the first varying pitch helix cholesteric liquid crystal film,
    a second constant pitch helix cholesteric liquid crystal film for rotating the elliptical axis of light from the second varying pitch helix cholesteric liquid crystal film, adjacent the second varying pitch helix cholesteric liquid crystal film,
    a second homeotropic film for compensating the phase of the light from the second constant pitch helix cholesteric liquid crystal film, adjacent the second constant pitch helix cholesteric liquid crystal film, such that unpolarized light incident on either homeotropic film of the wide incident angle broadband polarizer is transmitted as circularly polarized light of one handedness for small and large angles of incidence and reflected as circularly polarized light of the opposite handedness for small and large angles of incidence.

4. A wide incident angle reflective broadband polarizer as in claim 3 wherein:
    the wide angle broadband polarizer of claim 3 is encased in a block of transparent material diagonally to form a prism such that unpolarized light incident on one prism face will be transmitted as circularly polarized light of one handedness and reflected as circularly polarized light of the opposite handedness perpendicular to the transmitted light.

5. A wide incident angle reflective broadband polarizer as in claim 4 wherein:
    a prism of claim 4 having varying pitch helix cholesteric liquid crystal film for reflecting and transmitting circularly polarized light over a broadband of wavelengths of one handedness is adjacent to,
    a prism of claim 4 having a varying pitch helix cholesteric liquid crystal film for reflecting and transmitting circularly polarized light over a broadband of wavelengths of the opposite handedness,
    a mirror adjacent one of the prisms for changing the handedness of the reflected light and reflecting the reflected light to the prism with the opposite handedness for reflection in the same direction as the incident light such that incident unpolarized light converts totally to transmitted circularly polarized light of one handedness.

6. A wide incident angle reflective broadband polarizer as in claim 3 wherein,
    a mirror placed parallel to the wide incident angle broadband polarizer,
    a light source for producing unpolarized light placed between the mirror and the wide incident angle broadband polarizer, such that light from the light source is polarized when it is transmitted through the wide incident angle broadband polarizer as circularly polarized light of one handedness.

7. A wide incident angle reflective broadband polarizer as in claim 6 wherein,
    a quarter wave plate placed adjacent the wide incident angle broadband polarizer on the side opposite the mirror such that linearly polarized light from the quarter wave plate is chromatically stable at any viewing azimuthal and polar angle.

8. A wide incident angle reflective broadband polarizer as in claim 3 wherein, the wide incident angle broadband polarizer installed in a reflective cholesteric liquid crystal color filter display corrects for color distortions over large viewing angles.

9. A wide incident angle reflective broadband polarizer as in claim 3 wherein, the wide incident angle reflective broadband polarizer installed in a smart window corrects for color distortions over large viewing angles.

10. A wide incident angle reflective broadband polarizer as in claim 1 wherein:

a second constant pitch helix cholesteric liquid crystal film for rotating the elliptical axis of light from the first varying pitch helix liquid crystal film, adjacent the first varying pitch helix cholesteric liquid crystal film, a second homeotropic film for compensating the phase of the light from the second constant pitch helix cholesteric liquid crystal film, adjacent the second constant pitch helix cholesteric liquid crystal film such that unpolarized light incident on either homeotropic film of the whole incident angle broadband polarizer is transmitted as circularly polarized light of one handedness for small and large angles of incidence and reflected as circularly polarized light of the opposite handedness for small and large angles of incidence.

11. A wide incident angle reflective broadband polarizer as in claim 10 wherein:

the wide angle broadband polarizer of claim 10 encased in a block of transparent material diagonally to form a prism such that unpolarized light incident on one prism face will be transmitted as circularly polarized light of one handedness and reflected as circularly polarized light of opposite handedness perpendicular to the transmitted light.

12. A wide incident angle reflective broadband polarizer as in claim 11 wherein:

a prism of claim 11 having varying pitch helix cholesteric liquid crystal film for reflecting and transmitting circularly polarized light over a broadband of wavelengths of one handedness adjacent to, a prism of claim 11 having a varying pitch helix cholesteric liquid crystal film for reflecting and transmitting circularly polarized light over a broadband of wavelengths of the opposite handedness, a mirror adjacent one of the prisms for changing the handedness of the reflected light and reflecting the reflected light to the prism with the opposite handedness for reflection in the same direction as the incident light such that incident unpolarized light converts totally to transmitted circularly polarized light of one handedness.

13. A wide incident angle reflective broadband polarizer as in claim 10 wherein, the film of claim 10 is broken up into fragments and used as a pigment.

14. A wide incident angle reflective broadband polarizer as in claim 10 wherein, the wide incident angle broadband polarizer installed in a reflective cholesteric liquid crystal color filter display corrects for color distortions over large viewing angles.

15. A wide incident angle reflective broadband polarizer as in claim 1 wherein, a minor placed parallel to the wide incident angle broadband polarizer, a light source for producing unpolarized light is placed between the mirror and the wide incident angle broadband polarizer, such that light from the light source is polarized when it is transmitted through the wide incident angle broadband polarizer as circularly polarized light of one handedness.

16. A wide incident angle reflective broadband polarizer as in claim 15 wherein, a quarter wave plate placed adjacent the wide incident angle broadband polarizer on the side opposite the mirror such that linearly polarized light from the quarter wave plate is chromatically stable at any viewing azimuthal and polar angle.

17. A wide incident angle reflective broadband polarizer as in claim 1 wherein, the homeotropic film is polymerizable.

18. A wide incident angle reflective broadband polarizer as in claim 1 wherein, the constant pitch helix cholesteric liquid crystal film is polymerizable.

19. A wide incident angle reflective broadband polarizer as in claim 1 wherein, incident unpolarized visible light is transmitted as circularly polarized light.

20. A wide incident angle reflective broadband polarizer as in claim 1 wherein, incident unpolarized ultraviolet light is transmitted as circularly polarized light.

21. A wide incident angle reflective broadband polarizer as in claim 1 wherein, incident unpolarized infrared light is transmitted as circularly polarized light.

22. A wide incident angle reflective broadband polarizer as in claim 1 wherein, an electric field is applied to the varying pitch helix cholesteric liquid crystal film to switch the film between a totally transmissive state and a circularly polarizing transmitting state.

23. A wide incident angle reflective broadband polarizer as in claim 1 wherein, a first index matching adhesive binds the first varying pitch helix cholesteric liquid crystal film to the first constant pitch helix cholesteric liquid crystal film and a second index matching adhesive binds first constant pitch helix cholesteric liquid crystal film to the first homeotropic film.

24. A wide incident angle reflective broadband polarizer as in claim 1 wherein, the film of claim 1 is broken up into fragments and used as a pigment.

25. A wide incident angle reflective broadband polarizer as in claim 1 wherein, the film of claim 3 is broken up into fragments and used as a pigment.

26. A wide incident angle reflective broadband polarizer as in claim 1 wherein, the wide incident angle broadband polarizer installed in a reflective cholesteric liquid crystal color filter display corrects for color distortions over large viewing angles.

27. A wide incident angle reflective broadband polarizer as in claim 1 wherein, the wide incident angle reflective broadband polarizer installed in a smart window corrects for color distortions over large viewing angles.

28. A wide incident angle reflective broadband polarizer as in claim 1 wherein, the wide incident angle reflective broadband polarizer installed in a smart window corrects for color distortions over large viewing angles.

29. A wide incident angle reflective broadband polarizer as in claim 1 wherein, a wide incident angle broadband polarizer as in claim 1 with opposite handedness is attached to reflect all incident light.

30. A wide incident angle reflective broadband polarizer as in claim 1 wherein an electrically addressable $\pi$ phase shifter is sandwiched between the wide incident angle broadband polarizer of claim 1 with one handedness and the wide incident angle broadband polarizer of claim 1 with either handedness such that all incident light is reflected when the $\pi$ phase shifter changes the light incident thereon and transmits light when the $\pi$ phase shifter is quiescent.

* * * * *